(12) United States Patent
Ikeda et al.

(10) Patent No.: US 8,131,130 B2
(45) Date of Patent: Mar. 6, 2012

(54) RECORDING MEDIUM, PLAYBACK APPARATUS, RECORDING METHOD, AND PLAYBACK METHOD

(75) Inventors: Wataru Ikeda, Osaka (JP); Hiroaki Iwamoto, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 10/572,873

(22) PCT Filed: Oct. 12, 2004

(86) PCT No.: PCT/JP2004/015333
§ 371 (c)(1),
(2), (4) Date: Sep. 18, 2006

(87) PCT Pub. No.: WO2005/036545
PCT Pub. Date: Apr. 21, 2005

(65) Prior Publication Data
US 2007/0089146 A1 Apr. 19, 2007

(30) Foreign Application Priority Data

Oct. 10, 2003 (JP) ................................ 2003-352913
Nov. 10, 2003 (JP) ................................ 2003-379758

(51) Int. Cl.
*H04N 9/80* (2006.01)
(52) U.S. Cl. ........................................ 386/241; 386/248
(58) Field of Classification Search ............... 386/1, 46, 386/95, 124–126
See application file for complete search history.

(56) References Cited

U.S. PATENT DOCUMENTS

| 5,771,334 | A  | 6/1998  | Yamauchi et al. |
| 5,907,658 | A  | 5/1999  | Murase et al.   |
| 5,907,659 | A  | 5/1999  | Yamauchi et al. |
| 6,434,326 | B1 | 8/2002  | Kondo et al.    |
| 6,493,503 | B2 | 12/2002 | Nonomura et al. |

(Continued)

FOREIGN PATENT DOCUMENTS

CN 1418010 A 5/2003

(Continued)

OTHER PUBLICATIONS

"Digital Video Broadcasting (DVB); Multimedia Home Platform (MHP) Specification 1.1.1; ETSI TS 102 812" ETSI Standards, LIS, Sophia Antipolis Cedex, France, vol. BC, No. V1.2.1, Jun. 1, 2003, pp. 221-229, XP14007001.*

(Continued)

*Primary Examiner* — Huy T Nguyen
(74) *Attorney, Agent, or Firm* — Panasonic Patent Center; Dhiren Odedra; Kerry Culpepper

(57) ABSTRACT

A BD-ROM playback apparatus simultaneously executes reproduction of a title including an AVClip and executes an application. The BD-ROM playback apparatus includes a BD-J module (35) executing an application, a playback control engine (32) for playing the AVClip belonging to one title, and a module manager (34) for controlling branching between a plurality of titles. The title includes a data management table. The data management table indicates an application read priority level for each title. The BD-J module (35) includes a java virtual machine (38), a local memory (29), and an application manager (36) for loading the application to the local memory (29). The application manager (36) reads in the application into the local memory (29) according to the read priority level of each application and the memory size of the local memory (29).

3 Claims, 60 Drawing Sheets

U.S. PATENT DOCUMENTS

| | | | |
|---|---|---|---|
| 6,523,094 B2 * | 2/2003 | Kimura et al. | 711/137 |
| 6,553,179 B1 | 4/2003 | Miwa et al. | |
| 6,874,145 B1 | 3/2005 | Ye et al. | |
| 7,200,857 B1 | 4/2007 | Rodriguez et al. | |
| 7,493,011 B2 | 2/2009 | Piesing et al. | |
| 7,606,465 B2 | 10/2009 | Seo et al. | |
| 2002/0021887 A1 | 2/2002 | Yoshikawa | |
| 2002/0186485 A1 | 12/2002 | Cho et al. | |
| 2002/0194618 A1 | 12/2002 | Okada et al. | |
| 2003/0081939 A1 | 5/2003 | Kim et al. | |
| 2003/0161615 A1 * | 8/2003 | Tsumagari et al. | 386/95 |
| 2003/0191792 A1 | 10/2003 | Waki et al. | |
| 2004/0175154 A1 | 9/2004 | Yoon et al. | |
| 2005/0063669 A1 | 3/2005 | Kato et al. | |
| 2007/0274680 A1 | 11/2007 | Ikeda et al. | |

FOREIGN PATENT DOCUMENTS

| | | |
|---|---|---|
| EP | 0 989 743 | 3/2000 |
| EP | 1 198 132 | 4/2002 |
| GB | 2 370 658 | 7/2002 |
| JP | 06-004166 | 1/1994 |
| JP | 06-230946 | 8/1994 |
| JP | 10-063362 | 3/1998 |
| JP | 10-304304 | 11/1998 |
| JP | 11-18048 | 1/1999 |
| JP | 11-219313 | 8/1999 |
| JP | 2000-78544 | 3/2000 |
| JP | 2000-149514 | 5/2000 |
| JP | 2001-022625 | 1/2001 |
| JP | 2001-238161 | 8/2001 |
| JP | 2002-57990 | 2/2002 |
| JP | 2002-269929 | 9/2002 |
| JP | 2002-369154 | 12/2002 |
| JP | 2003-032637 | 1/2003 |
| JP | 2003-61055 | 2/2003 |
| JP | 2003-230104 | 8/2003 |
| JP | 2003-248637 | 9/2003 |
| JP | 2003-249057 | 9/2003 |
| JP | 2003-274306 | 9/2003 |
| JP | 2004-206863 | 7/2004 |
| JP | 2005-514677 | 5/2005 |
| JP | 2005-514678 | 5/2005 |
| JP | 2007-265850 | 10/2007 |
| JP | 2007-265851 | 10/2007 |
| JP | 2007-265852 | 10/2007 |
| JP | 4091078 | 5/2008 |
| JP | 4091104 | 5/2008 |
| JP | 4091105 | 5/2008 |
| JP | 4117006 | 7/2008 |
| JP | 4117019 | 7/2008 |
| TW | 381239 | 2/2000 |
| WO | WO 00/78043 | 12/2000 |
| WO | WO 01/04743 | 1/2001 |
| WO | 01/35416 | 5/2001 |
| WO | WO 01/33847 | 5/2001 |
| WO | WO 01/33852 | 5/2001 |
| WO | 2004/025651 | 3/2004 |
| WO | 2004/074976 | 9/2004 |
| WO | 2005/036545 | 4/2005 |
| WO | 2005/036546 | 4/2005 |
| WO | 2005/036547 | 4/2005 |
| WO | 2005/036554 | 4/2005 |

OTHER PUBLICATIONS

C. Peng, P. Vuorimaa, "Digital Television Application Manager," IEEE International Conference on Multimedia and Expo 2001, pp. 104-107.*

J.C. Newell, "An introduction to MHP 1.0 and MHP 1.1", Internet Article, retrieved from Internet: URL: http://www.fondazioneros-selli.it/DocumentFolder/Referencees_BBC_R&D, 20 pages, May 2002.

"Digital Video Broadcasting (DVB); Multimedia Home Platform-(MHP) Specification 1.1.1; ETSI TS 102 812" ETSI Standards, LIS, Sophia Antipolis Cedex, France, vol. BC, No. V1.2.1, Jun. 1, 2003, pp. 221-229, XP14007001.

Summons to attend oral proceedings pursuant to Rule 115(1) EPC dated Feb. 25, 2010 issued by the EPO regarding the related European Patent Application No. 04773789.5.

Supplementary European Search Report, dated Dec. 3, 2009, for the EP Patent Application No. 04773787.9.

The extended European search report, dated Oct. 15, 2010 for the EP Patent Application No. 10170131.6.

Chinese office action dated Dec. 3, 2010, for the related Chinese Patent Application No. 200810145956.5 and English translation thereof.

* cited by examiner

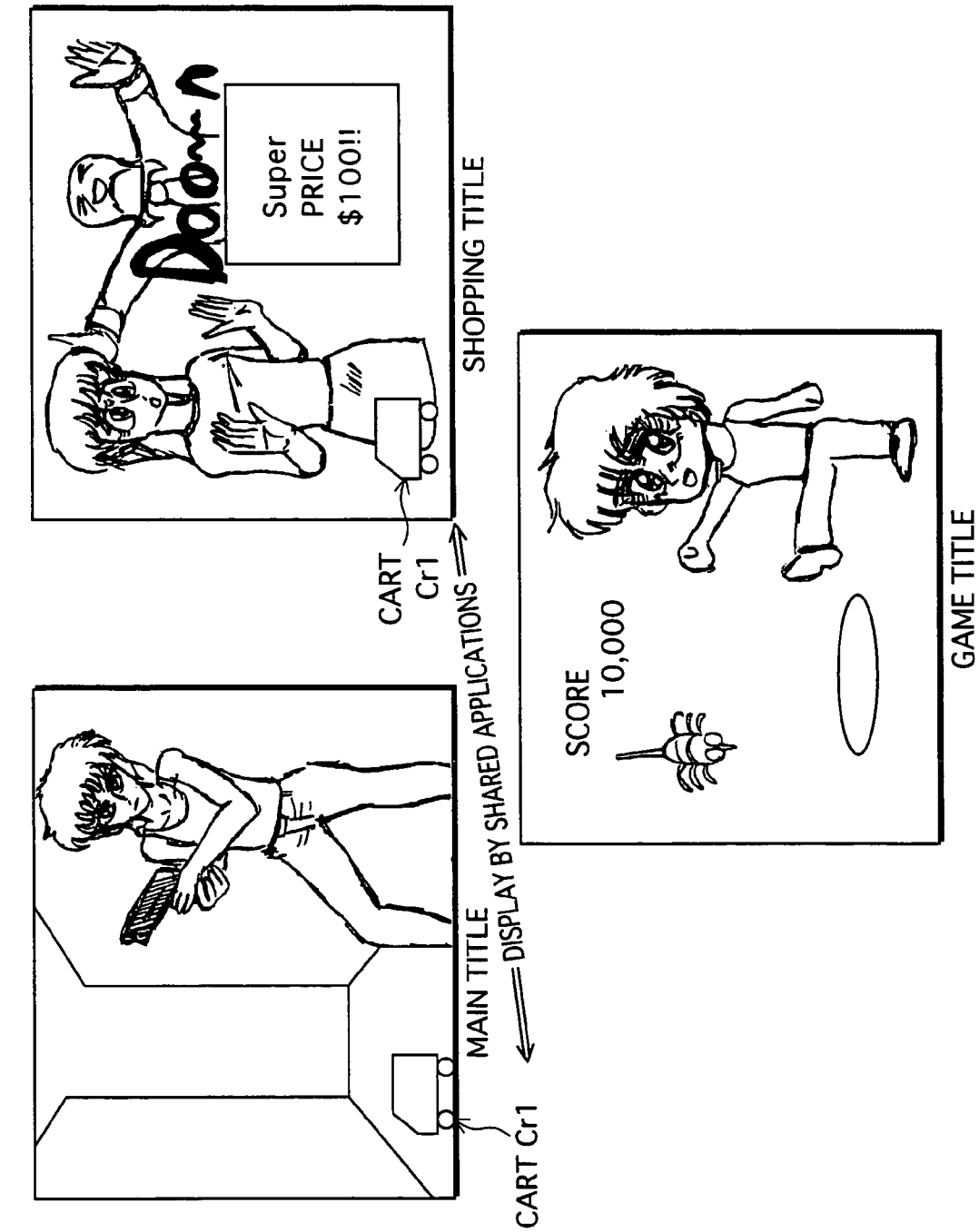

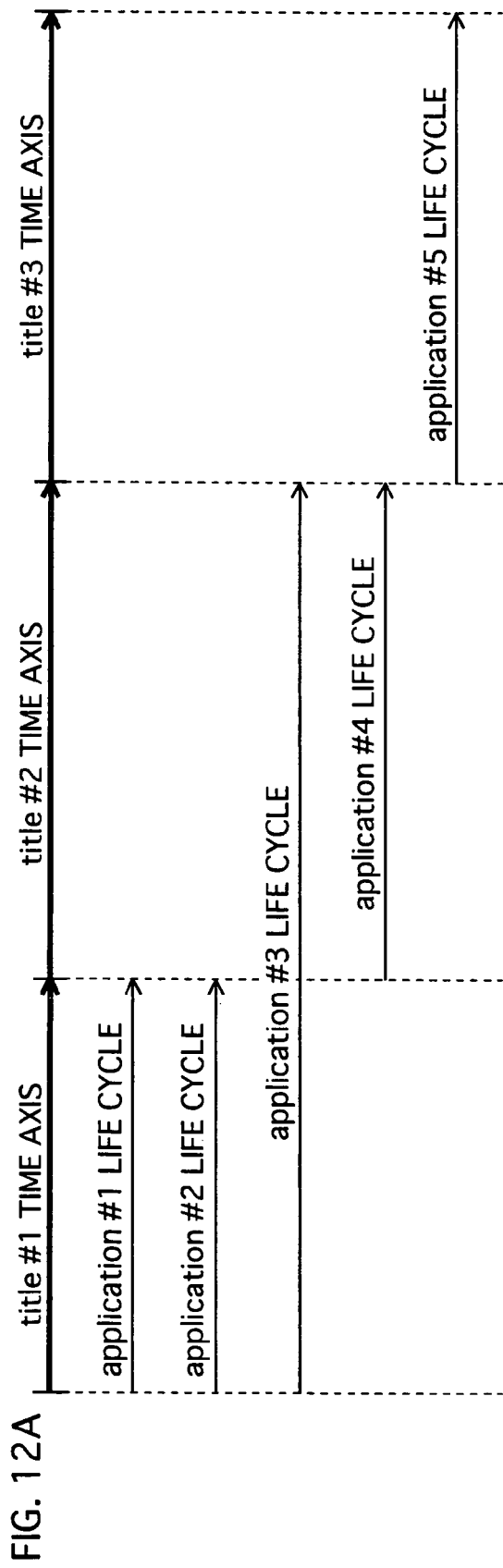

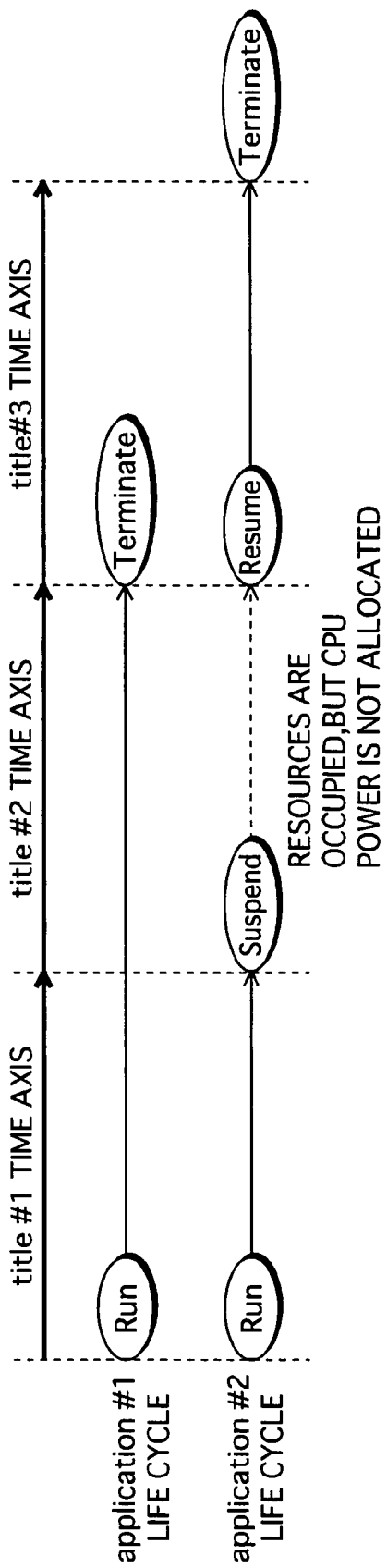

FIG. 15

CHANGE IN APPLICATION STATUS ACCORDING TO RUN ATTRIBUTES

| Application Status in Previous Title | Run Attribute | | |
|---|---|---|---|
| | Persistent | AutoRun | Suspend |
| Not Run | Maintain status without performing operation | Run Application | Maintain status without performing operation |
| Running | Maintain status without performing operation | Maintain status without performing operation | Suspend |
| Suspend | Resume | Resume | Maintain status without performing operation |

EXCEPTIONAL PROCESSING IN BD-J OBJECT EXECUTION

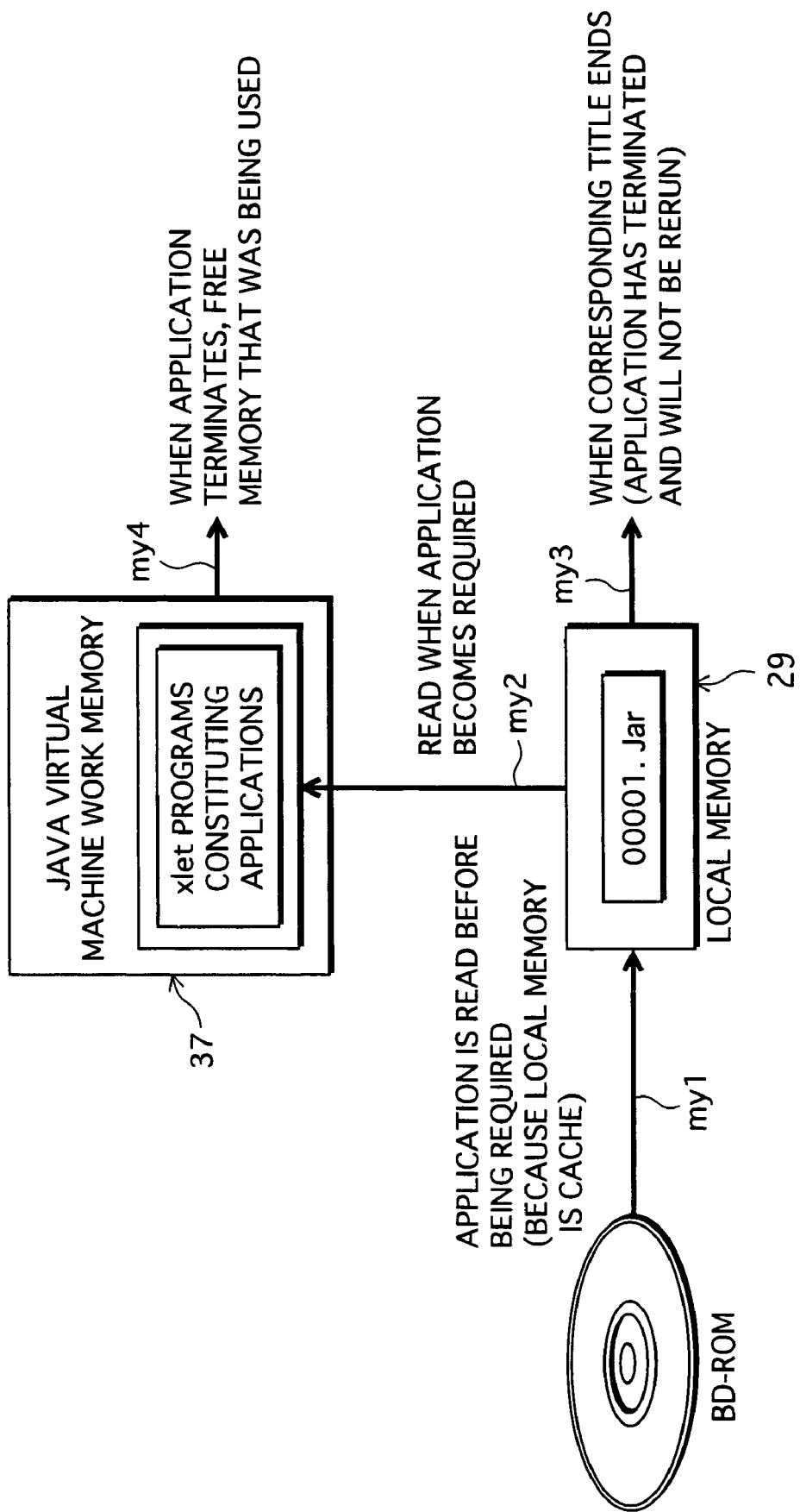

title #1 DATA MANAGEMENT TABLE

| LIFE CYCLE | application ID | READ ATTRIBUTE | READ PRIORITY LEVEL |
|---|---|---|---|
| title #1 | application #1 | | |
| title #1 | application #2 | | | title #2 DATA MANAGEMENT TABLE

| LIFE CYCLE | application ID | READ ATTRIBUTE | READ PRIORITY LEVEL |
|---|---|---|---|
| title #1 | application #1 | | |
| title #2 | application #2 | | |

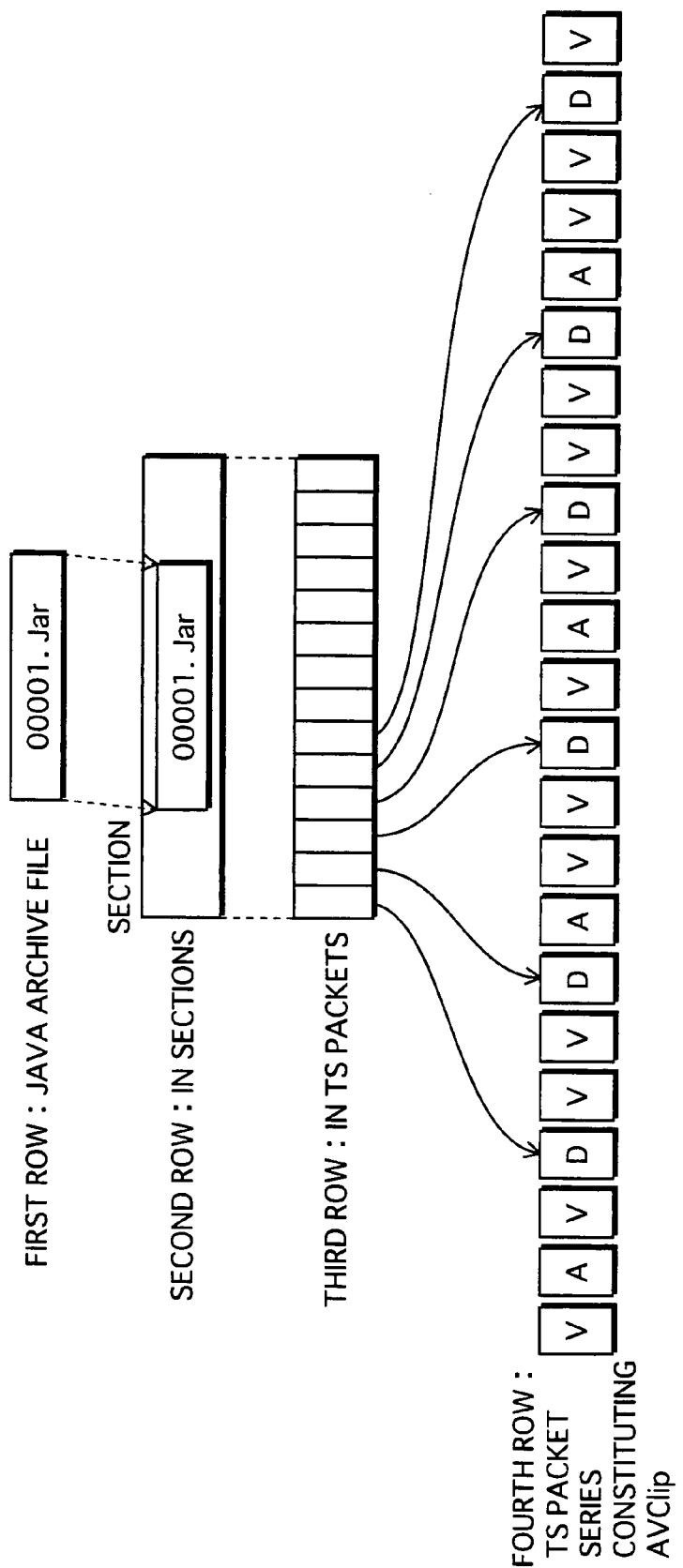

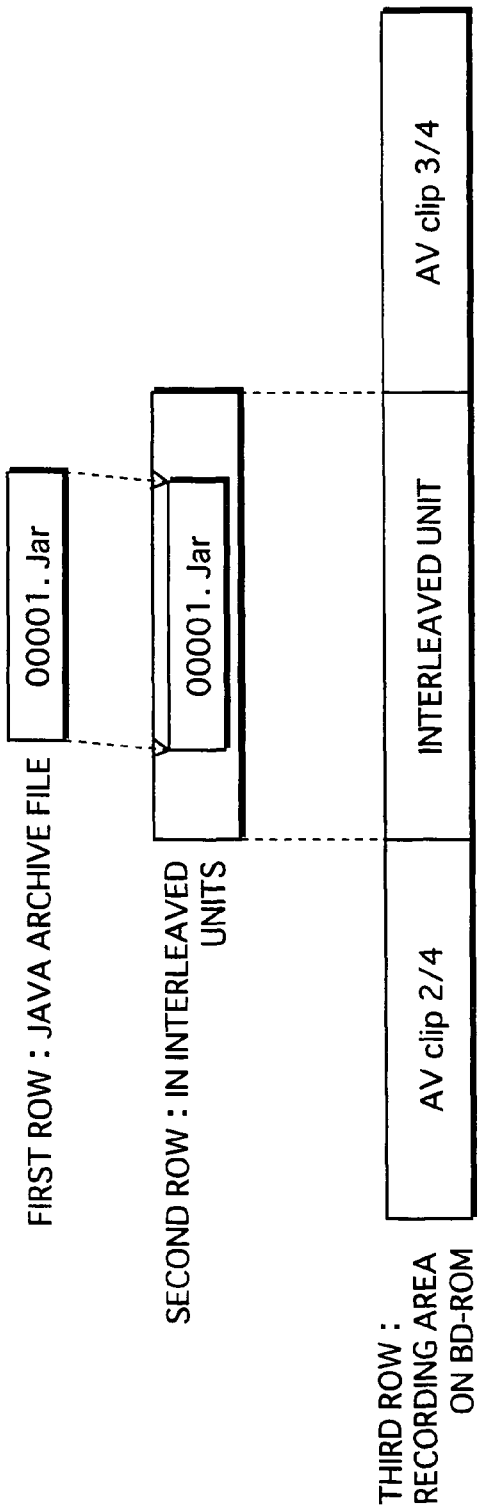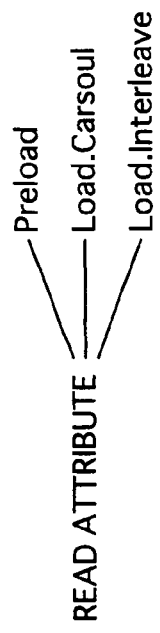

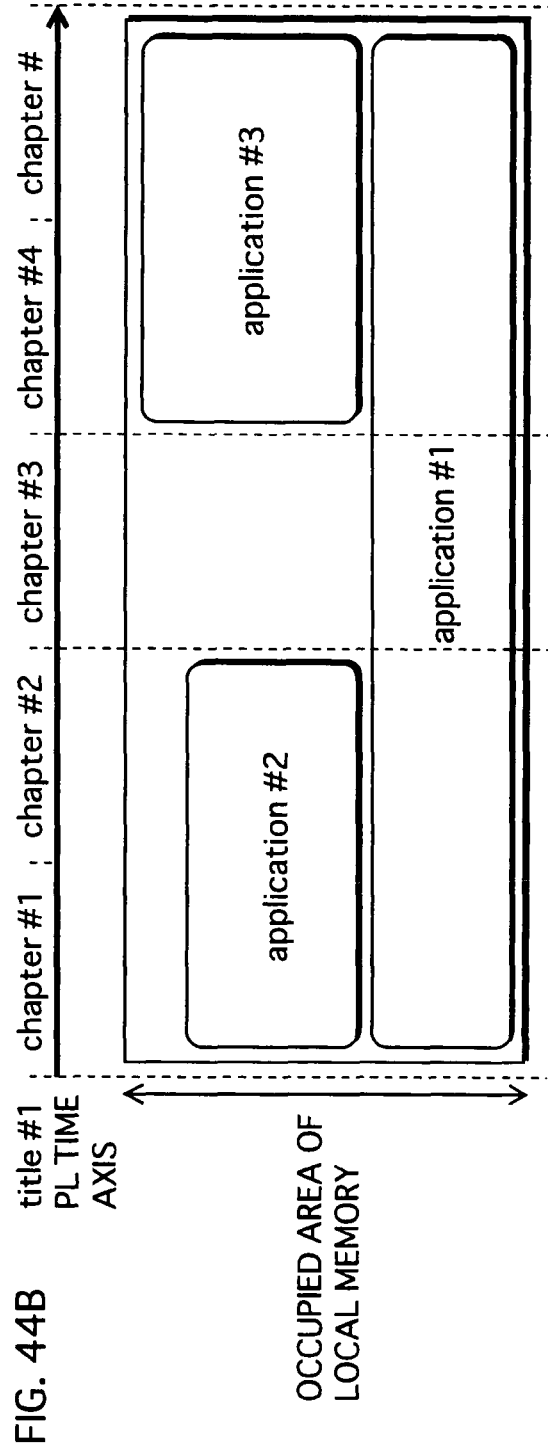
FIG. 44A title #1 DATA MANAGEMENT TABLE
FIG. 44B title #1 PL TIME AXIS FIG. 45B title #1 DATA MANAGEMENT TABLE FIG. 47A title #1 DATA MANAGEMENT TABLE
| LIFE CYCLE | application ID | READ ATTRIBUTE | READ PRIORITY |
|---|---|---|---|
| title #1 | application #1 | Preload | mandatory |
| title #1 | application #1 | Preload | optional:high |
| title #1 | application #1 | Preload | optional:low |
FIG. 47B OCCUPIED AREA OF LOCAL MEMORY
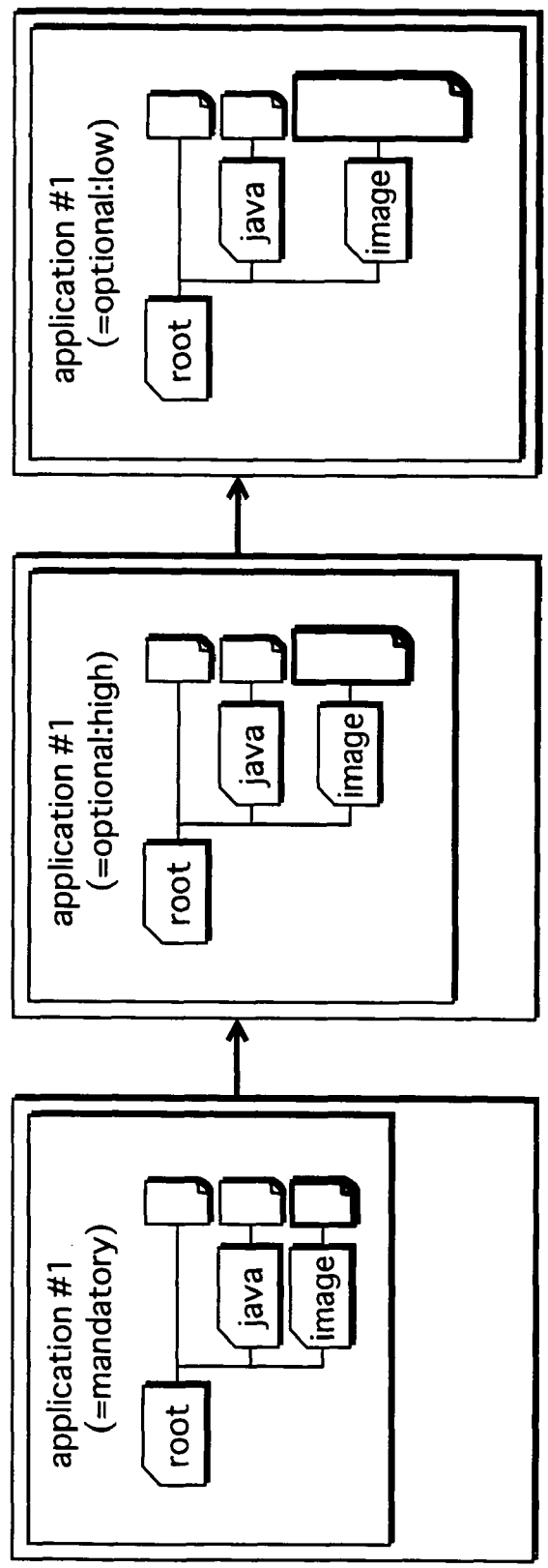

FIG. 48A  title #1 DATA MANAGEMENT TABLE

MEMORY SIZE OF
PLAYER IS SMALL

MEMORY SIZE OF
PLAYER IS LARGE

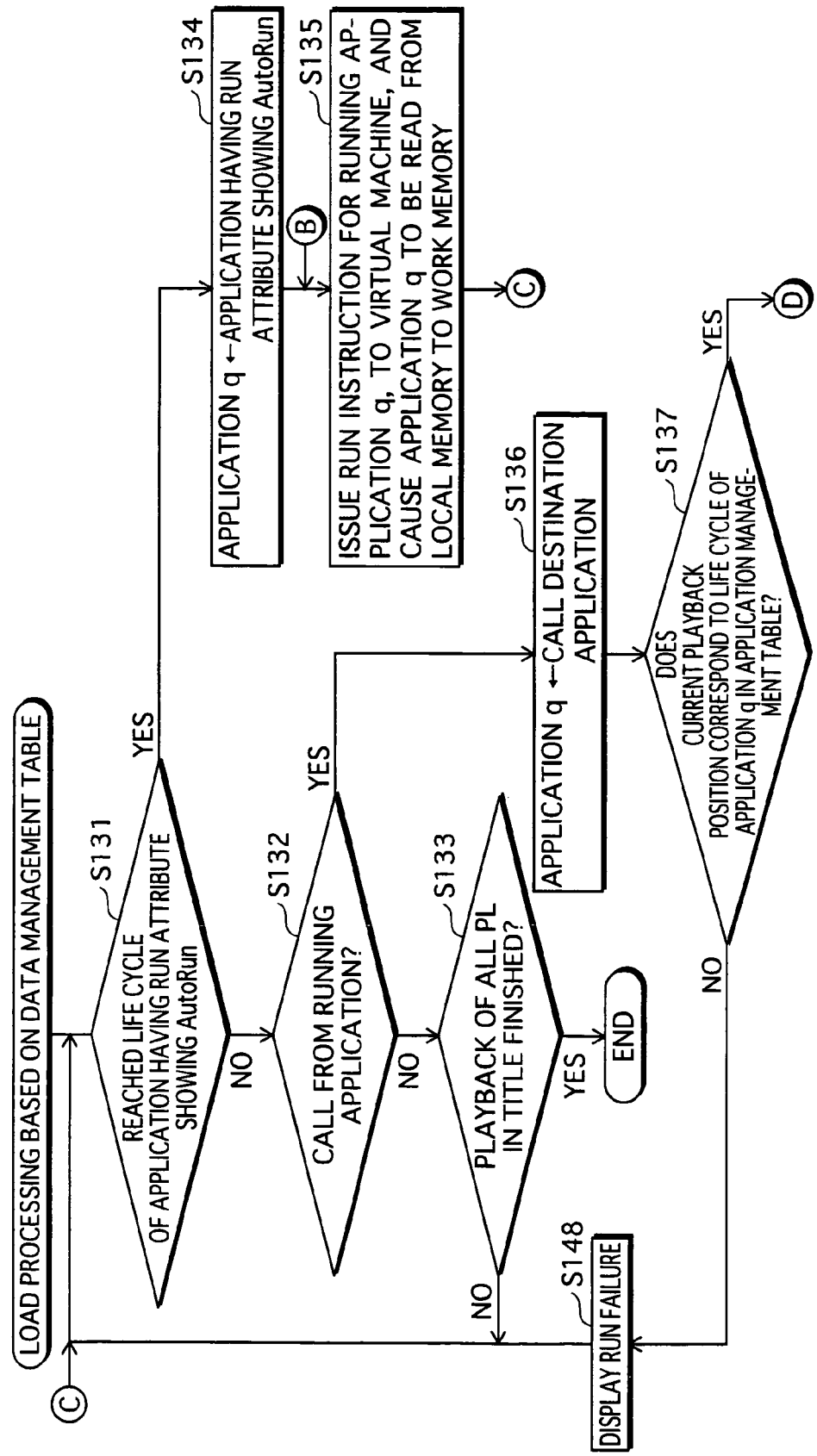

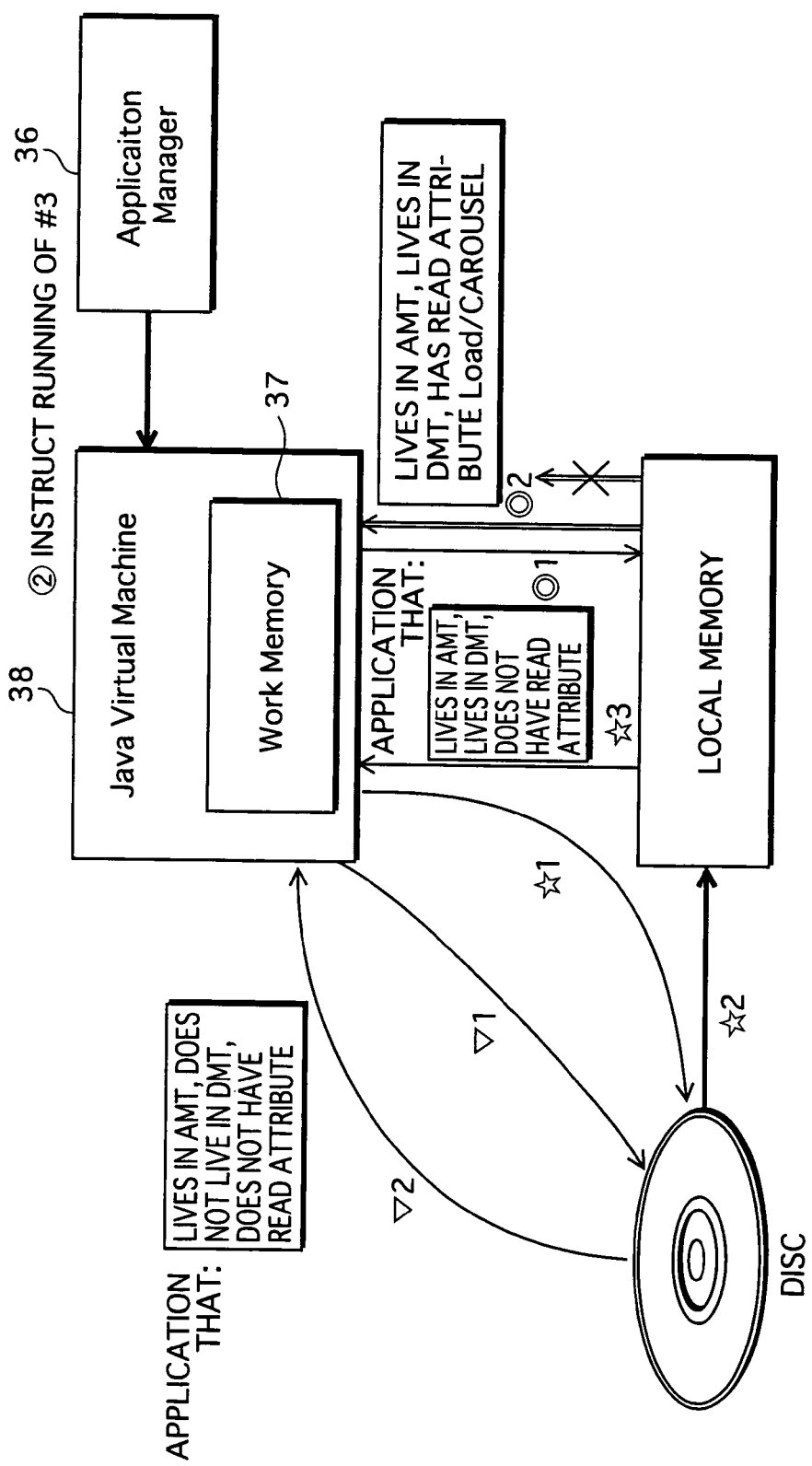

ZZZZZ. BD-J

| resume_intention_flag |
| menu_Call_Mask |
| title_search_mask |
| Application Management Table(AMT) |
| Data Management Table(DMT) |
| PlayList Management Table(PLMT) |

PL MANAGEMENT TABLE

| PLAYLIST ID | PLAYBACK ATTRIBUTE |
| --- | --- |
| — — | Auto Play |
| — — | — — |

FIG. 55
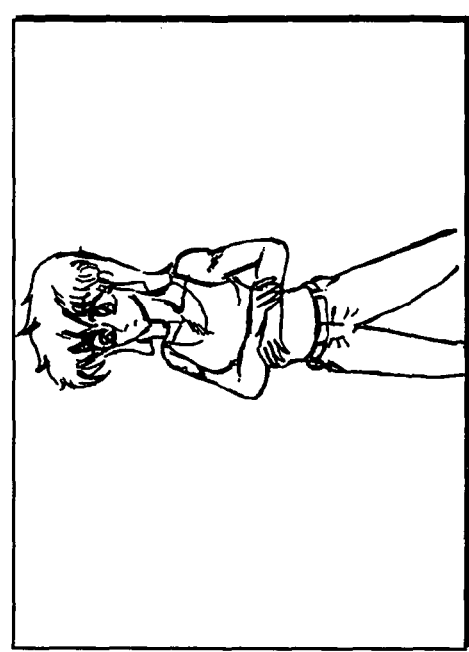
BACKGROUND: PLAYBACK IMAGE OF DEFAULT PL
FOREGROUND: GAME APPLICATION
SCORE 30,000
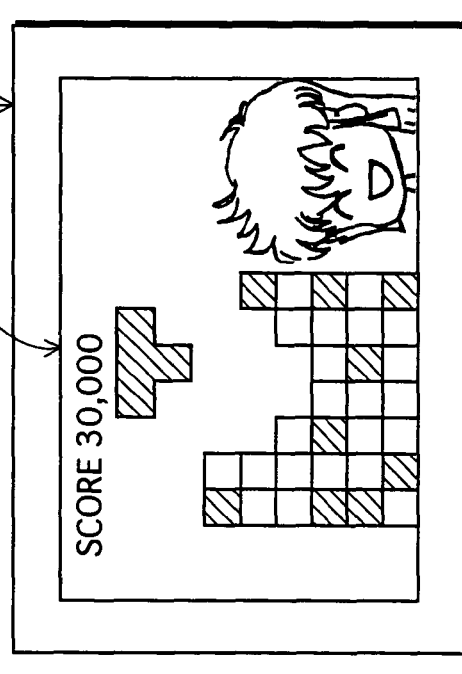
PLAYBACK IMAGE OF DEFAULT PL
ABNORMAL TERMINATION
APPLICATION TIME AXIS
PL TIME AXIS

FIG. 56A

APPLICATION AND DATA MANAGEMENT TABLE

| LIFE CYCLE | application ID | RUN ATTRIBUTE | READ PRIORITY LEVEL |
|---|---|---|---|
| title #1 | application #1 | AutoRun | |
| title #1:chapter #1-#3 | application #2 | Ready | |
| title #1 | application #3 | — | |
| title #1:chapter #2-#4 | application #4 | Ready | |

RUN ATTRIBUTE + READ ATTRIBUTE

FIG. 56B

| RUN ATTRIBUTE | PRELOAD BEFORE AV STREAM PLAYBACK | AUTO-RUN /CALL RUN | LOAD TO LOCAL MEMORY | LIVES /DOES NOT LIVE |
|---|---|---|---|---|
| AutoRun | ○ | AUTO | NO | LIVES |
| AutoRun | × | AUTO | YES | LIVES |
| READY | ○ | CALL | NO | LIVES |
| READY | × | CALL | YES | LIVES |
| NOT SPECIFIED | × | CALL | NO | LIVES |

FIG. 58A DATA MANAGEMENT TABLE

FIG. 59A DATA MANAGEMENT TABLE

| LIFE CYCLE | application ID | LOAD ATTRIBUTE | READ PRIORITY LEVEL | GROUP ATTRIBUTE |
|---|---|---|---|---|
| title #1 | application #1 | | mandatory | — |
| title #1 | application #2 | | optional | group #1 |
| title #1 | application #3 | | optional | group #1 |

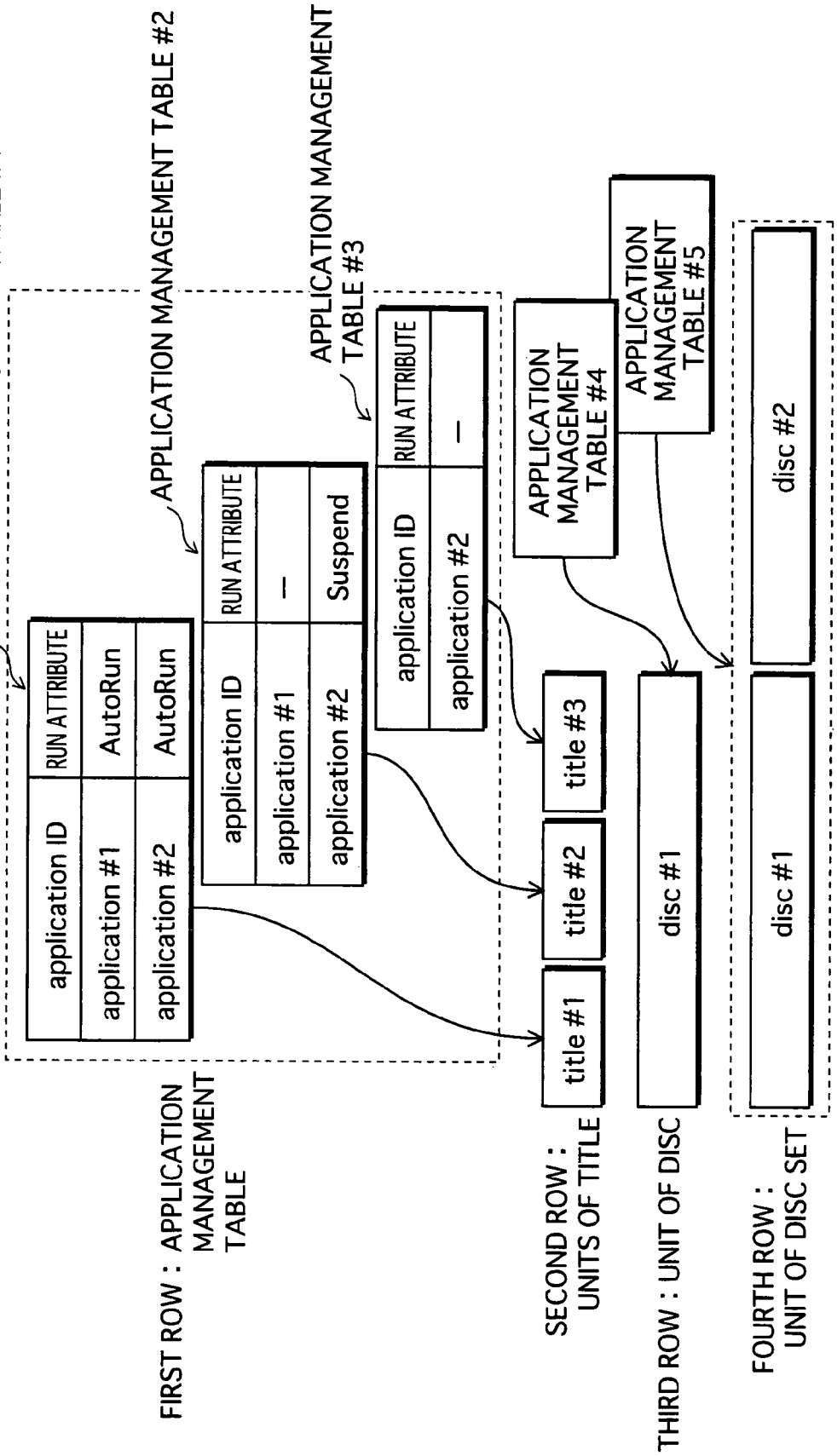

RECORDING MEDIUM, PLAYBACK APPARATUS, RECORDING METHOD, AND PLAYBACK METHOD

TECHNICAL FIELD

The present invention belongs to a field of playback control technology for simultaneously executing an application and playback of a digitized movie work, and in particular relates to an applied technique for applying the playback control technique to a consumer playback apparatus and a program.

BACKGROUND ART

When having a playback apparatus execute the described simultaneous playback, one issue is how to define the life cycle of applications on the time axis of a digital stream. The life cycle of an application is the period from the start of service by the application to the end of service by the application. If such a period is set in terms of a small period such as with a chapter, service of various applications can be executed in turn. However, if the life cycle of an application is set in small periods, the number of times that the application is read from the recording will increase. On the other hand, reading from an optical disc medium used for distributing movie works, such as a BD-ROM or a DVD, is usually slow. An increased number of reads at this slow speed will affect reading of the video stream that constitutes the main feature movie, and cause dropouts in moving picture playback. Although various services are realized, simultaneous execution that hinders moving picture playback will greatly discourage the user, and be shunned by creators of movie works.

DISCLOSURE OF THE INVENTION

An object of the present invention is to provide a playback apparatus that is capable of setting the life cycle of an application in small units.

The stated object is achieved by a recording medium storing thereon an index table and a plurality of operating mode objects, wherein the index table shows a plurality of titles in correspondence with the plurality of operation mode objects, at least one of the operation mode objects being a first operation mode object that is for use in a movie mode, and at least another one of the operation mode objects being a second operation mode object that is for use in a virtual machine, the first operation mode object includes a navigation command that shows a control procedure, the second operation mode object includes cache management information, and the cache management information shows, of files that compose applications, which file is to be read to a cache before audio-visual playback of the title corresponding to the second operation mode object when said title becomes a current title.

In the recording medium of the present invention, the cache management information shows which file is to be read to a cache before audio-visual playback of the title corresponding to the second operation mode object when said title becomes a current title. Therefore, when the title corresponding to the operation mode object becomes a current title, the application can be read from the cache to the virtual machine at any time. Since the application can be read to the virtual machine any time, the number of times the application is read from the recording medium is reduced, even if the life cycle of the application is defined in terms a small unit such as a chapter. Furthermore, reading from the optical disc to the cache is performed when branching between titles, in other words, where it is unnecessary to ensure seamless playback. Therefore, preparation for execution of an application can be made easily any time, without making the user aware of interruptions due to the application being read.

Here, in attempting to standardize playback apparatuses that have a cache, it is difficult to determine the extent of the memory scale. Considering such standardization, it is common to determine a minimum standard memory scale, and make provision of this mandatory in all playback devices. However, if the memory scale which is the execution environment is limited, there will be heavy restrictions on the operation environment of the applications, and the result will be that the creative will of those in charge of authoring will be stifled.

In order to ensure operations while not stifling the creative will of those in charge of authoring, it is desirable to structure the playback apparatus such that the application manager reads an application or applications having a read priority level set to "mandatory" to the cache, and then reads an application or applications having a read priority level set to "optional" to the cache depending on the subsequent free capacity of the cache.

Either applications corresponding to the minimum standard memory scale or applications corresponding to the operation environment of a larger memory scale can be loaded to the memory of the playback apparatus, depending on the memory scale of the playback apparatus and the read priority level of each application. Loading in this way ensures operations with the minimum standard, and also provides the soil for realizing the creative will of the author.

Here, the plurality of applications may be assigned mutually different read priority levels and identical identifiers, and the application manager may read, from among the applications having the identical identifiers, one of the applications exclusively to the cache, based on a scale of the cache and the read priority levels of the applications.

Of the plurality of applications, only one is loaded to the cache, in accordance with the memory scale. Therefore, applications can be operated with higher quality in accordance with the grade of the playback apparatus, and titles can be created with greater freedom.

BRIEF DESCRIPTION OF THE DRAWINGS

FIG. 11 shows an example of playback images of the three Titles shown in FIG. 10;

FIG. 12A shows the life cycle of each application, which is drawn based on the belonging relationships shown by the broken-line frames of FIG. 10;

FIG. 12B shows an example of application management tables written for specifying the life cycles of FIG. 12A;

FIGS. 14A and 14B show an example of application management tables and life cycles when "Suspend" is effective;

FIG. 15 shows combinations of the three run attributes (Persistent, AutoRun, and Suspend) and three possible statuses of the previous Title (Not Run, Running, and Suspend);

FIG. 40 shows an execution model that assumes a BD-J object;

FIG. 42 shows Java archive files embedded according to the carousel method;

FIG. 43A shows an AVClip embedded according to interleaving;

FIG. 43B shows three types of read attributes;

FIG. 44A shows an example of a data management table;

FIG. 44B shows changes in the storage content of the local memory 29 according to allocation by the data management table;

FIG. 45B shows an example of a data management table in which read priority levels are set;

FIG. 47A shows an example of a data management table of a data management table that specifies a plurality of applications that have identical applicationIDs but mutually different read priority levels;

FIG. 47B changes in the storage content of the local memory 29 according to allocation by the data management table of FIG. 47A;

FIG. 48A shows an example of a data management table written such that the same applicationID is given to applications that are to be preloaded and applications that are to be loaded;

FIG. 49 shows the procedure for load processing by the application manager 36 based on a data management table;

FIG. 51 illustrates how the Java virtual machine 38 reads applications;

FIG. 55 illustrates how playback is performed with the playback attribute being set to "AutoPlay" in the PlayList management table;

FIGS. 56A and 56B show the relationship between run attributes and the treatment of applications;

FIGS. 58A and 58B show an example of the read priority levels of the ninth embodiment;

FIG. 59A shows a data management table in which group attributes are assigned;

FIG. 60 shows variations of the units of allocation of application management tables.

BEST MODE FOR CARRYING OUT THE INVENTION

First Embodiment

Figure 1:
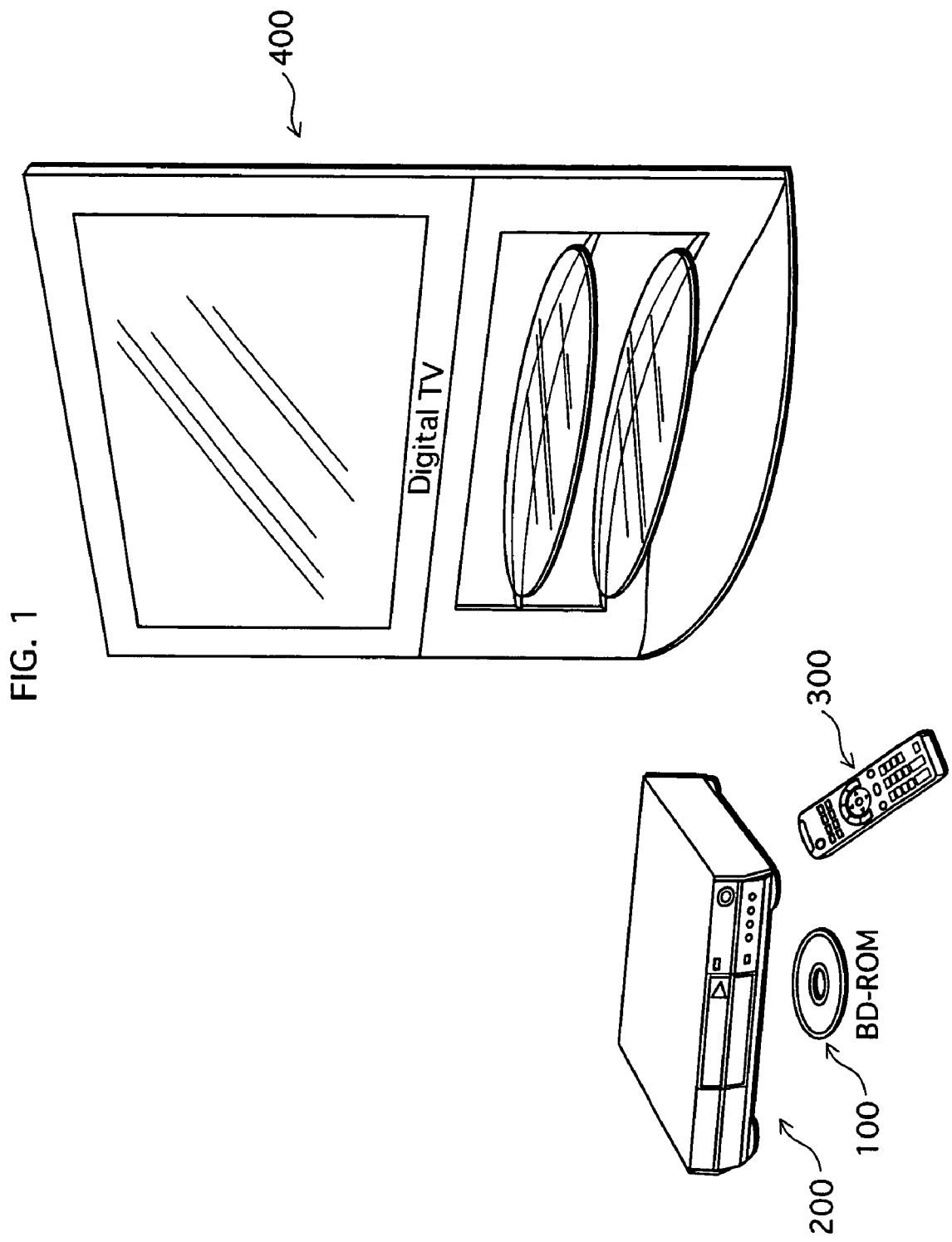
FIG. 1 shows a usage act of a recording medium pertaining to the present invention.

The following describes an embodiment of a playback apparatus of the present invention. Firstly, of the implementation acts of the playback apparatus of the present invention, a usage act is described. FIG. 1 shows a usage act of a playback apparatus of the present invention. In FIG. 1, the playback apparatus of the present invention is a playback apparatus 200 which together with a television 300 and a remote controller 400 forms a home theater system.

A BD-ROM 100 is used to supply movie works in the home theater system formed from the playback apparatus 200, the remote controller 300, and the television 400.

This completes the description of the usage act of the playback apparatus of the present invention.

The following describes the BD-ROM that is a recording medium played by the playback apparatus of the present invention. Disc content supplied to the home theater by the BD-ROM is composed of a plurality of Titles that branch between each other. Each Title is made up of at least one PlayList and a dynamic control procedure that uses the at least one PlayList.

A PlayList is composed of at least one digital stream and a playback path of each digital stream, and is the unit of access on a BD-ROM that has a concept of a "time axis". Since it incorporates a PlayList and a dynamic control procedure, a Title has both the concept of a time axis that is characteristic of digital stream, and the properties of a computer program.

Figure 2:
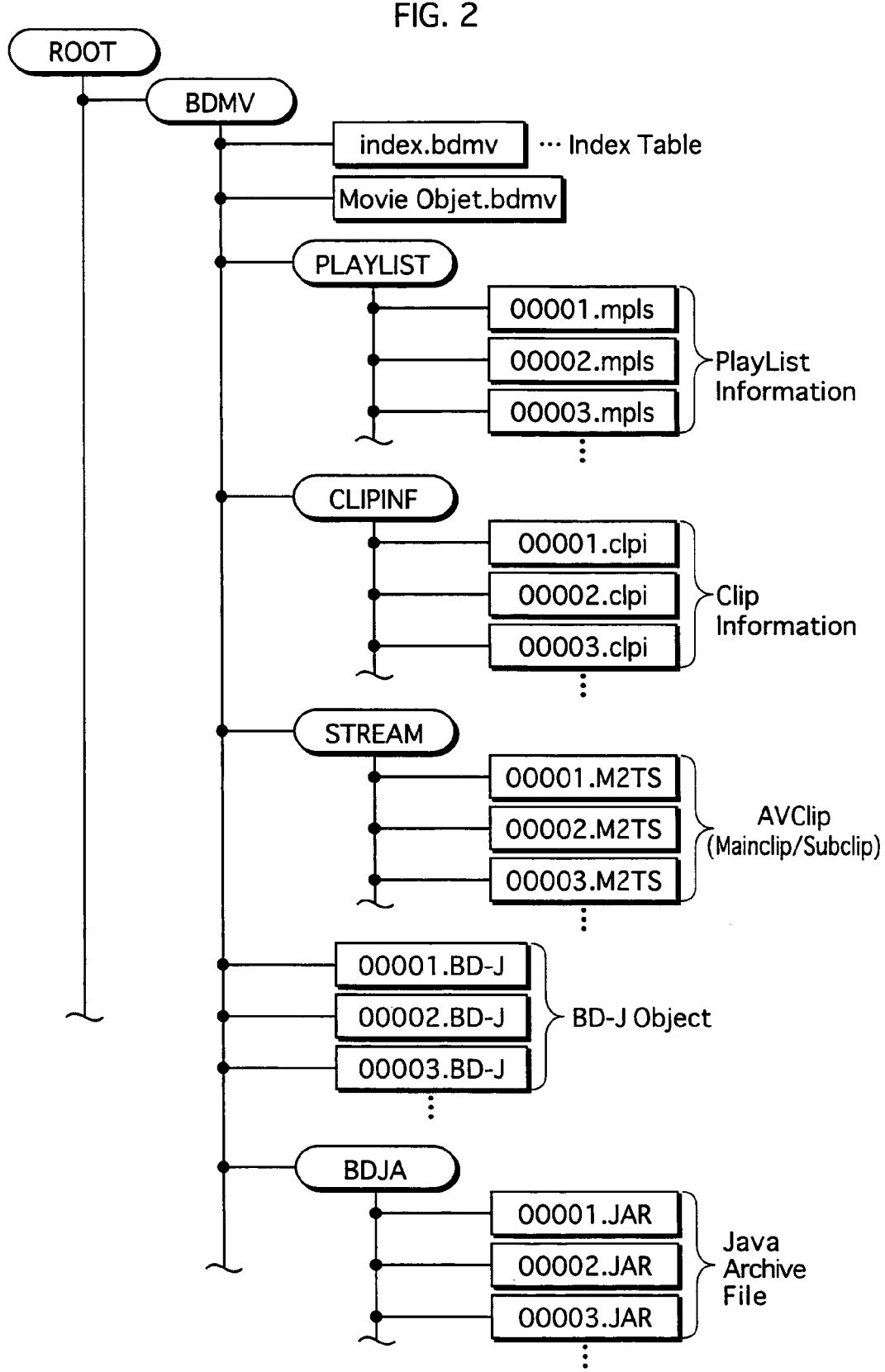
FIG. 2 shows a file/directory structure of a BD-ROM.

FIG. 2 shows a file/directory structure of a BD-ROM. The BD-ROM in FIG. 2 has a BDMV directory below a Root directory.

The BDMV directory has files with the extension "bdmv" (index.bdmv, Movie Object.bdmv), and files with the extension "BD-J" (00001.BD-J, 00002.BD-J, 00003.BD-J). Under the BDMV directory, there are four sub-directories: PLAYLIST, CLIPINF, STREAM, and BDAR directories.

The PLAYLIST directory has files with the extension "mpls" (00001.mpls, 00002.mpls, 00003.mpls).

The CLIPINF directory has files with the extension "clpi" (00001.clpi, 00002.clpi, 00003.clpi).

The STREAM directory has files with the extension "m2ts" (00001.m2ts, 00002.m2ts, 00003.m2ts).

The BDAR directory has files with the extension "jar" (00001.jar, 00002.jar, 00003.jar). As this description shows, the directory structure enables different types of files to be recorded on a BD-ROM.

In FIG. 2, the files with the extension ".m2ts" (00001.m2ts, 00002.m2ts, 00003.m2ts . . . ) contain AVClips that are classified into types such as MainClip and SubClip. A MainClip is a digital stream that is obtained by multiplexing a plurality of elementary streams such as a video stream, an audio stream, a presentation graphics stream and an interactive graphics stream.

A SubClip is a digital stream that corresponds to one elementary stream such as an audio stream, a graphics stream, or a text subtitle stream.

The files with the extension "clpi" (00001.clpi, 00002.clpi, 00003.clpi . . . ) are management information that correspond one-to-one with the AVClips. Since it is management information, Clip information has information such as the encoding format, frame rate and bit rate of the stream in the AVClip, and an EP_map that shows cue locations.

Files with the extension "mpls" (00001.mpls, 00002.mpls, 00003.mpls . . . ) contain PlayList information. PlayList information is information that defines a PlayList with reference to an AVClip. A PlayList is composed of MainPath information, PLMark information and SubPath information.

Figure 3:
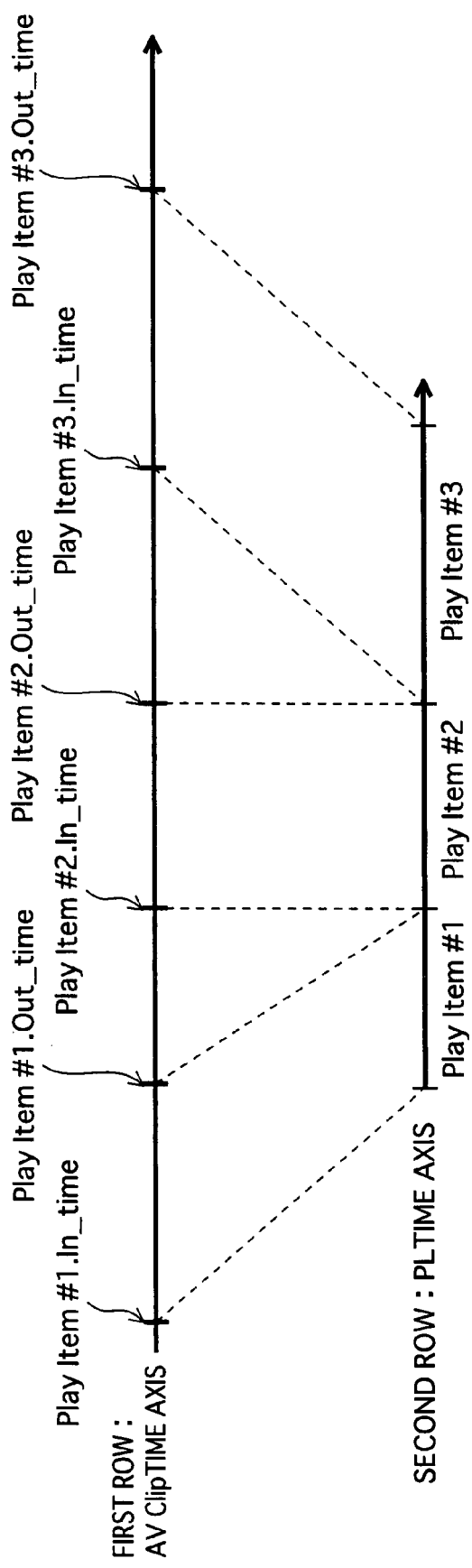
FIG. 3 shows the relationship between an AVClip time axis and a PL time axis.

The MainPath information contains a plurality of pieces of PlayItem information. The PlayItem is a playback period that is defined by specifying In-Time and Out-Time on one or more AVClip axes. An arrangement of a plurality of pieces of PlayItem information defines a PlayList (PL) that is composed of a plurality of playback periods. FIG. 3 shows the relationship between an AVClip and a PL. The first row indicates the time axis of the AVClip, and the second row indicates the time axis of the PL. The PL information includes three pieces of PlayItem information: "PlayItem #1", "PlayItem #2", and "PlayItem #3". The In_times and Out_times of PlayItem #1, #2, and #3 define three playback periods. By arranging the three playback periods, a time axis that is different from the AVClip time axis is defined. That is the PL time axis shown in the second row. As is apparent from this, it is possible, by defining the PlayItem information, to define a time axis that is different from an AVClip time axis.

Figure 4:
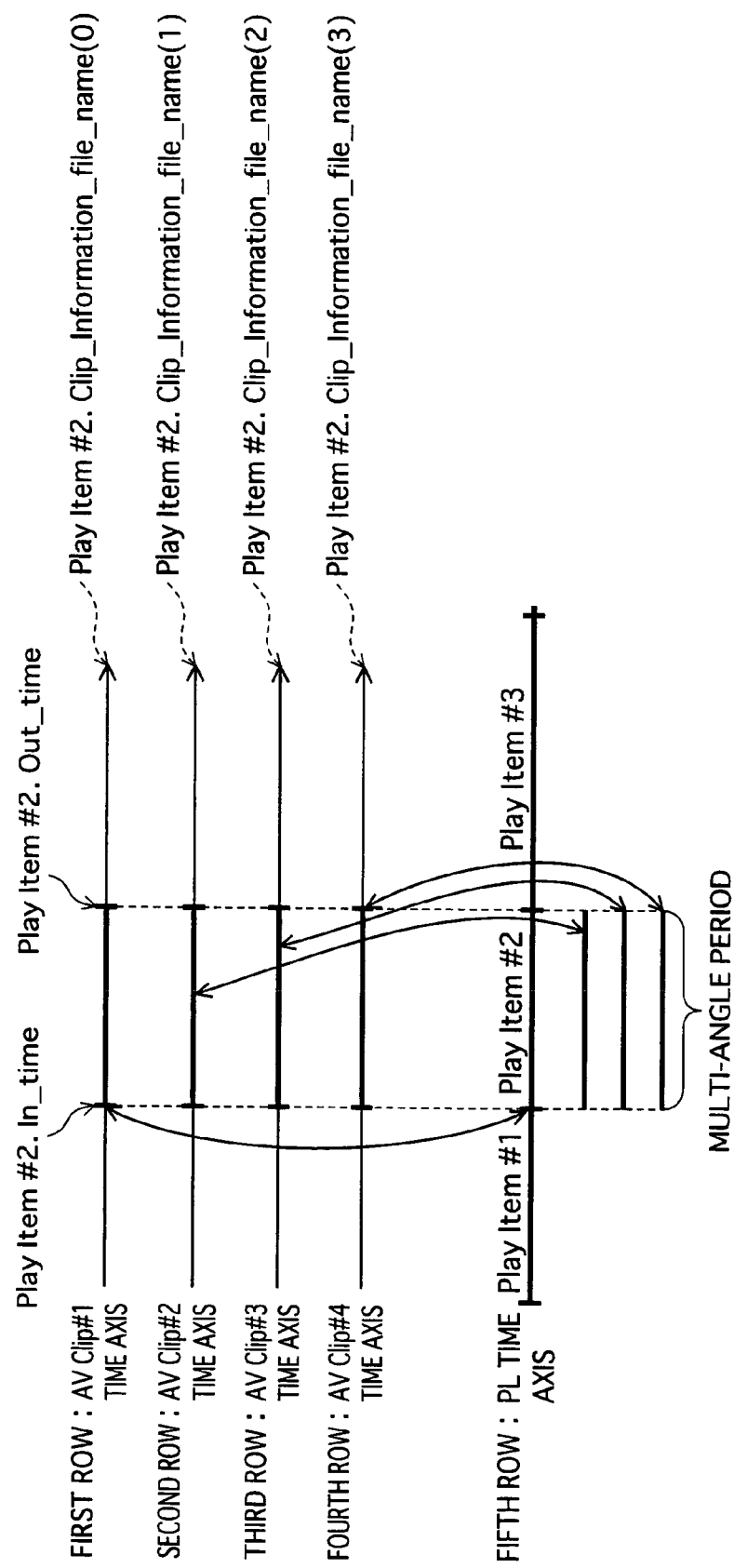
FIG. 4 shows a batch specification achieved by four Clip_information_file_names.

In principle, only one AVClip is specified. However, a plurality of AVClips may be specified by a batch specification. The batch specification is achieved by a plurality of Clip_Information_file_names in the PlayItem information. FIG. 4 shows a batch specification achieved by four Clip_Information_file_names. In FIG. 4, the first to fourth rows indicate four AVClip time axes (time axes of AVClip #1, #2, #3, and #4), and the fifth row indicates a PL time axis. The four time axes are specified by the four Clip_Information_file_names contained in the PlayItem information. With such a construction, four playback periods, which can be selectively played, are defined by the In_times and Out_times contained in the PlayItems. This enables the PL time axis to define a period (what is called a multi-angle period) in which a plurality of switchable angle images are provided.

Figure 5:
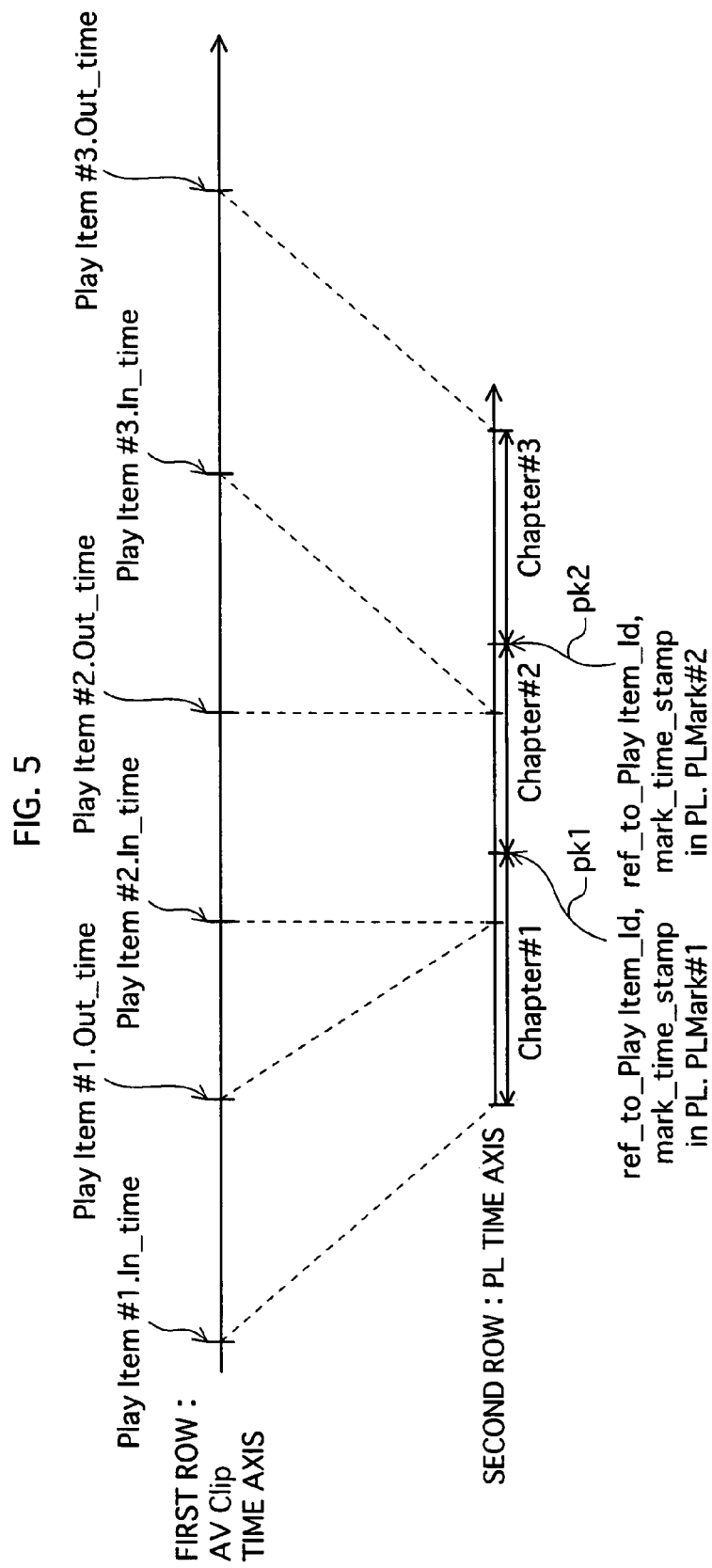
FIG. 5 shows definition of chapters by PLmarks.

The PLMark information is information that specifies, as a chapter, a given period on the PL time axis. FIG. 5 shows definition of chapters by PLmarks. In FIG. 5, the first row indicates the AVClip time axis and the second row indicates the PL time axis. In FIG. 5, arrows "pk1" and "pk2" each indicate a specification of a PlayItem (ref_to_PlayItem_Id) and a specification of a point in time (mark_time_stamp) in a PLMark. With these specifications, three chapters (Chapter #1, #2, #3) are defined on the PL time axis.

Figure 6:
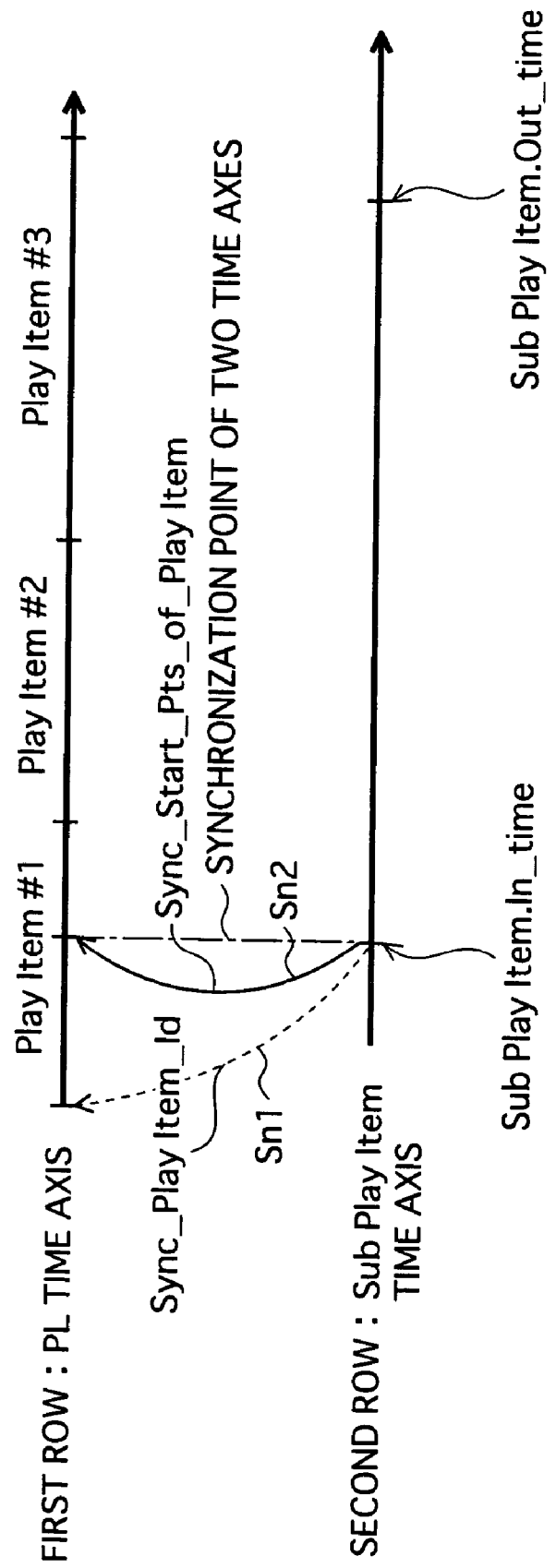
FIG. 6 shows synchronization specification and definition of a playback period on the SubPlayItem time axis.

The SubPath information is information composed of a plurality of pieces of SubPlayItem information. The SubPlayItem information defines a playback period by specifying and an In_Time and an Out_Time on the time axis of the SubClip. The SubPlayItem information is used for a synchronization specification to synchronize a playback period on the SubClip time axis with the PL time axis. With the synchronization specification, the SubClip time axis and the PL time axis proceed in synchronization. FIG. 6 shows how the synchronization specification and definition of a playback period on the SubPlayItem time axis are done. In FIG. 6, the first row indicates the PL time axis, and the second row indicates the SubPlayItem time axis. In FIG. 6, SubPlayItem.IN_time and SubPlayItem.Out_time indicate the start point and end point, respectively, of the playback period. It is seen from this that the playback period is defined also on the SubClip time axis. The Sync_PlayItem_Id corresponding to the arrow Sn1 indicates the synchronization specification for a PlayItem, and Sync_start_Pts_of_PlayItem corresponding to the arrow sn2 indicates specification of a point in time in the PlayItem on the PL time axis.

The PlayList information in BD-ROM is characterized by its ability to define a multi-angle period and a synchronization period, where switching among a plurality of AVClips is possible in the multi-angle period, and having an AVClip synchronized with a SubClip is possible in the synchronization period. The above-described Clip information and PlayList Information are categorized as "static scenario". This is because the Clip information and PlayList Information define a PL that is a static playback unit. This completes the description of the static scenario.

The following describes the "dynamic scenario". The dynamic scenario is scenario data that dynamically defines the playback control of an AVClip. Here, "dynamically" means that the playback control can change in accordance with a status change of the playback apparatus or a key event from the user. BD-ROM presumes two modes as the operation environment for the playback control. The first mode is an operation environment similar to the operation environment of the DVD playback apparatus, and is a command-based execution environment. The second mode is an operation environment of the Java Virtual Machine. Of these two operation environments, the first one is called HDMV mode, and the second one is called BD-J mode. Due to the presence of the two operation environments, the dynamic scenario is written by presuming either of the two operation environments. A dynamic scenario presuming the HDMV mode is called Movie Object, and is defined by the management information. On the other hand, a dynamic scenario presuming the BD-J mode is called a BD-J Object.

First, the Movie Object will be described.
<Movie Object>

Figure 7A:
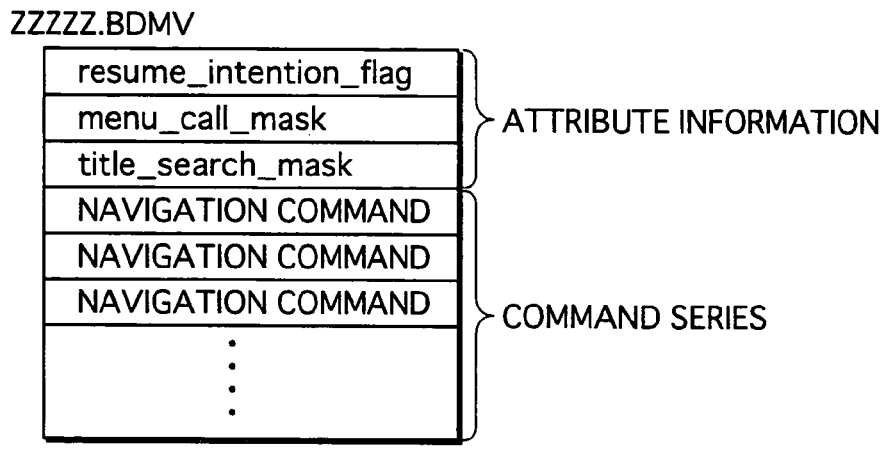
FIG. 7A shows the internal structure of the Movie Object.

The Movie Object is a component of a "Title", and is stored in a file "MovieObject.bdmv". FIG. 7A shows the internal structure of the Movie Object. The Movie Object is composed of attribute information and a command sequence that consists of a plurality of navigation commands.

The attribute information is composed of information that indicates, when MenuCall has been performed, whether or not playback should be resumed after, on the PL time axis, MenuCall is performed (resume_intention_flag), information indicating whether or not the MenuCall should be masked on the PL time axis (menu_call_mask), and information indicating whether or not Title search should be masked (title_search_flag). Since a Movie Object has the properties of both a time axis and program-like control, numerous types of Titles, such as playback of a main feature, are written in a Movie Object.

The navigation command sequence is a command sequence for realizing conditional branching, setting of the status register in the playback apparatus, obtaining a value set in the status register, and so on. The following are the commands that can be written in Movie Objects.
PlayPL Command Format: PlayPL (1st argument, 2nd argument)

As the 1st argument, a PlayList number can be used to indicate a PL to be played back. As the 2nd argument, a PlayItem contained in the PL, a given time in the PL, a Chapter, or a Mark can be used to indicate a playback start position.

A PlayPL function that specifies a playback start position on the PL time axis using a PlayItem is called PlayPLatPlayItem( ).

A PlayPL function that specifies a playback start position on the PL time axis using a Chapter is called PlayPLatChapter( ).

A PlayPL function that specifies a playback start position on the PL time axis using time information is called PlayPLatSpecifiedTime( ).
JMP Command Format: JMP argument The JMP command is used for a branch that discards a currently executed dynamic scenario and executes a branch destination dynamic scenario that is specified by the argument. There are two types of JMP command: a direct reference type that directly specifies the branch destination dynamic scenario; and an indirect reference type that indirectly refers to the branch destination dynamic scenario.

The description format of the navigation command in the Movie Object resembles that in DVD. For this reason, disc content can be transplanted efficiently from a DVD onto a BD-ROM. The Movie Object is a prior art disclosed in the following International Publication. For details, refer to the International Publication.

International Publication WO 2004/074976

This completes the description of the Movie Object. The following describes the BD-J object.
<BD-J Object>

Figure 7B:
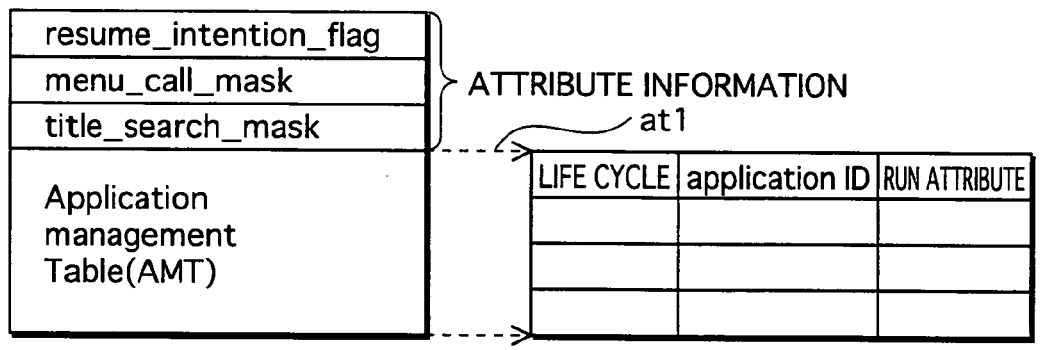
FIG. 7B shows the internal structure of a BD-J object.

The files with the extension BD-J (00001.BD-J, 00002.BD-J, 00003.BD-J) each compose a BD-J object. A BD-J object is a dynamic object in BD-J mode, which is written in a Java programming environment. FIG. 7B shows the internal structure of a BD-J object. As shown in FIG. 7B, the BD-J object consists of attribute information identical to that of the Movie Object, and an application management table. The BD-J object is approximately the same as the Movie Object in that it includes the attribute information. The difference from the Movie Object is that a command is not written directly in the BD-J Object. That is to say, in the Movie Object, the control procedure is written directly in the navigation commands. In contrast, the BD-J Object indirectly defines the control procedure by allowing a specification for a Java application that uses the Title as a life cycle to be set in an application management table. Such an indirect definition provides an efficient sharing of a common control procedure, allowing a plurality of Titles to share the common control procedure.

Figure 7C:
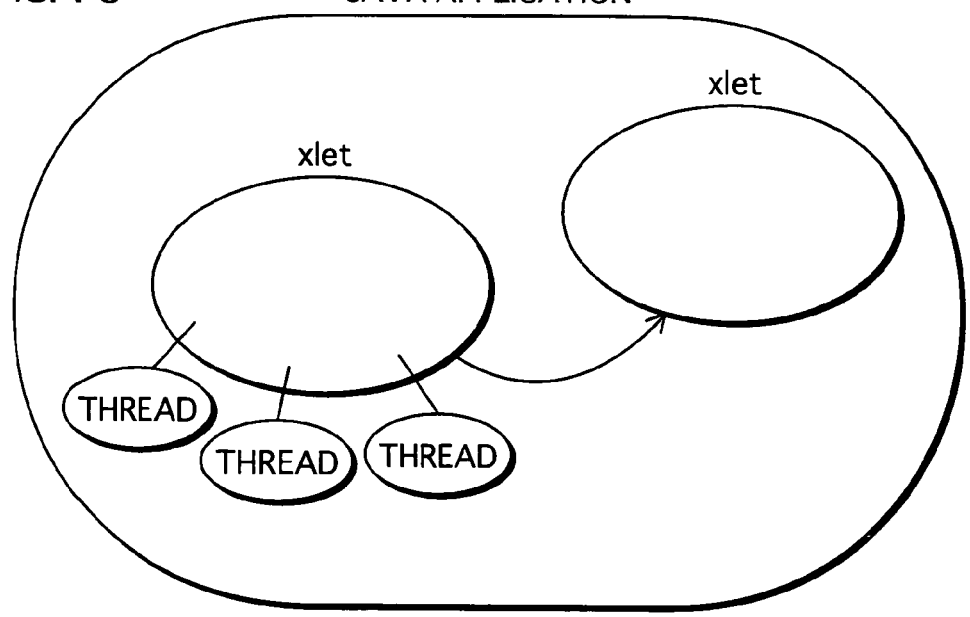
FIG. 7C shows the internal structure of a Java application.

FIG. 7C shows the internal structure of a Java application. The application shown in FIG. 7C includes one or more xlet programs that are loaded in the heap area (also called work memory) of the virtual machine. The application is composed of the xlet programs loaded in the work memory, and threads. This completes the description of the structure of the application.

The substantial body of the Java application is Java archive files (00001.jar, 00002.jar) that are stored in the BDAR directory under the BDMV directory. The following describes the Java archive files.

Figure 8A:
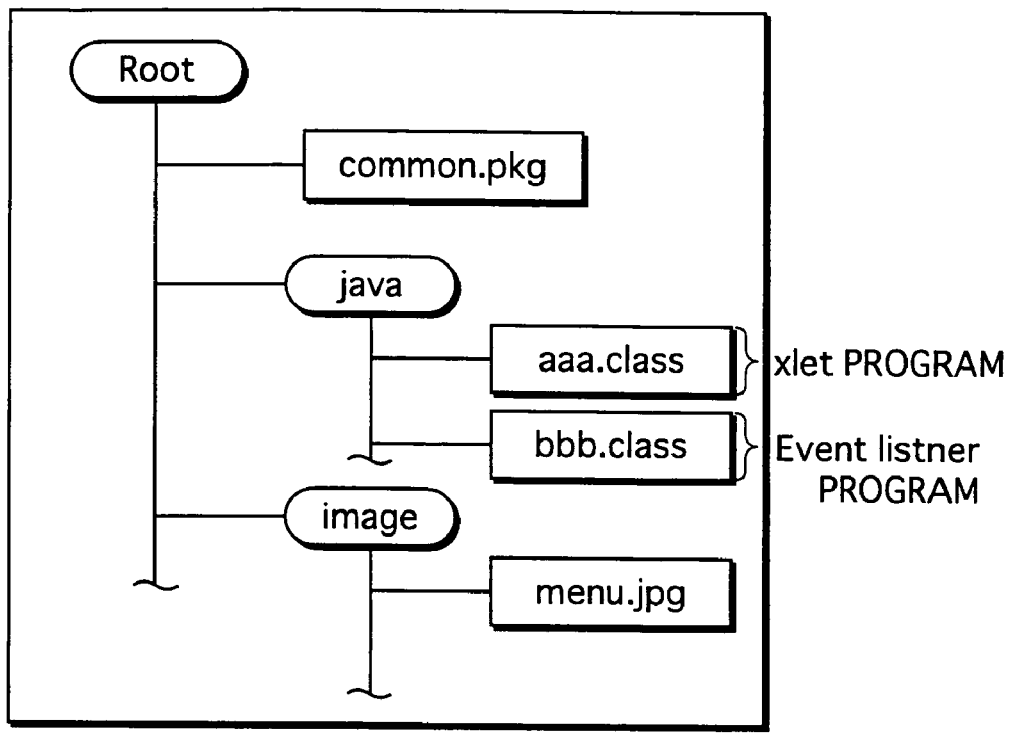
FIG. 8A shows programs and data stored in Java archive files.

The Java archive files (00001.jar, 00002.jar) each contain a program that composes a Java application, and data. FIG. 8A shows the programs and data stored in the archive files. The data shown in FIG. 8A has been configured by the Java archive by arranging a plurality of files into the directory structure indicated by the oval frames. The directory structure indicated by the oval frames is composed of the Root, java, and image directories. The common.pkg is arranged to be under the Root directory, the class files (aaa.class, bbb.class) are arranged to be under the java directory, and menu.jpg is arranged to be under the image directory. The Java archive files are each formed by the Java archive by combining such files into one. Such data is expanded when it is read from the BD-ROM, and is treated as files arranged in the directories in the cache. The five-digit number "xxxxx" attached to each Java archive file name indicates an ID of an application (applicationID). When such a Java archive file has been read to a cache, it is possible to extract programs and data that constitute an arbitrary Java application by referring to the number attached to the file name.

In the Java archive file, xlet programs are arranged into one file.

An xlet program is a Java program that can use a JMF (Java Media Framework) interface. The xlet program is composed of a plurality of functions such as EventListener for receiving key events, and executes processing in correspondence with the received key events in accordance with a format such as JMF.

Figure 8B:
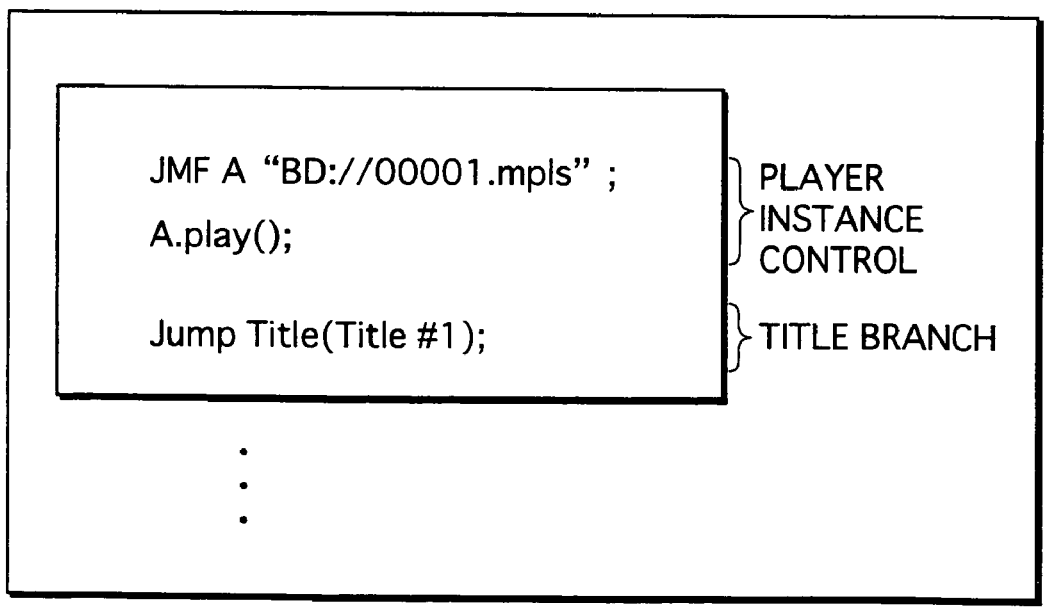
FIG. 8B shows an example of an xlet program.

FIG. 8B shows an example of an xlet program. JMF A "BD://00001.mpls"; is a method that instructs the Java virtual machine to generate a player instance to play a PL. A.play is a method that instructs playback of the JMF player instance. The JMF player instance is generated based on a JMF library. The xlet program is not limited to being written as a JMF for a PL of the BD-ROM, but may be written as a JMF applicable to entire content that has a time axis. This ability to write in this way encourages software houses dealing with Java programming to create BD-J objects.

Jump Title( ); in FIG. 8B is a call for a function API. This function API instructs the playback apparatus to branch to another Title (Title#1 in FIG. 8B). This function API (ApplicationInterface) is supplied by the BD-ROM playback apparatus. In addition to the JumpTitle command, the xlet program can instruct the BD-ROM playback apparatus to execute processes that are unique to the BD-ROM playback apparatus by writing calls for function APIs.

PL playback in BD-J mode is stipulated by the JMF interface. Since the JMF player instance determines the PL time axis, the Title time axis is determined based on the Title that includes this JMF player instance. Furthermore, branches from Title to Title in BD-J mode are stipulated by a call of a JumpTitleAPI. The JumpTitleAPI call determines the end point of the Title. Therefore, an application that includes such a JMF player instance and JumpTitleAPI call governs starting and ending of Titles in BD-J mode.

The above is a description of dynamic scenarios in BD-J mode. A Title that incorporates both PL playback and program-like control is defined by a dynamic scenario in this BD-J mode. It should be noted here that although in the present embodiment programs and data that constitute the application are stored in Java archive files, such programs and data may be stored in LZH files or zip files.

<Title Time Axis>

Figure 9A:
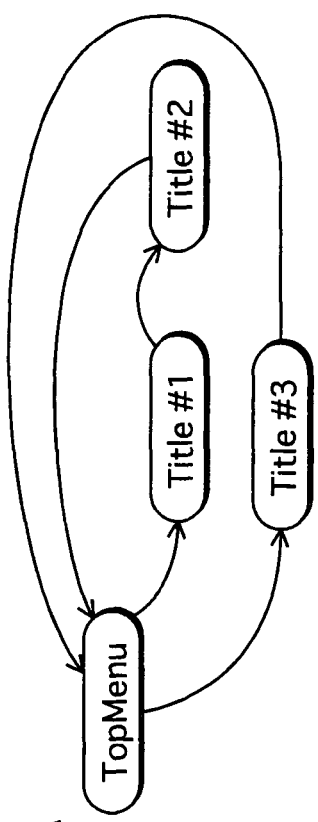
FIG. 9A shows a series of Titles: a top menu, Title#1 and Title#2.
Figure 9B:
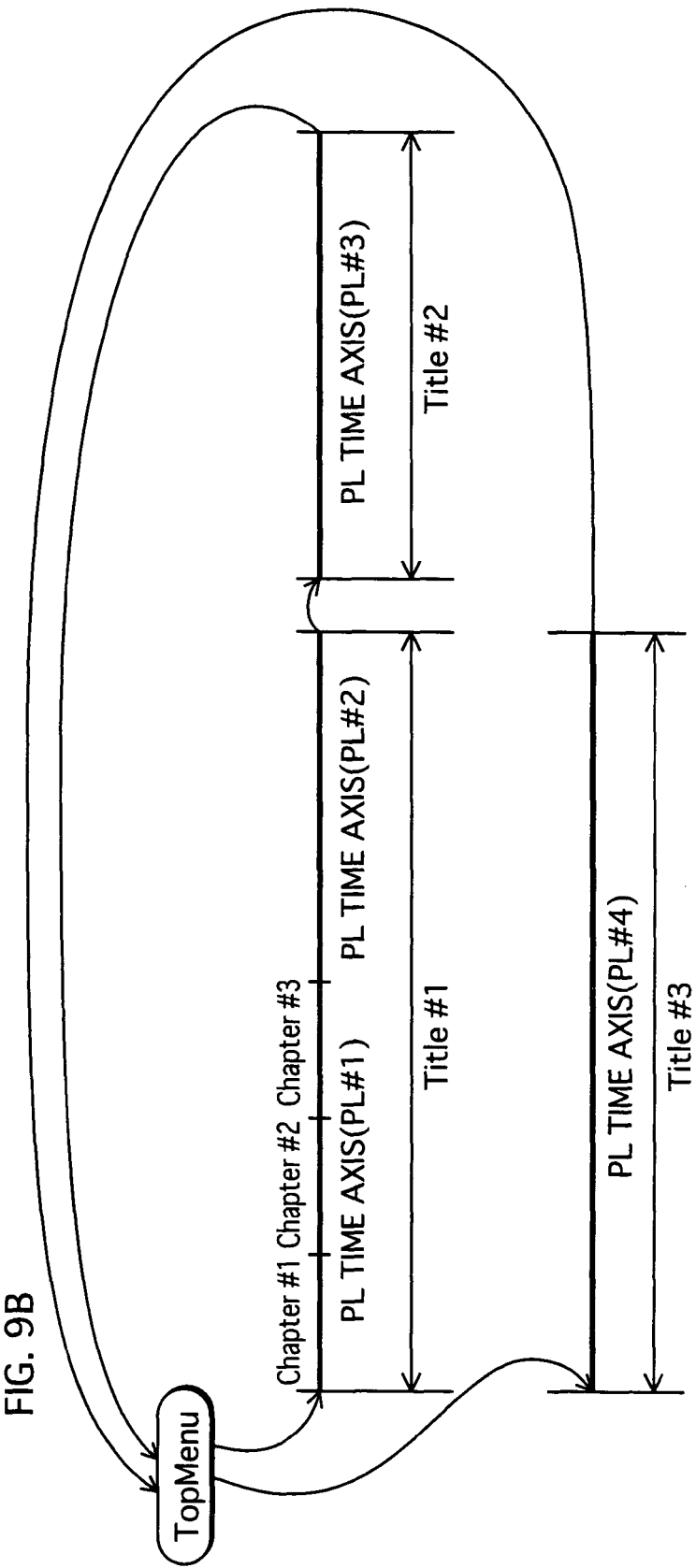
FIG. 9B shows a time axis that is the time axes of Title#1 and Title#2 added together.

Having completed the description of the static scenarios and dynamic scenarios that compose the Titles, the following describes what kind of time axis these define. The time axis defined by a Title is called a "Title time axis". The Title time axis is composed of PLs, playback of the PLs being instructed by Movie objects or BD-J objects. Titles such as that of FIG. 9A are given here as one example. These Titles are a series of Titles: top menu, Title#1, Title#2, top menu, top menu, Title#3, top menu. Of these Titles, if Title#1 instructs playback of PlayList#1 and PlayList#2, Title#2 instructs playback of PlayList#3, and Title#3 instructs playback of PlayList#4, Title#1 has a time axis that corresponds the total of time axes of PlayList#1 and PlayList#2, as shown in FIG. 9B. Similarly, Title#2 has a time axis that corresponds to the time axis of PlayList#3, and Title#3 has a time axis that corresponds to the time axis of PlayList#4. Although seamless playback is guaranteed on each PL time axis in these Title time axes, it is not necessary to guarantee seamless playback in the Title time axes. To operate Java applications, it is necessary to define a period for which Java applications may exist in the work memory of the virtual machine (service period) on the Title time axis. To operate Java applications in BD-J mode, it is necessary to define a service period of Java applications on a time axis on which the applications mutually branch. Defining of these service periods must be kept in mind when programming for BD-ROMs.

Finally, a description is given of IndexTable contained in index.bdmv. The IndexTable is a table in which Title numbers, Movie Objects and BD-J objects are in correspondence, and is an indirect reference table referred to when branching from dynamic scenario to dynamic scenario. The IndexTable is composed of a plurality of Index that correspond respectively to a plurality of labels. Written in each Index is an identifier of a dynamic scenario corresponding to the label. Referring to this IndexTable realizes branching without strict differentiation between Movie objects and BD-J objects. The IndexTable is disclosed in the following International Publication. For details, refer to the International Publication.

International Publication WO 2004/025651 A1

This completes the description of the files recorded on the BD-ROM.

<Application Management Table>

As described above, applications that have JMF player instances and JumpTitleAPI calls govern the Title time axis. When other applications that do not have JMF player instance and JumpTitleAPI call are run, it is important to clearly define, on the time axis, the start point at which service by an application starts and the end point at which service by the application ends. In the present embodiment, the start through to the end of service of a service by an application is defined as the "life" of an application. The information for defining the life of applications exists in application management tables in BD-J objects. The following describes the application management table in more detail.

The application management table (AMT) is information showing applications that may exist in the work memory of the virtual machine, represented with the Title time axis of each Title. Living in the work memory refers to the xlet programs composing the application having been loaded in the work memory such that the application can be executed by the virtual machine. The broken line arrow at1 in FIG. 7B shows a closeup of the internal structure of the application management table. As shown in this internal structure, the application management table consists of "life cycle", "application ID" which shows an application that has a life cycle bound to the Title, and "run attribute" of the application.

Figure 10:
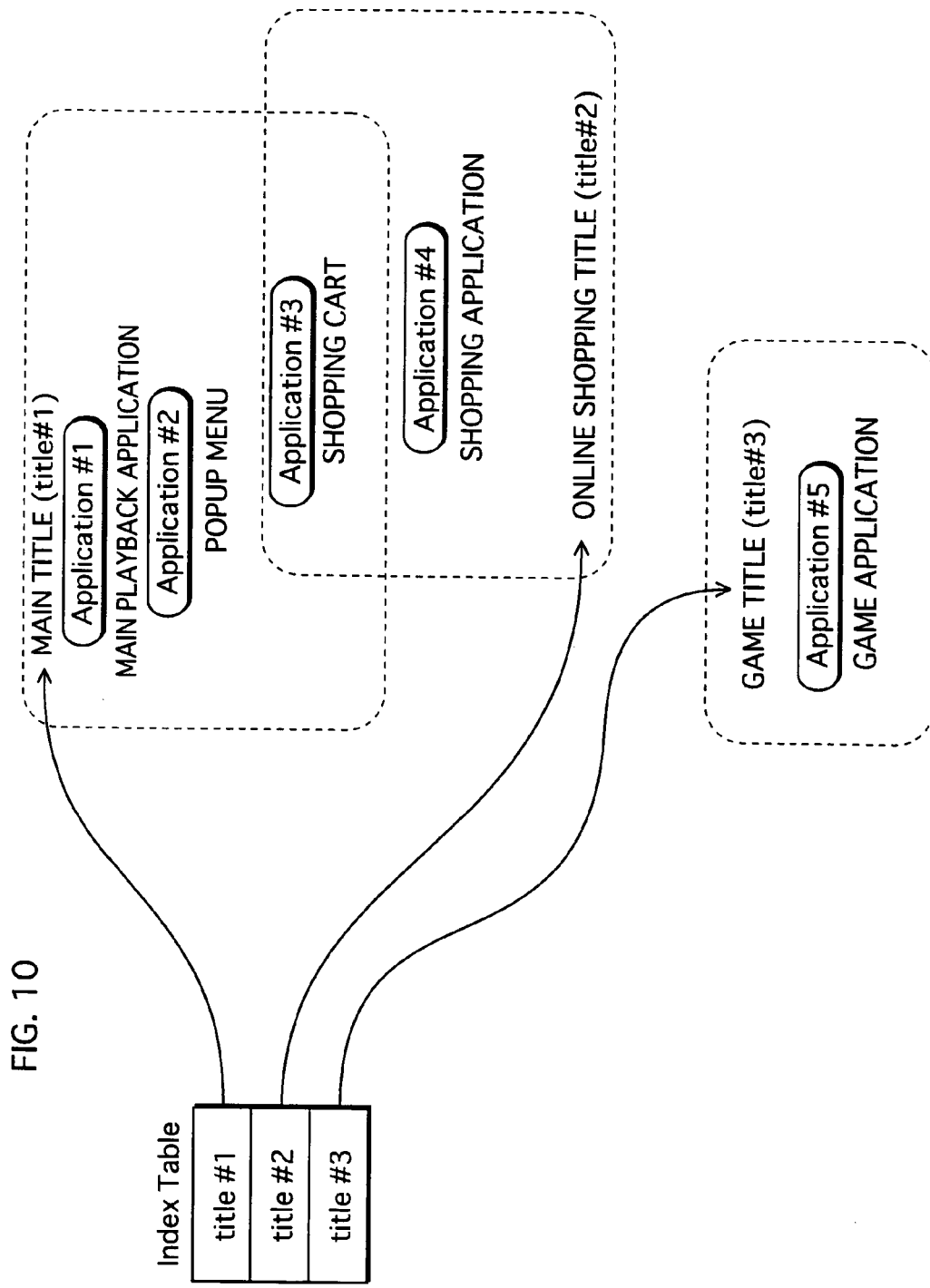
FIG. 10 shows a disc content that includes three Titles: a main Title; an online shopping Title; and a game Title.

The following describes the life cycle is written in the application management table, using a specific example which includes a disc content that will be implemented in the near future, as the material. The disc content used as the material includes three different types of Titles: a main Title (Title#1) that constitutes a main image work; an online shopping Title (Title#2) that constitutes online shopping; and a game Title (Title#3) that constitutes a game application. FIG. 10 shows a disc content that includes three Titles: a main Title; an online shopping Title; and a game Title. The left-hand side of FIG. 10 shows an IndexTable, and the right-hand side of FIG. 10 shows three Titles.

The broken-line frames on the right-hand side of FIG. 10 show belonging relationships that indicate Titles to which each application belongs. Of the three Titles, Title#1 is composed of application #1, application #2, and application #3. Also, Title#2 is composed of application #3 and application #4, and Title#3 is composed of application #5. FIG. 11 shows an example of playback images of the three Titles shown in FIG. 10. In these playback images of the three Titles, video (cart cr1) 1 that simulates a shopping cart exists in the main Title of FIG. 11A and the online shopping Title of FIG. 11B, while the cart video does not exist in the game Title of FIG. 11C. Since the cart cr1 must be shown in both the main Title and the online shopping Title, application#3, which is a cart program, is run with both Title#1 and Title#2. Besides the described cart, other applications that run with a plurality of Titles in this way include an agent application that simulates a mascot that appears in the movie, and a menu application that displays menus in accordance with menu call operations.

The belonging relationships shown by the broken-line frames of FIG. 10 appear as in FIG. 12A when expressed with a graph. In FIG. 12A, the horizontal axis indicates a Title time axis, and life cycles of applications are arranged in the vertical axis direction. Here, application #1 and application #2 belong only to Title#1, and therefore the life cycles of these applications are confined to Title#1. Application #4 belongs only to Title#2, and therefore the life cycle of application #4 is confined to Title#2. Application #5 belongs only to Title#3, and therefore the life cycle of application #5 is confined to Title#3. Application #3 belongs to Title #1 and Title #2, and therefore the life cycle of application #3 extends across Titles #1 and #2. The life cycles shown in FIG. 12A appear as in FIG. 12B when written in the application management tables for Titles #1, #2, and #3. If the application management tables are written in this way, application #1, application #2, and application #3 are loaded into the work memory when the playback of Title#1 is started. Then, when the playback of Title#2 is started, applications #1 and #2 are deleted from the work memory, causing only application #3 to remain. Similarly, it is possible to perform control so that application #4 is loaded into the work memory when the playback of Title#2 is started, and that applications #3 and #4 are deleted from the work memory when the playback of Title#3 is started.

Further, it is possible to perform control so that application #5 is loaded into the work memory while Title#3 is played, and that application #5 is deleted from the work memory when the playback of Title#3 ends.

With this construction, the number of times the applications are loaded into the work memory is minimized. This is because if a branch between Titles occurs, applications that live in both the branch origin and branch destination may be stored in the work memory, and applications that do not live in the branch origin and live in only the branch destination may be loaded into the work memory. Such a construction that decreases the number of times data is loaded enables an unboundary application, which is such an application that does not make one conscious about a boundary between Titles, to be achieved.

The following describes the run attributes of the applications. The run attributes include: "AutoRun" indicating that the application with this attribute is automatically run; "Persistent" indicating that the application with this attribute is not the target of the automatic run but may be stored in the work memory of the virtual machine; and "Suspend" indicating that the application with this attribute is stored in the work memory of the virtual machine but is not assigned the CPU power.

AutoRun shows a life cycle indicating that when a corresponding Title branches, the application is simultaneously loaded into the work memory and executed. When a Title branches to another Title, the management body (application manager) that manages the applications loads an application which lives in the branch destination Title and whose run attribute has been set to AutoRun, into the work memory of the virtual machine, and executes the application. This means that the application is automatically run as the Title branches. Applications that set the run attribute to AutoRun include applications that have JMF player instance and JumpTitleAPI call. This is because it is this kind of application that governs the Title time axis, and the concept of the Title time axis will become blurred if this kind of application is not run automatically.

The run attribute "Persistent" is a continuous attribute, and indicates that the status of the application in the branch origin Title is maintained. This is also an attribute that indicates that the application can be loaded into the work memory. An application whose run attribute is set to "Persistent" can be called from another application. When an application is called from another application that is being run, the management body (application manager) judges whether or not the application ID of the application is written in the application management table and whether or not the run attribute of the application is set to "Persistent". If it is set to "Persistent" the management body loads the application into the work memory. If the application ID of the call destination application is not written in the application management table, the management body does not load the application into the work memory. Only an application whose run attribute is set to "Persistent" can be called from another application.

"Persistent" is a default run attribute that is assigned when the run attribute is not clearly specified. As a result, when the run attribute of an application is "--" indicating no specification, it means that the run attribute of the application is "Persistent".

Figures 13A, 13B:
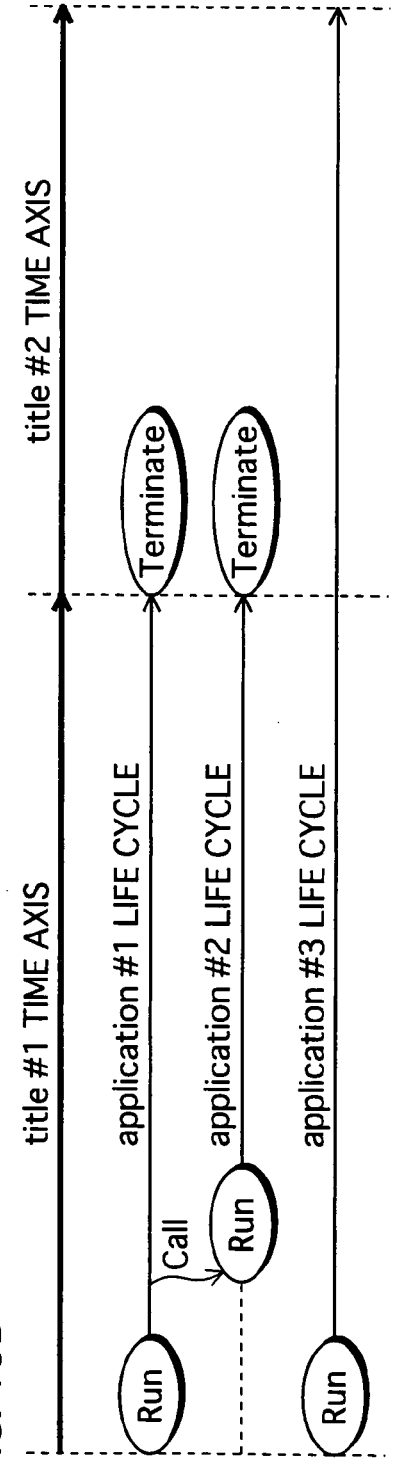
FIG. 13A shows an example of setting of run attributes.
FIG. 13B shows an application (application#2) that is not run until a call is received for the application from another application.

The following describes how the run attributes are written in the applications of FIG. 11. FIGS. 13A and 13B are an example of settings of run attributes for the three applications of FIG. 12. Of the three applications shown in FIG. 12, application#2 does not run unless there is an application call from another application as shown in FIG. 13B. The remaining application#1 and #3 run automatically simultaneously with Title#1. In this case, the run attributes of the applications are set in the application management table such that application#1 and application#3 have the run attribute "AutoRun", and application#2 has the run attribute "Persistent". With these settings, application#1 and application#3 are automatically loaded into the work memory and executed when Title#1 is branched to. On the other hand, since it has the run attribute "Persistent", application#2 is interpreted as having a negative meaning that application#3 is an application that may be loaded into the work memory of the virtual machine.

Hence, application#2 is not loaded into the work memory of the virtual machine and executed unless there is a call from applicaton#1. With the described life cycles and run attributes, the number of applications that may run on the virtual machine is limited to no more than four, and the total number of threads is limited to no more than 64. This ensures that the applications run stably.

The following describes "Suspend".

"Suspend" indicates that the application with this attribute is assigned a resource but is not assigned CPU power. The attribute "Suspend" is effective, for example, in achieving the process of passing a side path while a game Title is executed. FIGS. 14A and 14B show an example of when "Suspend" is effective. As shown in FIG. 14B, there are three Titles (Title#1, Title#2, Title#3), of which Title#1 and Title#3 execute game applications, and the intervening Title#2 is a side path, and implements video playback. Execution of the game is suspended because it is necessary to implement video playback with the side path. Since the game application counts the score and the like during the game, it is preferable that the stored values of the resources are maintained before and after Title#2. In this case, the application management table is written such that the game applications are suspended at the start point of Title#2, and application#2 resumes at the start point of Title#3. This means that resources are assigned to application#2 during Title#2, and therefore the stored values of the resources are maintained. However, since CPU power is not assigned to application#2, application#2 is not executed by the virtual machine. This enables processing for executing the side path processing to be realized during execution of the game Titles.

FIG. 15 shows combinations of the three run attributes (Persistent, AutoRun, and Suspend) and three possible statuses of the previous Title (Not Run, Running, and Suspend). If the previous status is "Not Run" and the run attribute is "AutoRun", the application is run in the branch destination Title.

If the previous status is "Not Run" and the run attribute is "Persistent" or "Suspend", no operation is performed, and the status is maintained.

If the previous status is "Running" and the run attribute is "Persistent" or "AutoRun", no operation is performed, and the status in maintained.

If the run attribute is set to "Suspend", the status of the application is suspended. If the previous status is "Suspend" and the run attribute of the branch destination Title is "Suspend", "Suspend" is maintained. If the previous status is "Suspend" and the run attribute of the branch destination Title is "Persistent" or "AutoRun", the application is resumed in the branch destination Title. Defining life cycles and run attributes in the application management table makes it possible to perform a synchronization control to run a Java application during a Title playback period. This enables various applications to be provided that cause images to be played and programs to be executed. This completes the description of the recording medium. The following describes the playback apparatus of the present invention.

Figure 16:
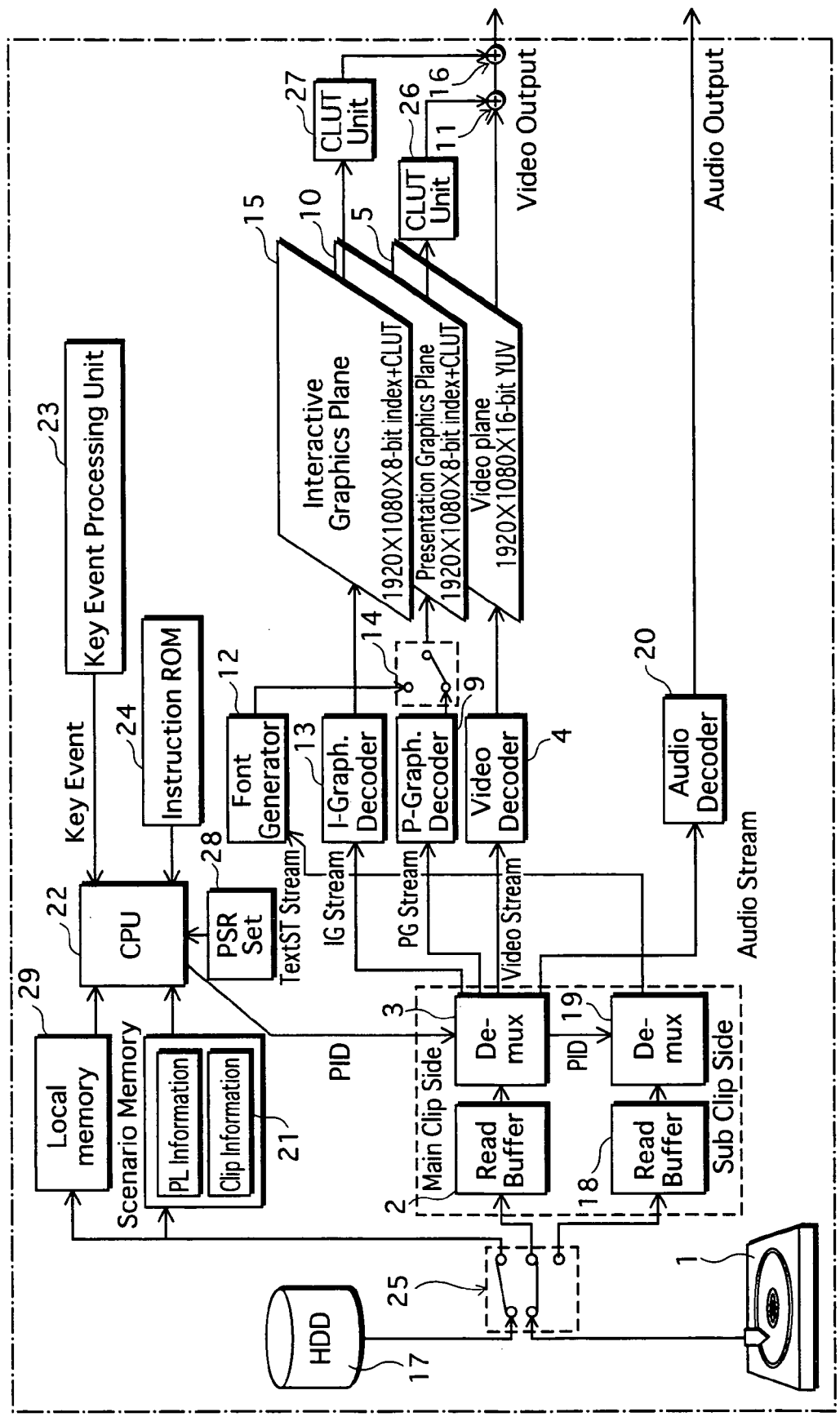
FIG. 16 shows the internal structure of the playback apparatus of the present invention.

FIG. 16 shows the internal structure of the playback apparatus of the present invention. The playback apparatus of the present invention is industrially manufactured based on the internal structure shown in FIG. 16. The playback apparatus of the present invention is mainly composed of two parts: a system LSI; and a drive apparatus. The industrial manufacturing is achieved by mounting the parts into the cabinet and on the board of the apparatus. The system LSI is an integrated circuit that includes various processing units for performing the functions of the playback apparatus. The playback apparatus manufactured in such a manner includes a BD-ROM drive 1, a read buffer 2, a demultiplexer 3, a video decoder 4, a video plane 5, a P-graphics decoder 9, a presentation graphics plane 10, a combining unit 11, a font generator 12, an I-graphics decoder 13, a switch 14, an interactive graphics plane 15, a combining unit 16, an HDD 17, a read buffer 18, a demultiplexer 19, an audio decoder 20, a scenario memory 21, a CPU 22, a key event processing unit 23, an instruction ROM 24, a switch 25, a CLUT unit 26, a CLUT unit 27, a PST set 28, and a local memory 29.

The BD-ROM drive 1 performs loading/ejecting of a BD-ROM, and accessing of the BD-ROM.

The read buffer 2 is a FIFO memory in which TS packets read from the BD-ROM are stored in the First-In-First-Out manner.

The demultiplexer (De-mux) 3 extracts TS packets from the read buffer 2, and converts the TS packets into PES packets. The demultiplexer 3 outputs PES packets, out of the PES packets obtained by the conversion, that have PIDs set by the CPU 22, to any of the video decoder 4, the audio decoder 20, the P-graphics decoder 9, and the I-graphics decoder 13.

The video decoder 4 decodes a plurality of PES packets, which are output from the demultiplexer 3, into pictures of anon-compression format, and writes the pictures onto the video plane 5.

The video plane 5 is a plane for storing non-compression format pictures. The plane is a memory area in the playback apparatus for storing pixel data of one screen. If a plurality of planes are provided in the playback apparatus, and the pixels of the data stored in each plane are added to the pixels of the data stored in other planes before video is output, video that is a combination of a plurality of video data can be output. The resolution of the video plane 5 is 1920×1080. The picture data stored in the video plane 5 is composed of pixel data that is represented in 16-bit YUV values.

The P-graphics decoder 6 decodes a presentation graphics stream read from the BD-ROM or the HDD 17 into non-compression graphics, and writes the non-compression graphics onto the presentation graphics plane 10. The decoding of the graphics stream results in a subtitle appearing on the screen.

The presentation graphics plane 10 is a memory area having the size of one screen, and is able to store non-compression graphics of one screen. The resolution of the presentation graphics plane 10 is 1920×1080. Each pixel of the non-compression graphics stored in the presentation graphics plane 10 is represented by an 8-bit index color. The non-compression graphics stored in the presentation graphics plane 10 are displayed after the index color is converted using a CLUT (Color Lookup Table).

The combining unit 11 combines the non-compression picture data (i) with the data stored in the presentation graphics plane 10.

The font generator 12 expands the text code, which is contained in the text ST stream, into bit maps using character fonts.

The I-graphics decoder 13 decodes an interactive graphics stream, which is read from the BD-ROM or the HDD 17, into non-compression graphics, and writes the non-compression graphics onto the interactive graphics plane 15.

The switch 14 selectively writes, onto the presentation graphics plane 10, either the font sequence generated by the font generator 12 or the graphics obtained as a result of the decoding by the P-graphics decoder 9.

The interactive graphics plane 15 stores the non-compression graphics that are obtained as a result of the decoding by the I-graphics decoder 13.

The combining unit 16 combines the data stored in the interactive graphics plane 10 with a composite image (a combination of the non-compression picture data and the data stored in the presentation graphics plane 7) output form the combining unit 8.

The HDD 17 is an internal medium that stores therein SubClips, Clip information, and PlayList information downloaded via a network or the like. This PlayList information in the HDD 17 differs in that it can specify Clip information whether the Clip information exists on the BD-ROM or in the HDD 17. For this specification, the PlayList information in the HDD 17 need not specify a file on the BD-ROM by a full path. This is because the playback apparatus recognizes the HDD 17 together with the BD-ROM as one virtual driver (called a virtual package). Therefore, with a five-digit value, which is a file body of a file storing Clip information, specified therein, the Clip_Information_file_name is the PlayItem information and the Clip_Information_file_name in the SubPlayItem information are used to specify an AVClip on the HDD 17 or the BD-ROM. Reading data stored in the HDD, and combining this dynamically with the data stored in the BD-ROM can produce various playback patterns.

The read buffer 18 is a FIFO memory, and stores TS packets read from the HDD 17 in a First-In-First-Out manner.

The demultiplexer (De-MUX) 19 extracts TS packets from the read buffer 18, and converts the TS packets into PES packets. The demultiplexer 19 outputs, out of the PES packets obtained by the conversion, PES packets that have desired streamPIDs, to the font generator 12.

The audio decoder 20 decodes PES packets output from the demultiplexer 19, and outputs the audio data in the non-compression format.

The scenario memory 21 stores the current PL information and the current Clip information. The current PL information is a piece of PL information that is a current target of processing, among a plurality of pieces of PL information recorded on the BD-ROM. The current Clip information is a piece of a Clip information that is a current target of processing, among a plurality of pieces of Clip information recorded on the BD-ROM.

The CPU 22 executes the software stored in the instruction ROM 24 and controls the entire playback apparatus.

The key event processing 23 outputs key events for performing operations in response to key operations with respect to the remote controller or the front panel of the playback apparatus.

The instruction ROM 24 stores software that defines the control by the playback apparatus.

The switch 25 is used to selectively enter data, which has been read from the BD-ROM or the HDD 17, into any of the read buffer 2, the read buffer 18, the scenario memory 21, and the local memory 29.

The CLUT unit 26 converts the index color of the non-compression graphics stored in the video plane 5, into the Y, Cr, and Cb values.

The CLUT unit 27 converts the index color of the non-compression graphics stored in the interactive graphics plane 15, into the Y, CR, and Cb values.

The PSR set 28 is a register embedded in the playback apparatus, and is composed of 64 Player Status Registers (PSR) and 4,096 General Purpose Registers (GPR). Among the values set in the Player Status Registers (the set values are referred to as PSRs), PSR4 to PSR8 are used to represent a current playback position.

The PSR 4 is set to a value ranging from 1 to 100 to indicate a Title to which the current playback position belongs, and is set to a value 0 to indicate that the current playback position belongs to the top menu.

PSR5 is set to a value ranging from 1 to 999 to indicate a Chapter number of a Chapter to which the current playback position belongs, and is set to a value 0xFFFF to indicate that Chapter numbers are invalid in the playback apparatus.

PSR6 is set to a value ranging from 0 to 999 to indicate a PL number of a PL (current PL) to which the current playback position belongs.

PSR7 is set to a value ranging from 0 to 255 to indicate a PlayItem number of a PlayItem (current PlayItem) to which the current playback position belongs.

PSR8 is set to a value ranging from 0 to 0xFFFFFFFF to indicate the current playback position (current PTM (Presentation TiMe)) using the temporal accuracy of 45 KHz. With the above-described PSR4 to PSR8, it is possible to identify the current playback position.

Figures 17A, 17B:
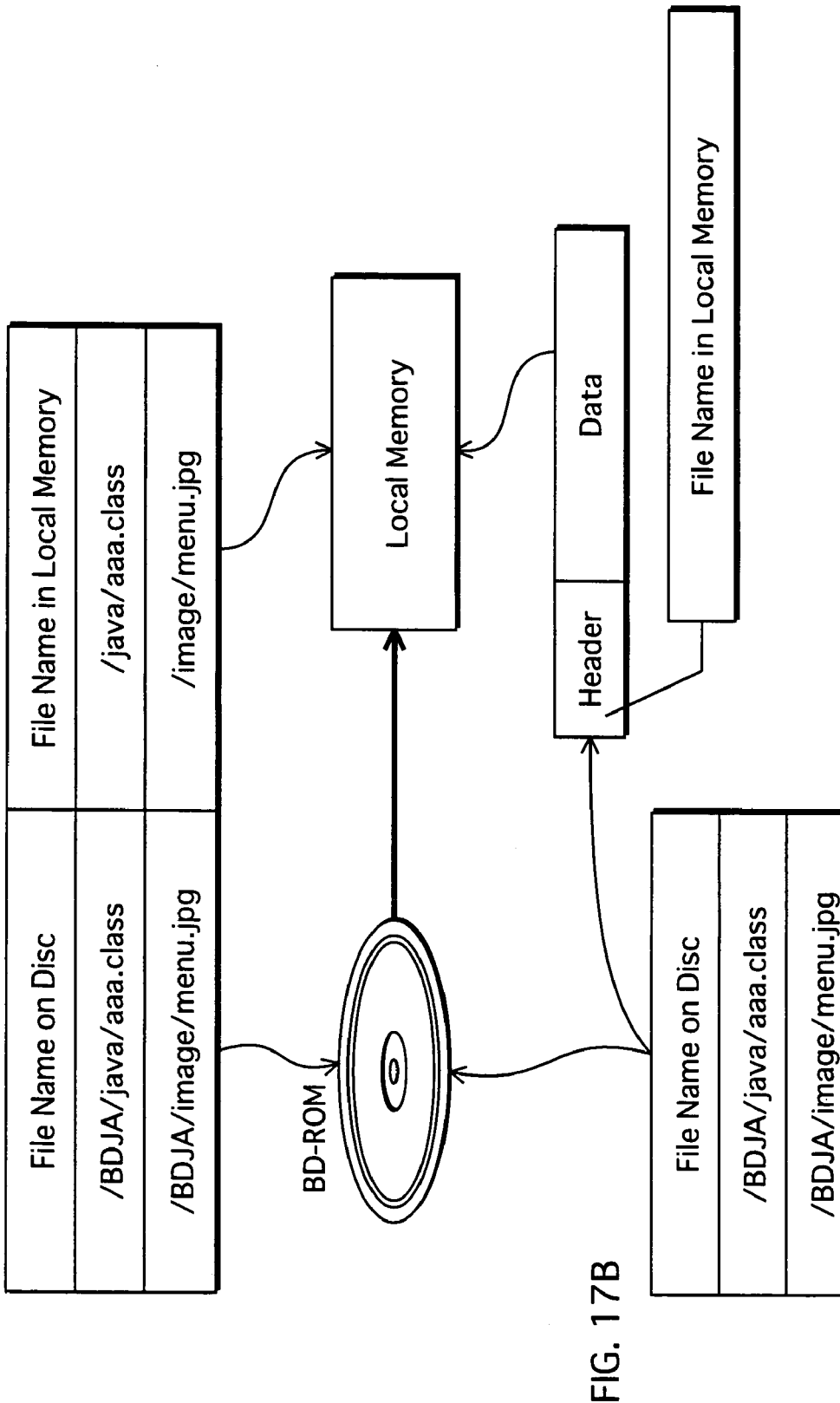
FIG. 17A shows how Java archive files stored on the BD-ROM are identified in a local memory 29.
FIG. 17B shows application of FIG. 17A.

The local memory 29 is a cache memory for temporarily storing the data recorded on the BD-ROM so as to cover the slowness in reading data from the BD-ROM. Due to the presence of the local memory 29, applications are executed efficiently in BD-J mode. FIG. 17A shows how Java archive files stored on the BD-ROM are identified in the local memory 29. In the table in FIG. 17A, the left-hand column shows the file names on the BD-ROM, and the right-hand column shows the file names in the local memory 29. A comparison of the left-hand column and the right-hand column shows that the files in the local memory 29 are specified with a file path from which the directory specification "BDJA" has been omitted.

FIG. 17B shows application of FIG. 17A. In this application example, data stored in the file consists of a header and data. The file path in the local memory 29 is used as the header. As shown in FIG. 17B, using the partially-abbreviated file path on the BD-ROM as the file path enables the file path to be stored in the header, and therefore the location of the data on the BD-ROM is obvious.

This completes the hardware structure of the playback apparatus of the present embodiment. The following describes the software structure of the playback apparatus of the present embodiment.

Figure 18:
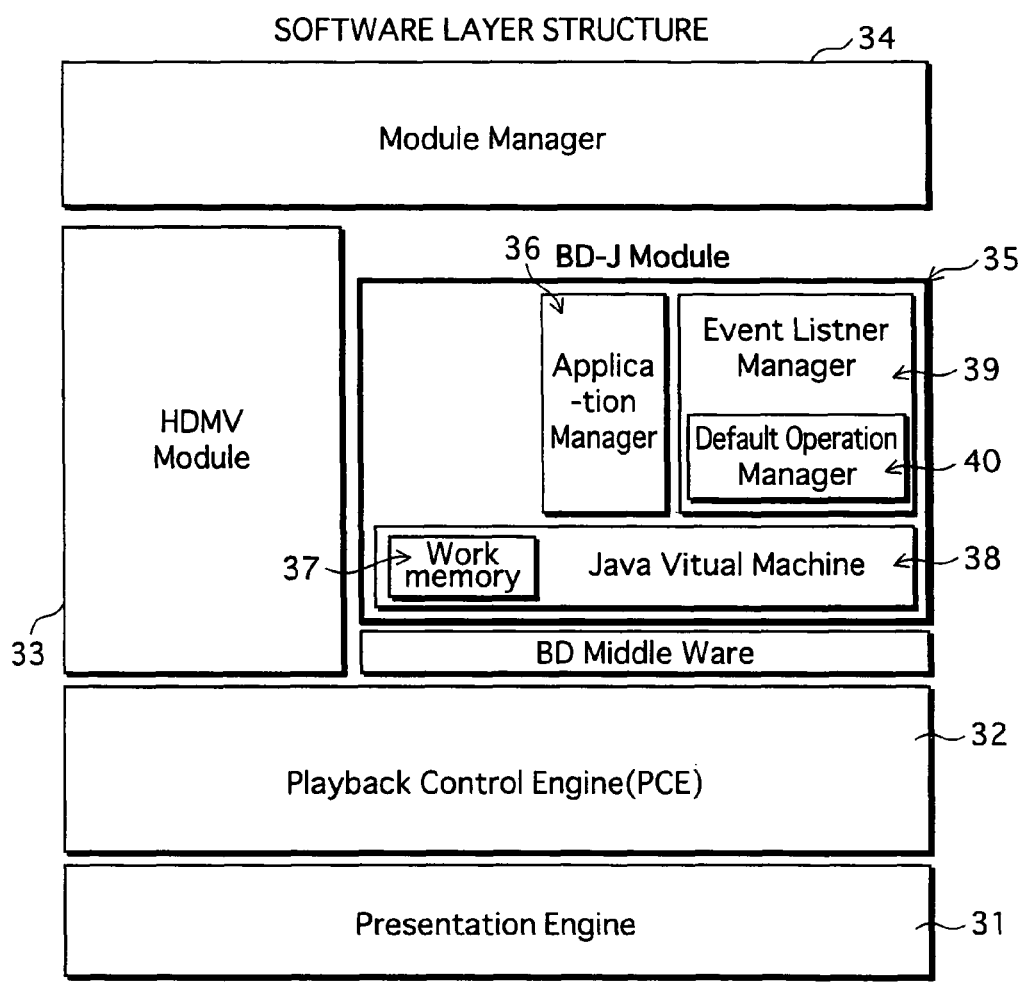
FIG. 18 shows, in the layer structure, the hardware and the software stored in a ROM 24.

FIG. 18 shows, in the layer structure, the hardware and the software stored in the ROM 24. As shown in FIG. 18, the layer structure of the playback apparatus is composed of the following a), b), c), d-1), d-2), e), and f).

a) The logical hardware layer; and, thereon,
two layers that are:
b) a presentation engine 31 that controls playback by AVClips;
c) a playback control engine 32 that performs playback control based on PlayList information and Clip information.
On the top layer is:
e) a module manager 34 that executes branching between Titles.
On a same layer between a HDMV module 33 and a module manager 34 are:
d-1) the HDMV module 33 that decodes and executes movie objects; and
d-2) a BD-J module 35 that decodes and executes BD-J objects.

Figure 19:
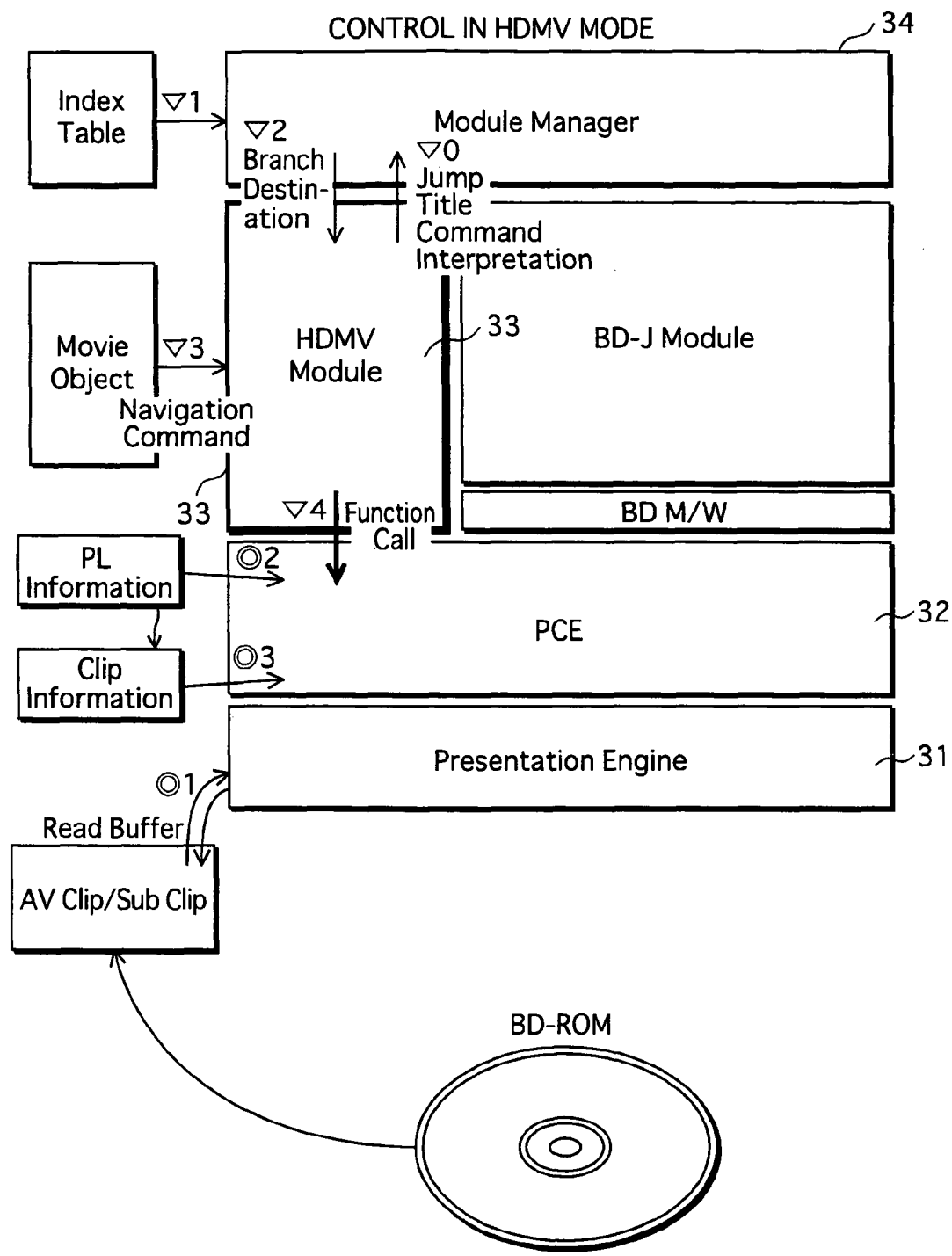
FIG. 19 is an illustration of the processes performed by a presentation engine 31 to a module manager 34.

The BD-J module 35 is what is called a Java platform, having a construction centering on a Java virtual machine 38 that includes a work memory 37, and is composed of an application manager 36, an event listener manager 39, and a default operation manager 40. First, the presentation engine 31 to the module manager 34 are described. FIG. 19 is an illustration of the processes performed by the presentation engine 31 to the module manager 34.

The presentation engine 31 executes AV playback functions. The AV playback functions in the playback apparatus are a group of traditional functions succeeded from CD and DVD players. The AV playback functions include: Play, Stop, Pause On, Pause Off, Still Off, Forward Play (with specification of the speed), Backward Play (with specification of the speed), Audio Change, Subtitle Change, and Angle Change. To realize the AV playback functions, the presentation engine 31 controls the video decoder 4, the P-graphics decoder 6, the I-graphics decoder 13, and the audio decoder 20 so as to decode a portion of the AVClip, which has been read to the read buffer 2, corresponding to a desired time. Here, the desired time may be the time specified by PSR8 (current PTM). With this construction, it is possible to play a portion of an AVClip that corresponds to an arbitrary time. The sign ◎1 in FIG. 19 indicates the start of decoding by the presentation engine 31.

The playback control engine (PCE) 32 performs functions that include: (i) PlayList playback control functions; and (ii) status obtaining/setting function for obtaining and setting statuses in the playback apparatus. The PlayList playback control functions is, among the AV playback functions performed by the presentation engine 31, a playback start, a playback stop or the like that are performed based on the current PL information and Clip information. The functions (i) and (ii) are performed in response to the function calls that are issued by the HDMV module 33, the module manager 34 and the BD-J module 35. That is to say, the playback control engine 32 executes its own functions in response to instructions made by user operations and instructions from the upper layer in the layer model. In FIG. 19, the arrows with the signs ◎2 and ◎3 indicate the playback control engine 32 referencing the Clip information and the PlayList information.

The HDMV module 33 is a main body for execution in movie mode. If notified by the module manager 34 of a Movie Object that constitutes a branch destination, the HDMV module 33 reads, from the local memory 29, the Movie Object that constitutes the branch destination, decodes the navigation command written in the Movie Object, and issues, based on the decoding results, a function call to the playback control engine 32. In FIG. 19, the arrows with signs ∇2, ∇3, and ∇4 respectively indicate the following: receiving notification of the branch destination Movie Object from the module manager 34 (∇2); decoding the navigation command written in the Movie Object (∇3); and issuing a function call to the playback control engine 32 (∇4).

The module manager 34 holds the IndexTable that is read from the BD-ROM, and performs a branch control. The branch control includes receiving a Title number that is a jump destination when the HDMV module 33 has executed a JumpTitle command or when the BD-J module 35 has issued a Title jump API, and notifying the Movie Object or the BD-J Object that composes the Title to the HDMV module 33 or the BD-J module 35. In FIG. 19, the arrows with signs ∇0, ∇1, and ∇2 respectively indicate the following: executing a Jump-Title command (∇0); the module manager 34 referring to the IndexTable (∇1); and sending notification to run a Movie Object that is the branch destination (∇2).

Figure 20:
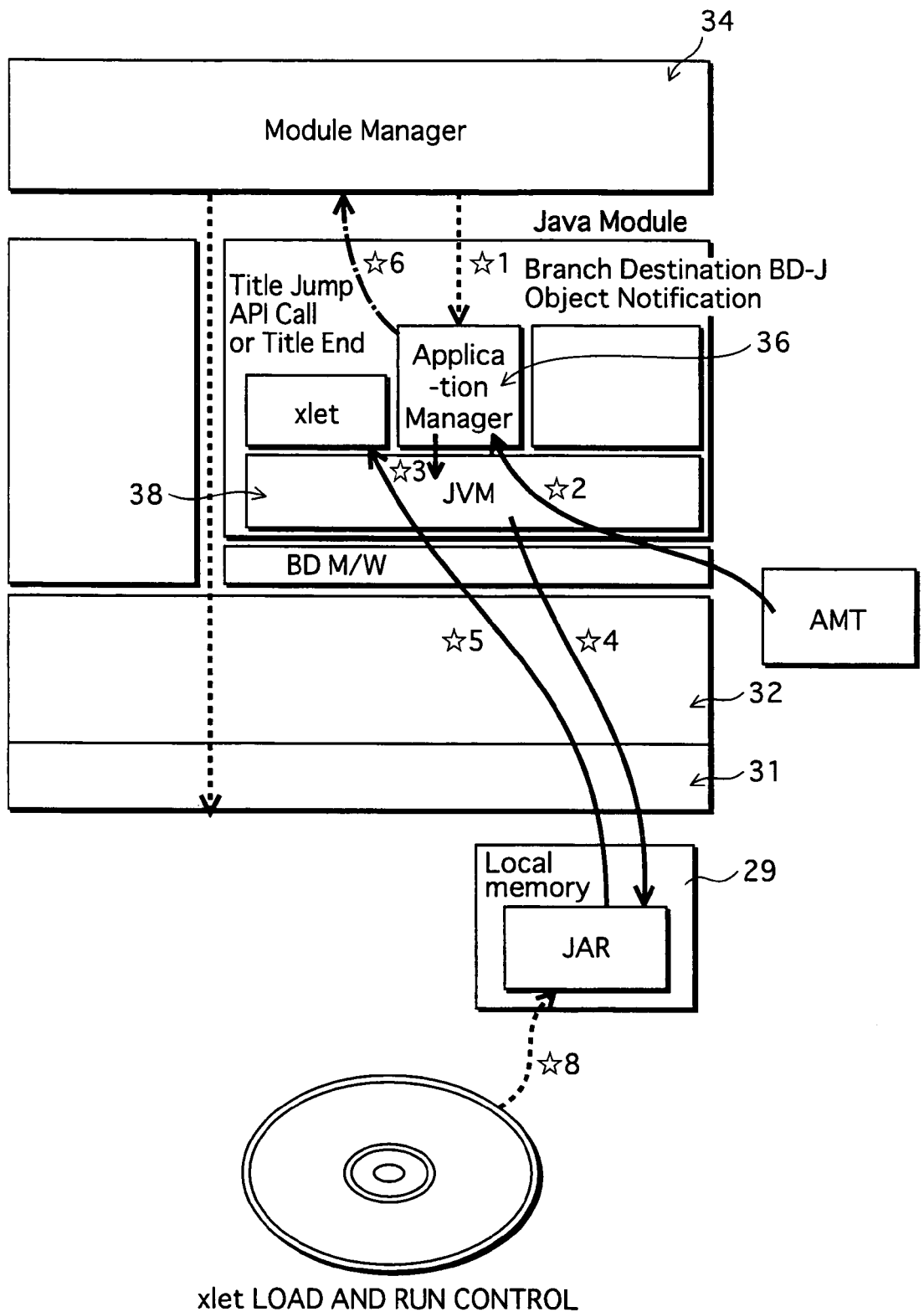
FIG. 20 illustrates processing by an application manager 36.

This completes the description of the presentation engine 31 to the module manager 34. The following describes the application manager 36 with reference to FIG. 20. FIG. 20 shows the application manager 36.

The application manager 36 executes run control of an application by referring to the application management table, and control to terminate a Title normally.

The run control includes, each time notification of a BD-J object that is a branch destination is received from the module manager 34, reading that BD-J object, referring to the application management table in the BD-J object, and accessing the local memory 29. Run control also includes reading, to the work memory, the xlet program that constitutes the application that has a life cycle at the current playback position. In FIG. 20, the signs ☆1, ☆2, and ☆3 respectively indicate the following: notification of the branch destination BD-J object in run control (☆1); referring to the application management table (☆2); and instructing the Java virtual machine 38 to run an application. With this instruction to run an application, the Java virtual machine 38 reads the xlet program from the local memory 29 onto the work memory 37 (☆5).

Termination control of a Title includes control when the Title terminates normally and control when the Title terminates abnormally. The control when the Title terminates normally is control for, when a jump Title API has been called by an application that constitutes a Title, issuing a request to the main body of branch control (the module manager 34) to switch to the branch destination. The arrow with the sign ☆6 indicates notification to the module manager 34 in termination control. When the Title terminates normally, the application that constitutes the Title may remain running. This is because a judgment of whether or not to terminate the application is made in the destination branch Title. Although not touched on in detail in the present embodiment, the application manager 36 performs processing to read a Java archive file from the BD-ROM into the local memory 29 (☆8). The sign ☆8 indicates this reading into the local memory 29.

Figure 21:
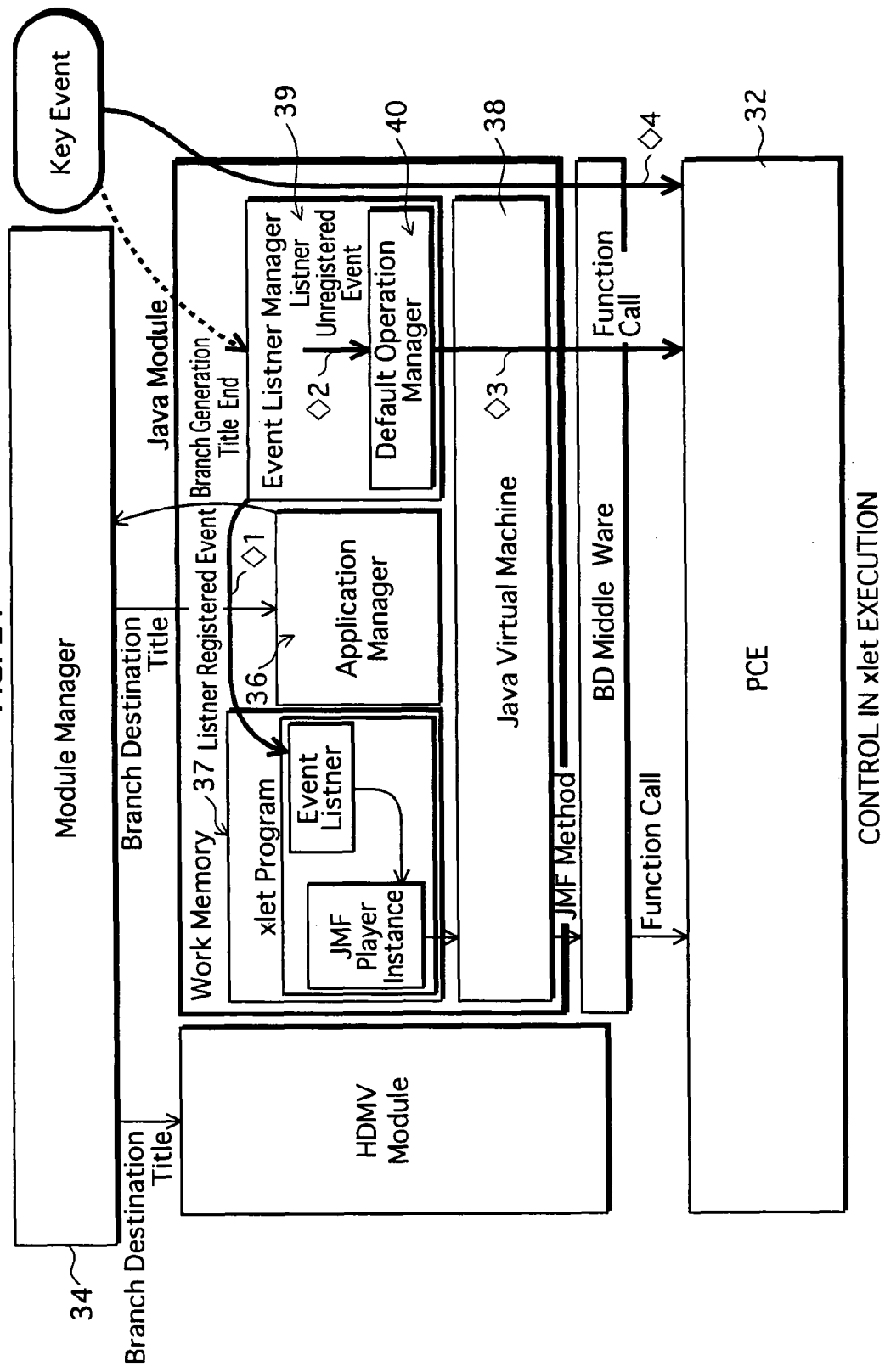
FIG. 21 shows a work memory 37 to a default operation manager 40.

This completes the description of the application manager 36. The following describes the work memory 37 to the default manager 40 with reference to FIG. 21.

The work memory 37 is a heap area in which is located xlet programs that constitute applications. Although the work memory 37 is actually located in the Java virtual machine 38, the work memory 37 is shown on a higher layer than the Java virtual machine 38 in the drawing for convenience. The xlet programs in the work memory 37 include EventListener and JMF player instance.

The Java virtual machine 38 loads the xlet program that constitutes an application onto the work memory 37, decodes the xlet program, and executes processing based on the decoding results. As described, the xlet program includes a method to instruct generation of a JMF player instance and a method to instruct execution of this JMF player instance, and therefore, performs control with respect to the lower layers to implement the processing instructed by the methods. If JMF player instance generation is instructed, the Java virtual machine 38 obtains the JMF player instance associated with the YYYY.MPLS file on the BD-ROM. Further, if execution of the JMF method in the JMF player instance is instructed, the Java virtual machine 38 issues a JMF method to a BD middleware so that a function call corresponding to the BD playback apparatus replaces the existent function call, and issues the function call after replacement to the playback control engine 32.

The event listener manager 39 analyzes the key events and distributes the events. The solid line arrows ◇1 and ◇2 in FIG. 21 indicate distribution of events by the event listener manager 39. If the event to be distributed is a key event that has been registered in the xlet program, such as START, STOP, or SPEED, the event listener manager 39 distributes the event to an xlet program that is being indirectly referred to by the BD-J Object. START, STOP, and SPEED are events corresponding to JMF, and these key events are registered therewith in the Event Listener in the xlet program. Therefore, the xlet program can be run according to these key events. If the event to be distributed is a key event that has not been registered with the Event Listener, the event listener manager 39 distributes the event to the default operation manager 40. Various key events, including audio switch and angle switch, that are not registered with Event Listener may occur in the BD-ROM playback apparatus, therefore the above-described arrangement is provided so as to process each key event without fail.

When a key event that is not registered with Event Listener in the xlet program is distributed to the default operation manager 40 by the event listener manager 39, the default operation manager 40 issues to the playback control engine 32 a function call that corresponds to the event that is not registered with Event Listener. The arrow ◇3 in FIG. 21 indicates the function call issued by the default operation manager 40. Although the events that are not registered with Event Listener are distributed by the event listener manager 39 and the default operation manager 40 in FIG. 21, the playback control engine 32 may directly receive the events that are not registered with the Event Listener, and perform playback control (◇4 in FIG. 21).

(Description of Flowcharts)

The above description of the application manager 36 is only an outline thereof. The processes of the application manager 36 are shown in detail in FIGS. 22 and 23. The following describes the processing procedures of the application manager 36 in more detail with reference to the flowcharts.

Figure 22:
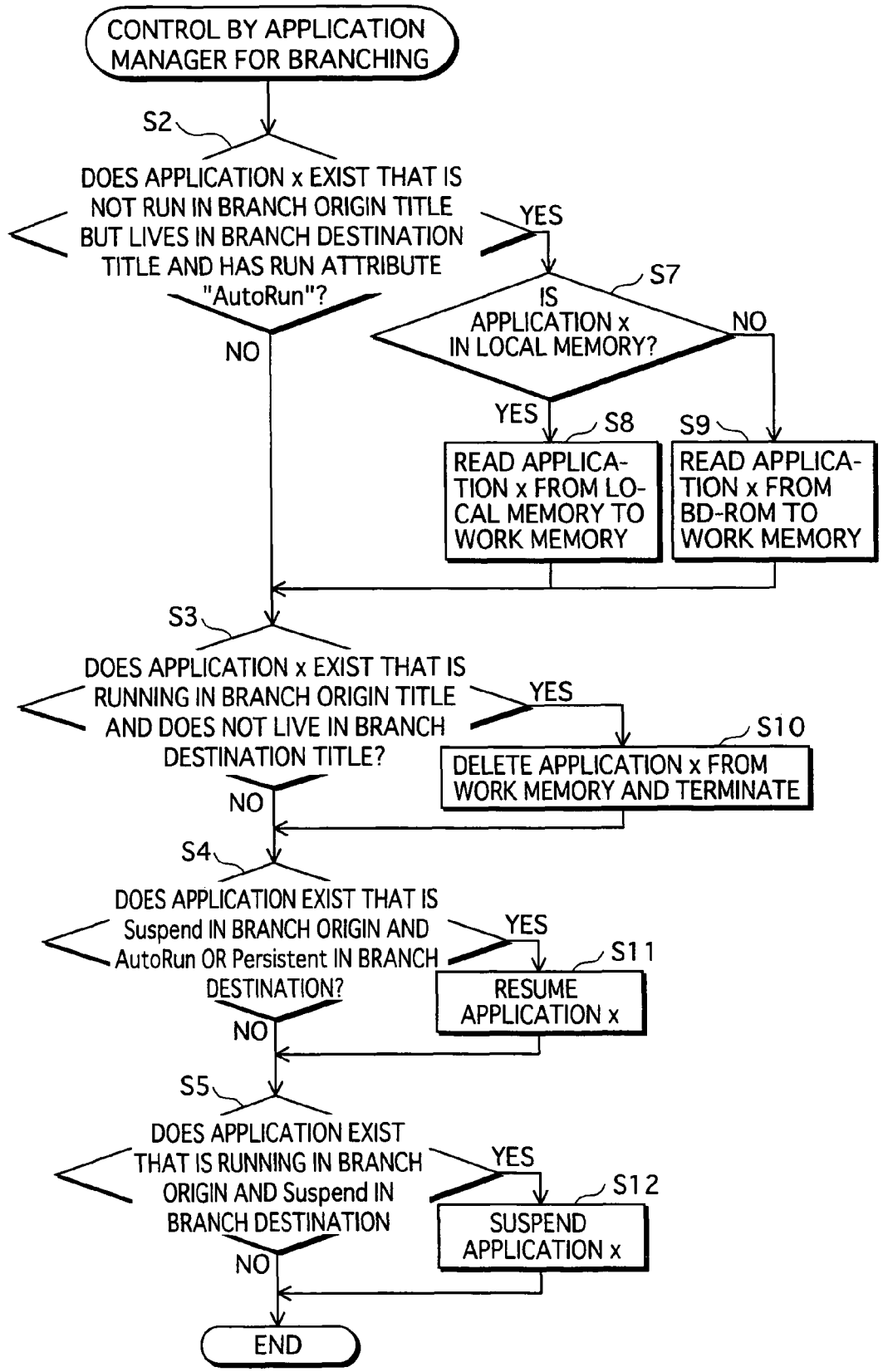
FIG. 22 shows control procedures of the application manager 36 for branching.

FIG. 22 is a flowchart showing control procedures of the application manager 36 for branching. The processing shown in this flowchart is for running or terminating an application (referred to as application x) that fulfills the conditions of step S2 to step S5.

At step S2 the application manager 36 judges whether or not an application x exists that is not run in the branch destination Title, but lives in the branch destination Title and whose run attribute in the branch destination Title is AutoRun, and if such an application x exists, cache sense is performed with respect to the local memory 29. If, as a result of the cache sense, the application x is in the local memory 29 (YES at step S7), the application x is read from the local memory 29 into the work memory 37 (step S8). If an application x is not in the local memory 29, the application manager 36 reads an application x from the BD-ROM to the local memory 29, and then reads the application x from the local memory 29 to the work memory 37 (step S9).

At step S3, the application manager 36 judges whether or not an application x exists that is being run in the branch origin Title does not live in the branch destination Title. If such an application x exists, the application x is deleted from the work memory 37 and terminated (step S10).

At step S4, the application manager 36 judges whether or not an application exists that is Suspend in the branch origin, and AutoRun or Persistent in the branch destination. If such an application exists, the application x is resumed (step S11).

At step S5, the application manager 36 judges whether or not an application exists that is being run in the branch origin Title and is Suspend in the branch destination. If such an application exits, the application x is suspended (step S12).

Figure 23:
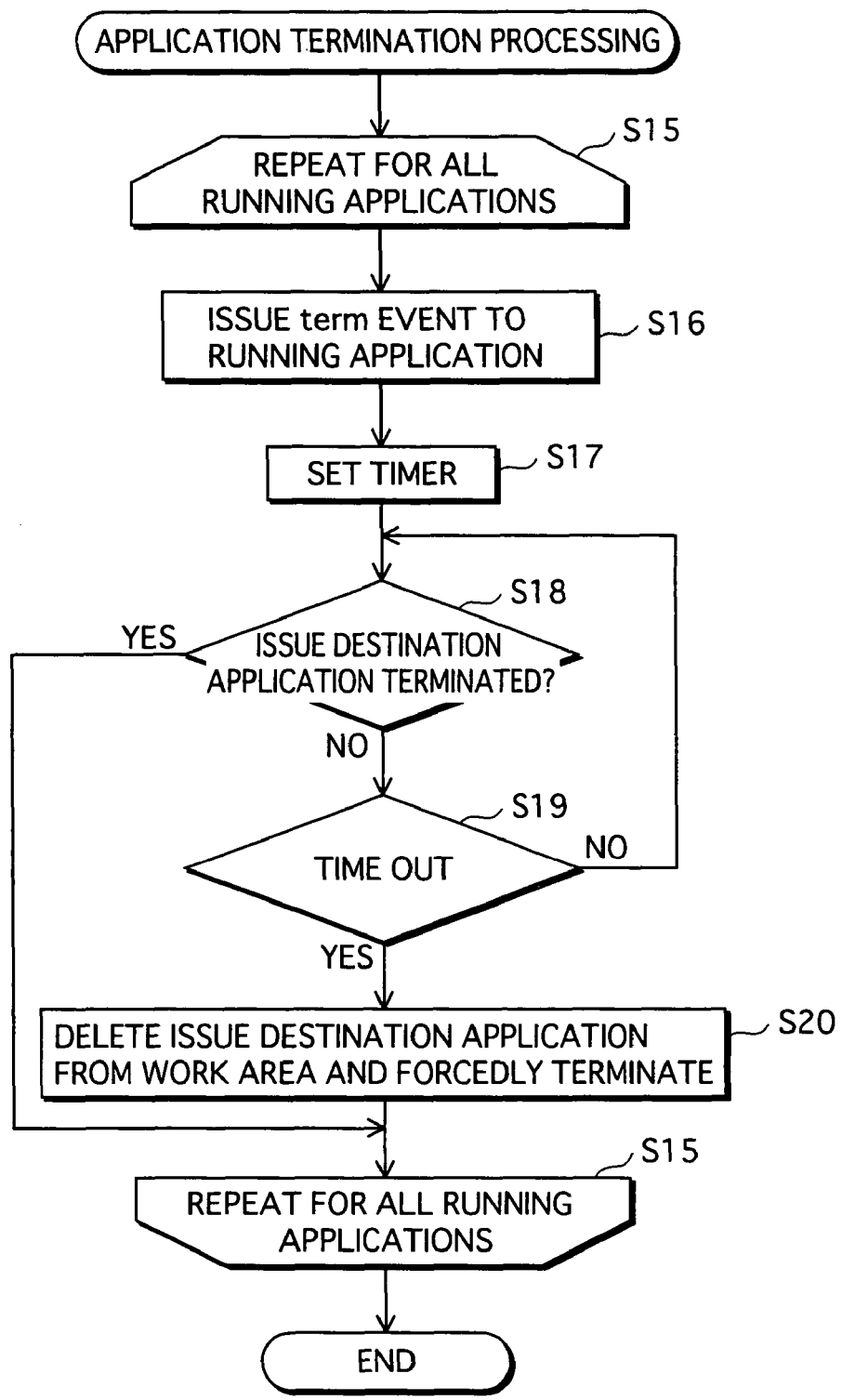
FIG. 23 is a flowchart showing procedures of processing for terminating applications.

The processing for the application manager 36 to terminate applications is as shown in FIG. 23. FIG. 23 is a flowchart showing the processing procedure for terminating applications. FIG. 23 includes loop processing in which step S16 to step S20 are repeatedly performed for each of the plurality of applications that are to be terminated (step S15). In this loop processing, the application manager 36 issues a terminate event so as to terminate an application that is running (step S16), sets a timer (step S17), and moves to loop processing composed of step S18 to step S20. If Event Listener receives this terminate event, the corresponding xlet program runs a termination process. When the termination process has ended, the xlet program is discarded from the work memory 37, and terminated.

The timer continues to count down while the loop processing at step S18 to step S20 continues. At step S18 in the loop processing, the application manager 36 judges whether or not the issue destination application has terminated, and if the issue destination application has not terminated, processing of application is terminated. At step S19, the application manager 36 determines whether or not the timer has timed out, and if so, the issue destination application is deleted from the work memory 37 at step S20, so as to forcedly terminate the application.

The processing by the above module manager 34 is described with reference to FIG. 24.

Figure 24:
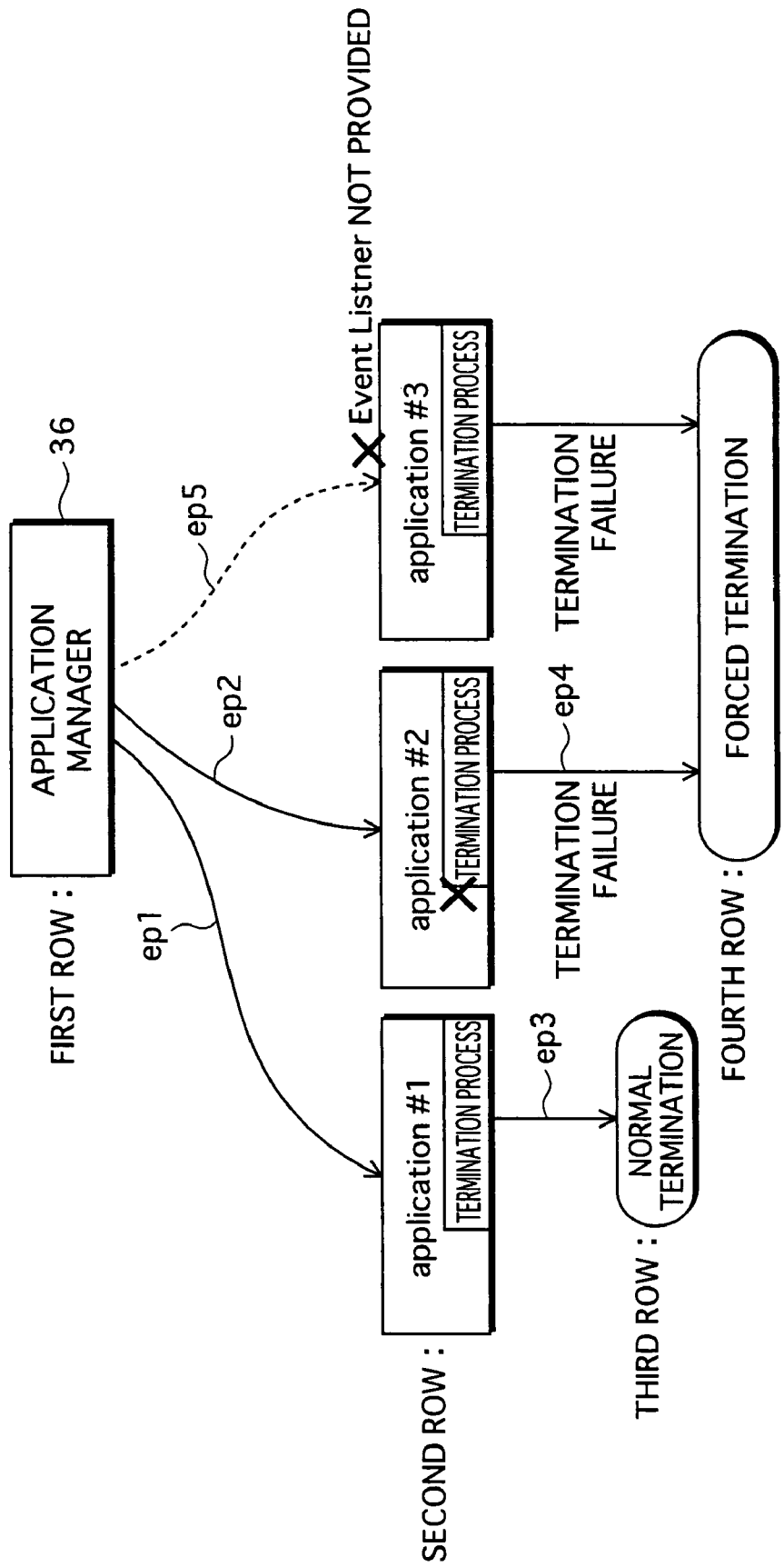
FIG. 24 indicates the process for terminating applications.

FIG. 24 indicates the process for terminating applications. In FIG. 24, the first row shows the application manager 36, and the second row shows three applications. In the second row in FIG. 24, the application on the left-hand side shows an application that received a terminate event, and was successful in the termination process. The middle application in the three applications in the second row of FIG. 24 is an application that received a terminate event, but failed in the termination process. The application on the right-hand side is not provided with an Event Listener, and therefore was unable to receive the terminate event.

The arrows ep1 and ep2 between the first row and the second row indicate issuing of terminate events by the application manager, and the arrow ep3 indicates running a termination process.

The third row is the status after status change when the termination process succeeds, and this application terminates according to its own termination processing. As with these xlet programs, if there are any applications that have not terminated within a predetermined period of time, the application manager 36 forcedly removes them from the work memory 37. Specifying the forced termination of the fourth row can also be said to be one of the missions of the application manager 36.

As described above, according to the present embodiment, applications that are run in the branch origin Title and do not live in the branch destination Title are automatically terminated. Therefore, even if the progression of playback is complicated due to conditional branching, the number of applications launched will not be such that the limit of the resources of the playback apparatus is exceeded. Since the running of applications before and after branching can be guaranteed, numerous disc contents in which applications are executed while a digital stream is played are able be distributed.

Second Embodiment

Figures 25A, 25B:
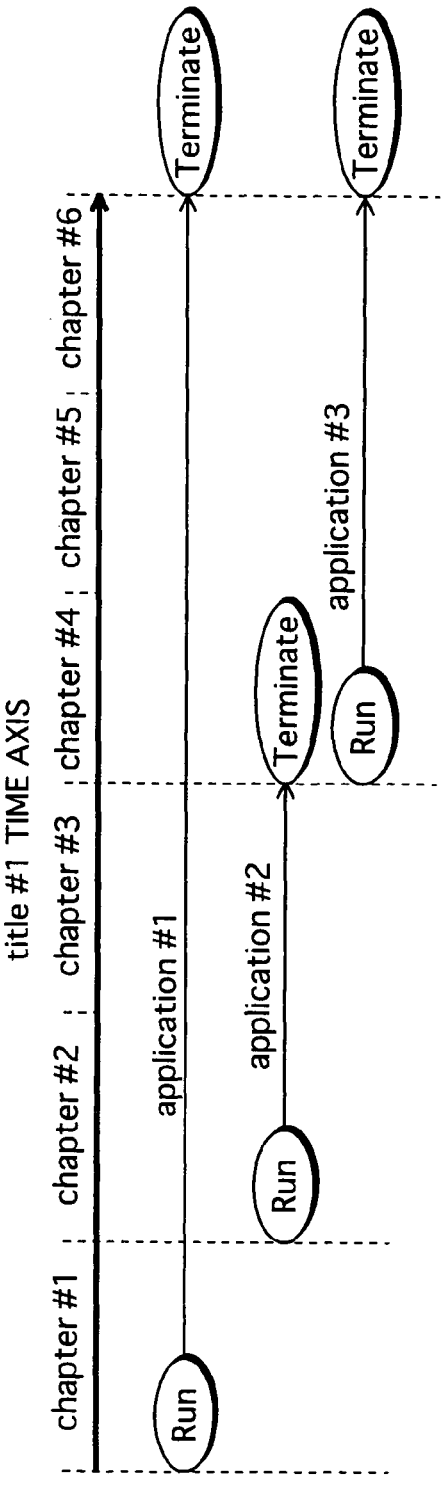
FIG. 25A shows an application management table that defines life cycles on the PL time axis.
FIG. 25B shows life cycles of applications based on the application management tables of FIG. 25A.

Whereas the life cycle of the applications matches the Title time axis in the first embodiment, the second embodiment proposes part of the PL time axis as the life cycle of an application. Part of the PL time axis is expressed by Chapters, and therefore the life cycle of applications can be specified by writing a start point and an end point in terms of Chapters. FIG. 25A shows an application management table that defines life cycles on the PL time axis. There are three applications written in the application management table in FIG. 25A, of which application#2 has a life cycle specified as Chapter#2 to Chapter#3 of Title#1, and has an run attribute specified as AutoRun. Therefore, as shown in FIG. 25B, application#2 is run at the start point of Chapter#2 and terminated at the end point of Chapter #3.

On the other hand, Chapter#4 to Chapter#6 of Title#1 is specified as the life cycle of application#3. Therefore, as shown in FIG. 25B, application#3 is run at the start point of Chapter#4 and terminated at the end point of Chapter#6.

Because it performs processing based on the application management table written in this way, each time a chapter start point specified by a PLmark is reached, the application manager 36 of the present embodiment judges whether or not any application exists whose life cycle starts at the chapter start point, and if any such application exists, the application manager 36 loads that application into the work memory 37.

Similarly, each time a chapter start point is reached, the application manager 36 judges whether or not any application exists whose life cycle ends with the directly preceding chapter, and if any such application exists, discards that application from the work memory 37.

By managing the life of applications in units of chapters, the life cycles of applications can be specified even more precisely. However, it must be kept in mind that with disc content, retrograde along the time axis is possible. Retrograde is advancement in the opposite direction to the time axis because of rewinding. Repeated retrograde and advancement at chapter boundaries creates an excessive load for reading because applications are loaded into and discarded from the work memory many times. In view of this, in the present embodiment, the timing at which an application is run is the instant that normal playback by the playback control engine 32 commences when having entered a Title. Here, PL playback includes normal playback and trick playback. Trick playback includes Forward Play, Backward Play, SkipNext and SkipBack. Applications are not run while Forward Play, Backward Play, Skipnext and SkipBack are being performed, and run when normal playback has started. By using the moment at which normal play starts as the basis, applications are not repeatedly run more than necessary even if playback goes back and forth across a life cycle. Note that processing that uses the instant of normal playback starting as a basis to run applications may also be executed in cases in which the life cycle corresponds to a Title.

As has been described, the present embodiment enables the life cycle of applications to be specified in units of chapters, which are smaller than PLs, and therefore applications can be controlled precisely.

Second Embodiment Modification Example

A priority level is given to each application in FIGS. 25A and 25B. The priority level takes values of 0 to 255. When there is competition between applications for use of resources, the application manager 36 can use the priority levels to decide which application to terminate forcibly, or which application to regain resources from. In the example in FIGS. 25A and 25B, the priority level of application#1 is 255, and the priority level of each of application#2 and application#3 is 128. Therefore, when there is competition between application#1 and application#2, the application manager 36 performs processing to forcedly terminate application#2, which has the lower priority level.

Third Embodiment

Disc contents provided from a BD-ROM are composed of a plurality of Titles that are able to branch between each other. In addition to Titles that are constituted from at least one PL and a control procedure that uses the PL, there are also non-AV Titles that are constituted from only a control procedure for performing control with respect to the playback apparatus. These non-AV Titles are described in the present embodiment.

Figure 26A:
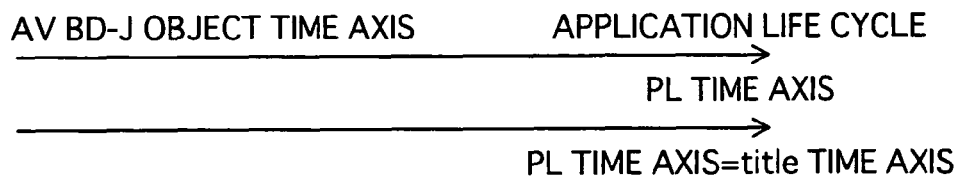
FIG. 26A shows a Title time axis set based on a PL time axis.

There is an issue of how to set a Title time axis in non-AV Titles. FIG. 26A shows a Title time axis set based on a PL time axis. In this case, the PL time axis is used as the Title time axis, and life cycle of the application is set on this Title time axis. If there is no PL time axis to use as a basis for the Title time axis, the Title time axis should be set as shown in FIGS. 26B and 26C.

Figure 26B:
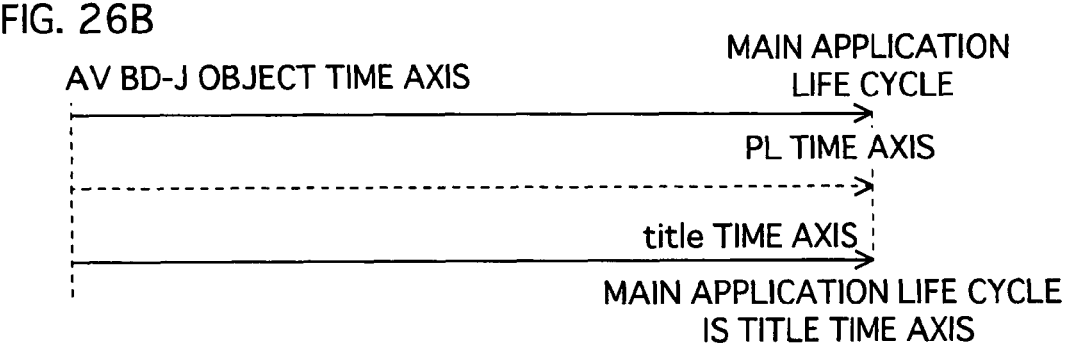
FIG. 26B shows the Title time axis set based on the life cycle of a main application.
Figure 26C:
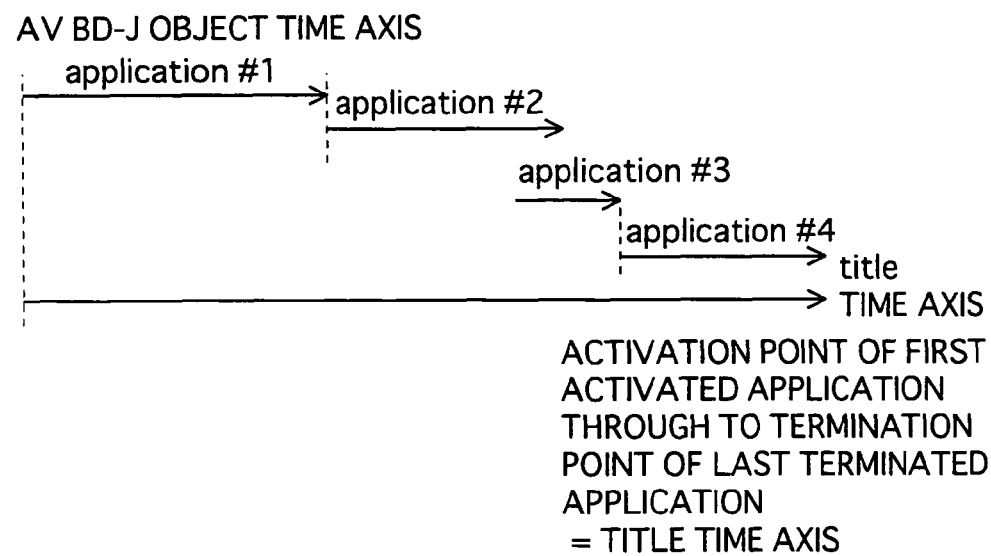
FIG. 26C shows a Title time axis set based on the life cycle of a plurality of applications.

FIG. 26B shows the Title time axis set based on the life cycle of a main application. The main application is the only application that has a run attribute set to AutoRun in the Title and is automatically run when the Title starts. One example of the main application is a launcher application. The launcher application is an application program that runs other applications.

The concept behind FIG. 26B is that the Title time axis will continue as long as the main application is running, and the time axis will end if the main application terminates. FIG. 26C shows a Title time axis set based on the life cycles of a plurality of applications. Although only one application is run at the start point of the Title, there are cases in which call processing is repeated by this application calling another application, which in turn calls another application. In this case, the Title time axis is considered to continue as long as one of the applications is running, and that the Title time axis will end if a state of no application running is arrived at. If the Title time axis of a non-AV Title is set in this way, processing to branch to a predetermined Title can be performed simultaneously with the end of the Title time axis uniformly regardless of whether the Title is an AV Title or a non-AV Title. Note that the Title time axis in a non-AV Title is simply an imaginary time axis assumed in contrast to an AV Title. Therefore, the playback apparatus is unable to reverse non-AV Titles on the Title time axis, or cue non-AV Titles to an arbitrary position on the Title time axis.

The above is an improvement with respect to a recording medium in the present embodiment. The following describes an improvement with respect to a playback apparatus of the present embodiment.

Figure 27:
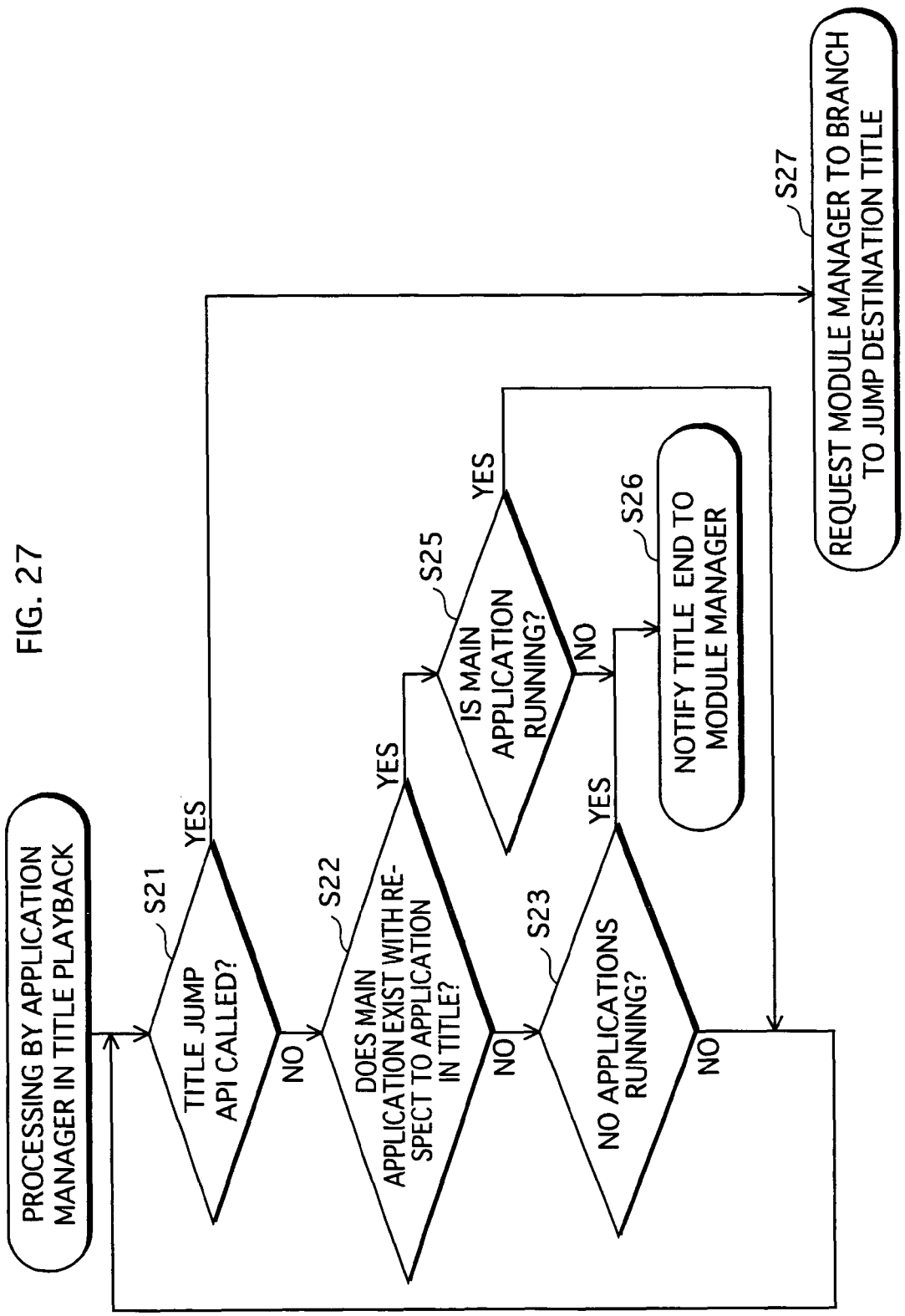
FIG. 27 is a flowchart showing the procedure for processing by the application manager 36 in Title playback.

The application manager 36 of the third embodiment performs processing such as shown in FIG. 27 in order to end Titles using the above procedure. This flowchart has a loop structure in which steps S21 to step S23 are repeated during Title playback.

At step S21, the application manager 36 judges whether or not a Title jump API has been called, and if so, makes a request to the module manager 34 to branch to a jump destination Title (step S27).

At step S22, the application manager 36 judges whether or not a main application exists that may call an application in the Title, and if such a main application exists, checks whether or not the main application is running (step S25). If the main application is not running, the application manager 36 interprets this as being the end of the Title, and notifies the module manager 34 that the Title has ended (step S26).

Step S23 is executed if there is no main application (NO at step S22). At step S23, the application manager 36 judges whether or not there are no applications are running. As above, if none are running, the application manager 36 interprets this as being the end of the Title, and notifies the module manager 34 that the Title has ended (step S26).

As has been described, with the present embodiment, it is possible even with a Title that does not involve PL playback to branch after execution of applications is terminated, rather than branching while applications are being executed.

Fourth Embodiment

Figure 28A:
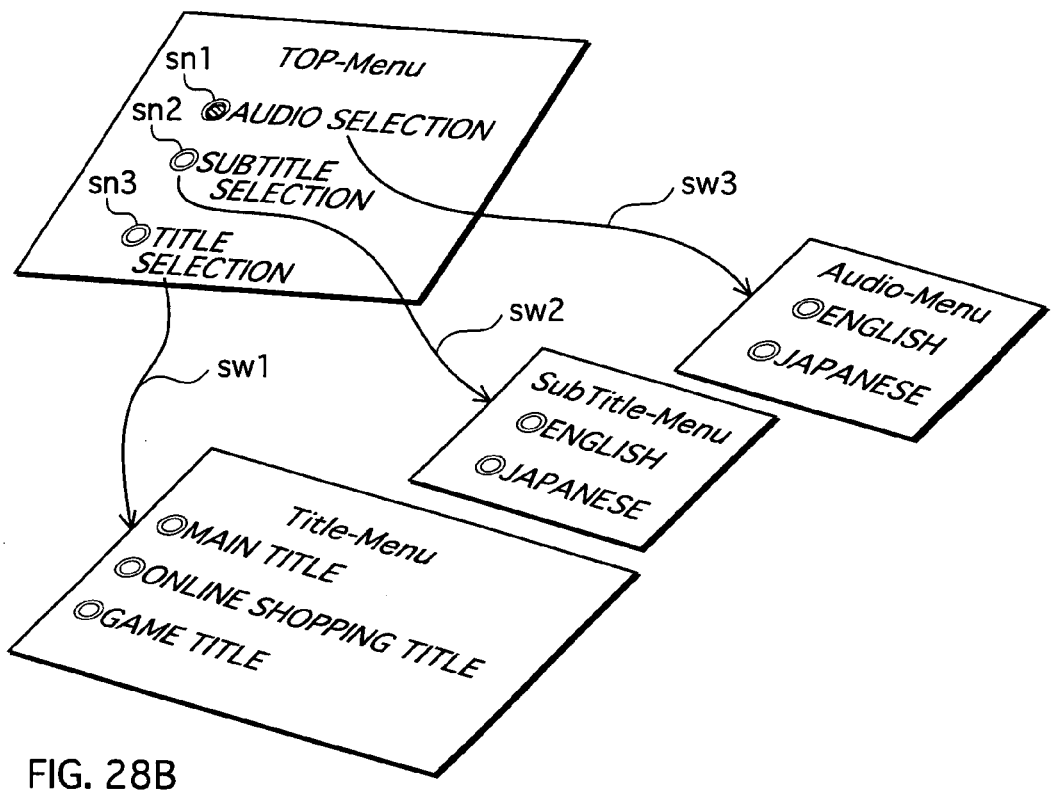
FIG. 28A shows a menu hierarchy realized on a BD-ROM.

The present embodiment relates to an improvement that realizes menu control similar to that of a DVD, on a BD-ROM. FIG. 28A shows a menu hierarchy realized on a BD-ROM. The menu hierarchy in FIG. 28A is structured such that a TopMenu is provided on a highest layer, and the subordinate TitleMenu, SubTitleMenu, and AudioMenu can be selected from the TopMenu. The arrows sw1, sw2, and sw3 in FIG. 28A indicate switching between menus according to button selection. The TopMenu is a menu in which buttons (sn1, sn2, and sn3 in the FIG. 28A) are provided for receiving a designation of any of audio selection, subtitle selection or Title selection.

The TitleMenu is a menu in which buttons are provided for receiving a selection of a movie theater version of a movie (Title), a director's cut of the movie, a game version, or the like. The AudioMenu is a menu in which buttons are provided for receiving a designation of whether audio playback should be in Japanese or in English. The SubTitleMenu is a menu in which buttons are provided for receiving a designation of whether subtitles should be displayed in Japanese or in English.

Figure 28B:
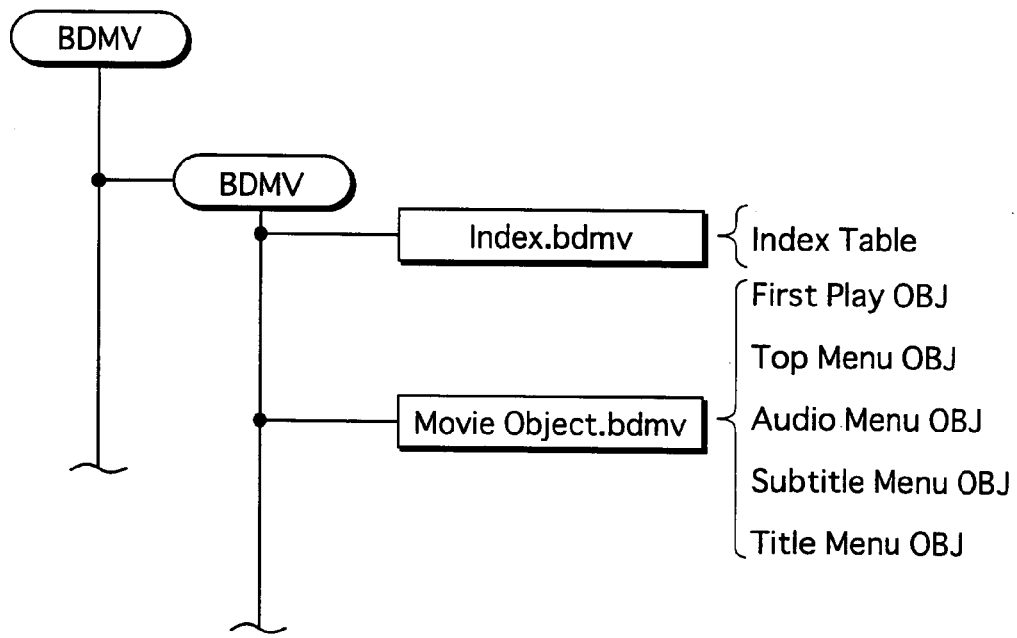
FIG. 28B shows a MOVIE object for running the menus having the hierarchy.

FIG. 28B shows a MOVIE object for running the menus having this hierarchy. In FIG. 28B, a FirstPlay OBJ, a TopMenu OBJ, an AudioMenu OBJ, and a SubTitleMenu OBJ are stored in MovieObject.bdmv.

The FirstPlay Object (FirstPlay OBJ) is a dynamic scenario that is automatically executed when the BD-ROM is loaded into the playback apparatus.

The TopMenu Object (TopMenu OBJ) is a dynamic scenario that controls behavior of the TopMenu. It is this TopMenu Object that is called when the user requests a menu call. The TopMenu object includes commands for changing the state of the buttons in the TopMenu in response to operations from the user, and branch commands for branching in response to confirmation operations with respect to the buttons. The branch commands realize menu switches from the TopMenu to the TitleMenu, the TopMenu to the SubTitleMenu, and the TopMenu to the AudioMenu.

The AudioMenu object (AudioMenu OBJ) is a dynamic scenario that controls behavior of the AudioMenu, and includes commands for changing the state of buttons in the AudioMenu in response to operations from the user, and commands for updating audio settings in response to confirmation operations with respect to the buttons.

The SubTitleMenu object (SubTitleMenu OBJ) is a dynamic scenario that controls behavior of the SubTitleMenu, and includes commands for changing the state of the buttons in the SubTitleMenu in response to user operations, and commands for updating PSR subtitle settings in response to confirmation operations with respect to the buttons.

The TitleMenu.object (TitleMenu OBJ) is a dynamic scenario that controls behavior of the TitleMenu, and includes commands for changing the state of the buttons in the TitleMenu, and branch commands for branching in response to confirmation operations with respect to the buttons.

These menu-use MOVIE objects realize menu behavior such as that realized with DVDs. This completes the description of the MOVIE objects relating to menu control.

Figure 29:
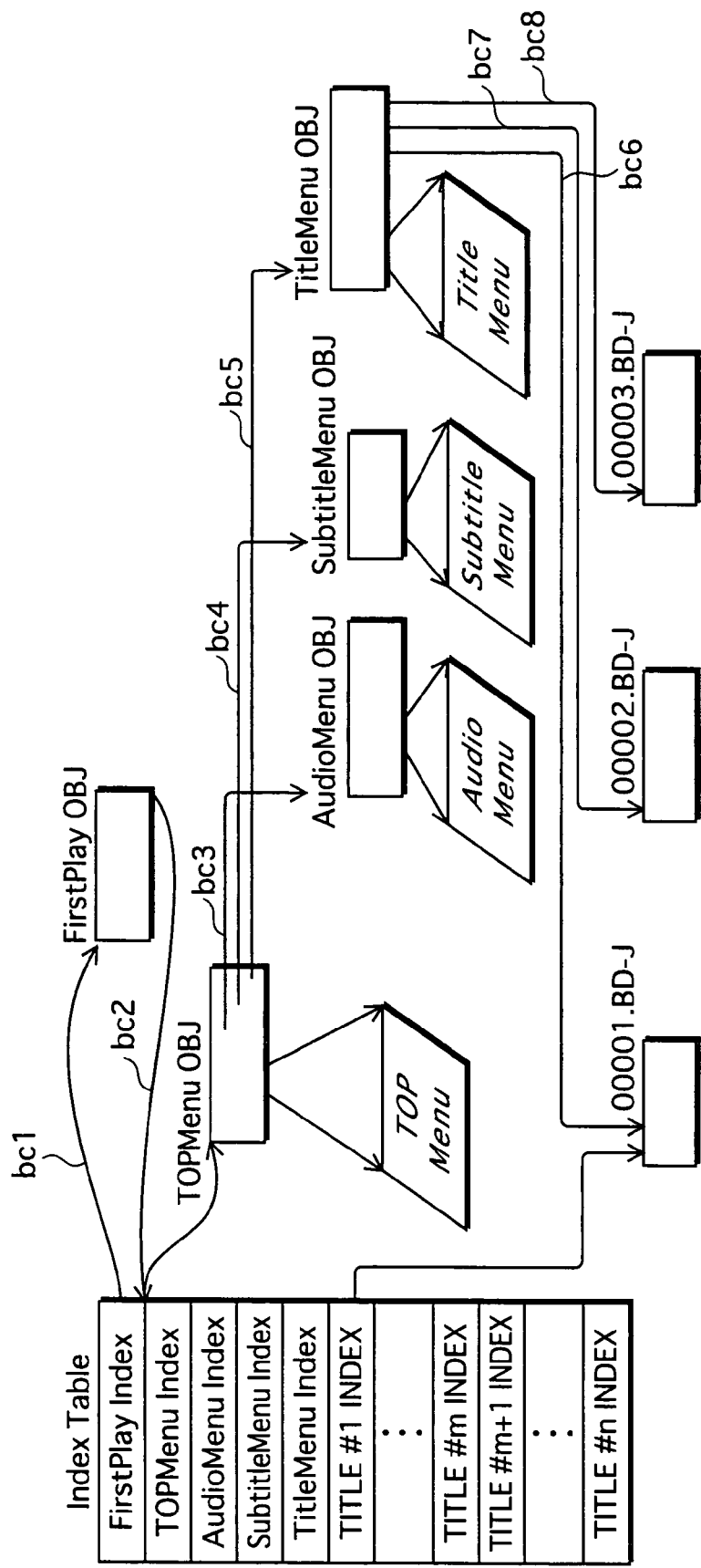
FIG. 29 illustrates an Index Table, and branching from the Index Table to Movie objects.

FIG. 29 illustrates an Index Table, and branching from the Index Table to Movie objects. The left-hand side of FIG. 29 shows the internal structure of the Index Table. The Index Table in the present embodiment includes FirstPlayINDEX, TopMenuINDEX, AudioMenuINDEX, SubTitleMenuINDEX, TitleMenuINDEX, Title#1 to #mINDEX, Title#m+1 to #nINDEX, and Title#0INDEX. The arrows bc1 and bc2 in FIG. 29 indicate a branch from the Index Table to the FirstPlayOBJ and a branch from the FirstPlayOBJ to the TopMenu, and the arrows bc3, bc4, and bc5 indicate branches from the TopMenu to the TitleMenu, the SubTitleMenu, and the AudioMenu. The arrows bc6, bc7, and bc8 indicate branches from the TitleMenu to Movie objects.

The FirstPlayINDEX, TopMenuINDEX, AudioMenuINDEX, SubTitleMenuINDEX, and TitleMenuINDEX are Indexes for the FirstPlayOBJ, TopMenuOBJ, AudioMenuOBJ, SubTitleMenuOBJ, and TitleMenuOBJ, respectively, whose identifiers are written in the indexes.

The Title#1 to #mINDEX are Indexes of the Title that are the first to the m-th entries on the BD-ROM. Written in these Indexes are respective identifiers (IDs) of MOVIE objects that are branch destinations when a Title number is selected from among 1 to m.

The Title#m+1 to #nINDEX are Indexes of the Titles that are the m+1 to n-th entries on the BD-ROM. Written in these Indexes are respective identifiers (IDs) of BD-J objects that are branch destinations when a Title number is selected from among m+1 to n.

The Title#0 INDEX is an Index that specifies a Movie object or a BD-J object that is a branch destination when a BD-J object is forcedly terminated. In the present embodiment, the identifier of the TopMenuOBJ is stored in this Title#0 INDEX.

Figure 30A:
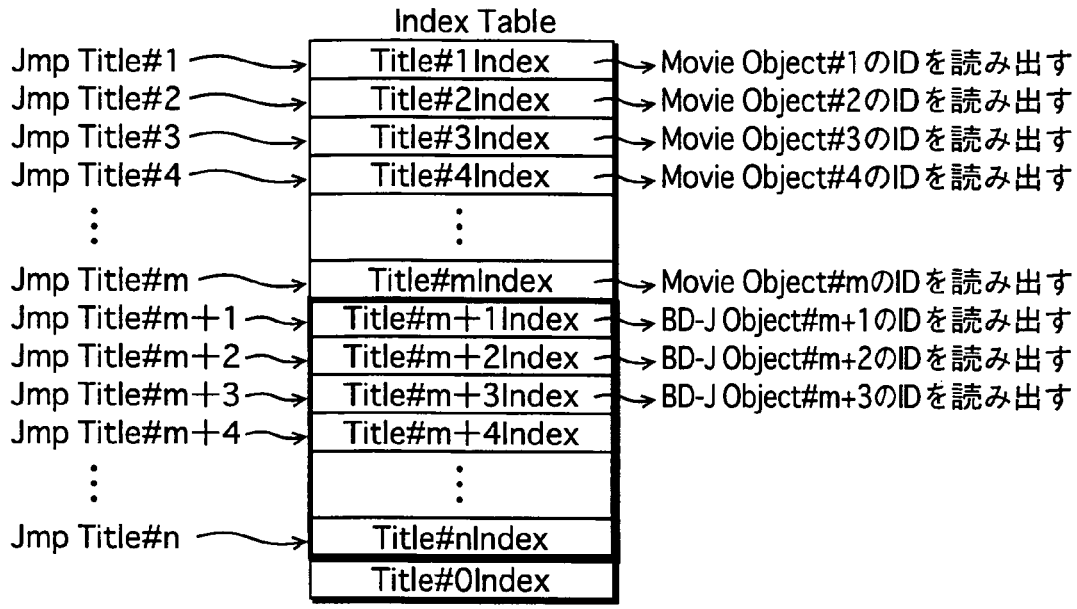
FIG. 30A shows branching when the IndexTable is written as shown in FIG. 29B.

FIG. 30A shows branching when the IndexTable is written as shown in FIG. 29. Since the Index Table is written in this way, when a branch command is executed for which the branch destination is any of labels Title#1 to Title#m, the identifier of the corresponding one of Movie objects #1 to #m is extracted from the corresponding one of Title#1Index to Title#mIndex. When a branch command is executed for which the branch destination is any of labels Title#m+1 to Title#n, the identifier of the corresponding one of Movie objects #m+1 to #n is extracted from the corresponding one of Title#m+1Index to Title#nIndex. The identifiers of the BD-J objects #m+1 to #n each have a 5-digit value that expresses the file name. Therefore, one of "00001.BD-J, 00002.BD-J, 00003.BD-J . . ." is extracted, the dynamic scenario of this file name is read to the memory, and executed. This is branch processing using the Index Table.

Figure 30B:
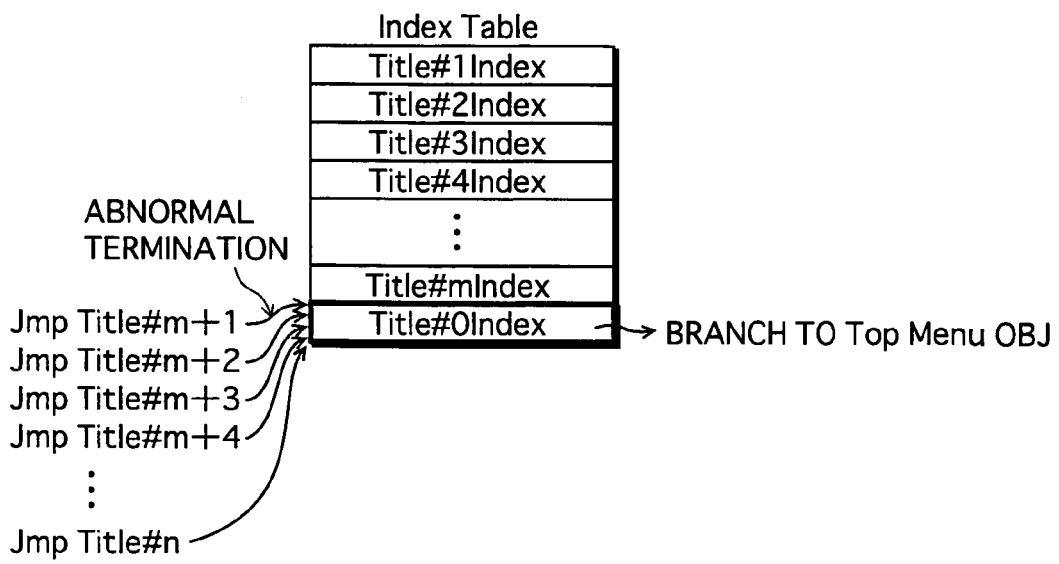
FIG. 30B shows branching when a non-AV title is forcedly terminated.

FIG. 30B shows branching when a BD-J object that is being executed is forcedly terminated. In the branching when the BD-J object is forcedly terminated, the identifier is extracted from the Title#0Index, and the dynamic scenario of that identifier is executed by the playback apparatus. If this identifier is the identifier of the top menu Title, the top menu OBJ is automatically selected when the application is forcedly terminated.

Figure 31:
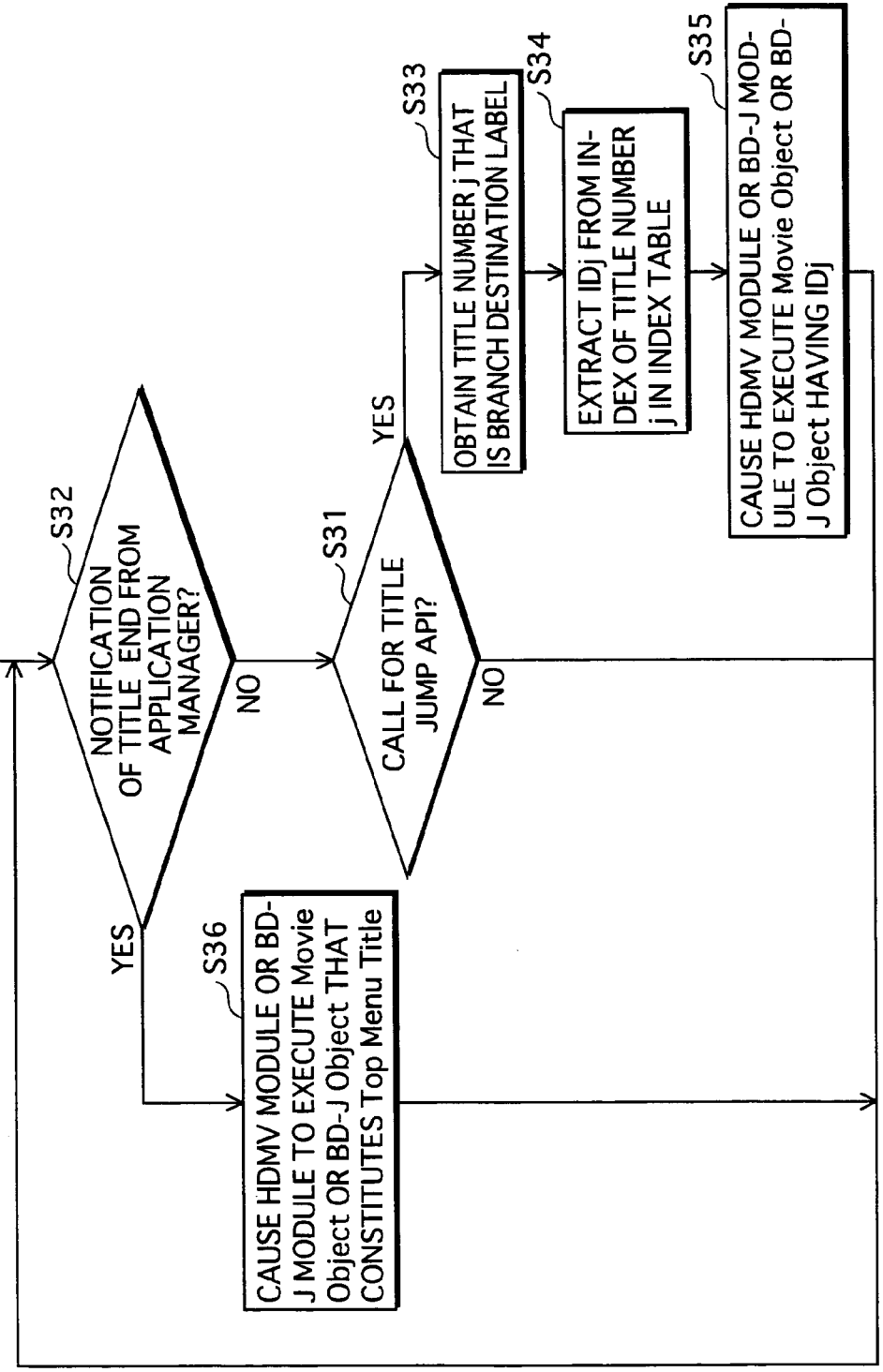
FIG. 31 is a flowchart showing the procedure for processing by the module manager 34.

The above is an improvement relating to a recording medium of the present embodiment. The following describes an improvement relating to a playback apparatus of the present embodiment. The module manager 34 in the playback apparatus performs processing according to procedure shown in FIG. 31, to respond to the described improvement in the recording medium. FIG. 31 is a flowchart showing the procedure for processing by the module manager 34. The flowchart includes loop processing that is composed of step S31 and step S32, and corresponding processing is executed is the case of "YES" at either step S31 or step S32.

At step S31, the module manager 34 judges whether or not there has been a call for a Title jump API, and if there has been a call for a Title jump API, obtains a Title number j which is the branch destination label (step S33), extracts IDj from the Index of the Title number j in the Index Table (step S34), and causes the HDMV module 33 or the BD-J module 35 to execute the Movie Object or the BD-J object of the IDj (step S35).

At step S32, the module manager 34 judges whether or not there has been notification of an end of a Title from the application manager 36, and if there has been such notification (YES at step S32), causes the HDMV module 33 or the module manager 34 to execute the TopMenuOBJ that constitutes the top menu Title (step S36).

Figure 32:
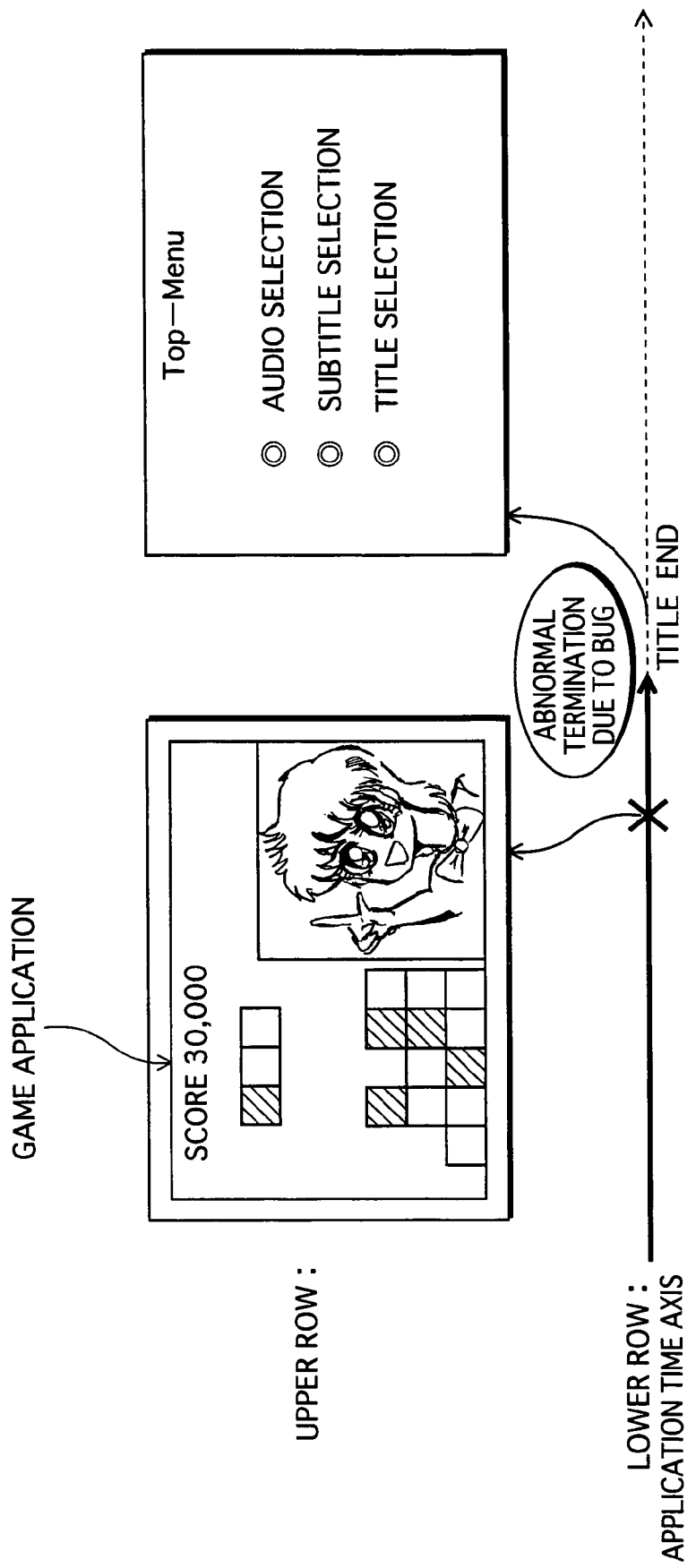
FIG. 32 shows an operation example when the application manager 36 forcedly terminates an application.

The following describes an example of operations when the application manager 36 forcedly terminates an application as described above, with reference to FIG. 32. Here, the Title to be played is a non-AV Title that includes a game application in which falling tiles are stacked upon each other. The lower row in FIG. 32 shows a Title time axis composed of the life cycle of the application, and the upper row shows the images displayed along the Title time axis. If the non-AV Title is a game application, a screen of the game application is displayed as shown on the left-hand side of the upper_row in FIG. 32 during the life cycle of the game application. If the game application terminates abnormally due to a bug, the application manager 36 forcedly terminates the game application in accordance with the flow chart in FIG. 23, and notifies the module manager 34 that the Title has ended. On being notified that the Title has ended, the module manager 34 branches to the top menu Title. This results in an image such as that on the right-hand side of the upper row in FIG. 32 being displayed, and an operation from the user is waited for.

In this way, according to the present embodiment, control to branch to the top menu Title can be performed even when a non-AV Title that includes a program but does not include a digital stream ends. This avoids blackouts or hang-ups when an application terminates due to an error.

Fifth Embodiment

The present embodiment relates to an improvement in how synchronization with PL playback is realized in BD-J mode. When the Java virtual machine 38 decodes a JMF player instance (A.play;) that instructs playback of the JMF player instance in the example of FIG. 8B, the Java virtual machine 38 calls the PL playback API, and directly after calling, returns a response showing "success", to the application.

If the PL playback API is called, the Playback Control Engine 32 executes processing based on the PL information. If the PL has a playback time of two hours, the aforementioned processing continues for these two hours. The problem here is that there is a gap in the time at which the Java virtual machine 38 returns the success response and the time at which the playback control engine 32 actually terminates the processing. Since the Java virtual machine 38 is an event-driven processing main body, it returns a response showing playback success or playback failure directly after the call, but because the actual termination of processing by the playback control engine 32 is two hours later, if the time at which the success response is returned to the application is used as a basis, the completion of processing will be detected two hours later. If forward play, backward play, or skip are performed during the PL playback, this playback time of two hours will fluctuate to be more or less than two hours, and detection of the completion of processing will be even more difficult.

The playback control engine 32 operates stand alone from the application, and therefore is unable to interpret the end of PLplayback as being the end of the Title in a judgment such as that in the third embodiment. For this reason, in the present embodiment, regardless of whether the application has terminated or not, the playback control engine 32 waits for a playback completion event as long as there is a JMF player instance in the work memory 37, in other words, while the BD-J module 35 holds the right to control the presentation engine 31. Then when there is a playback completion event, the playback control engine 32 interprets this as the Title having ended, and issues notification to the module manager 34 to branch to the next Title. This procedure enables playback control engine 32 to treat the point at which PL playback is complete as the completion of the Title.

The following describes the specific control procedure by the playback control engine 32, with reference to the flowcharts in FIG. 33 to FIG. 37.

Figure 33:
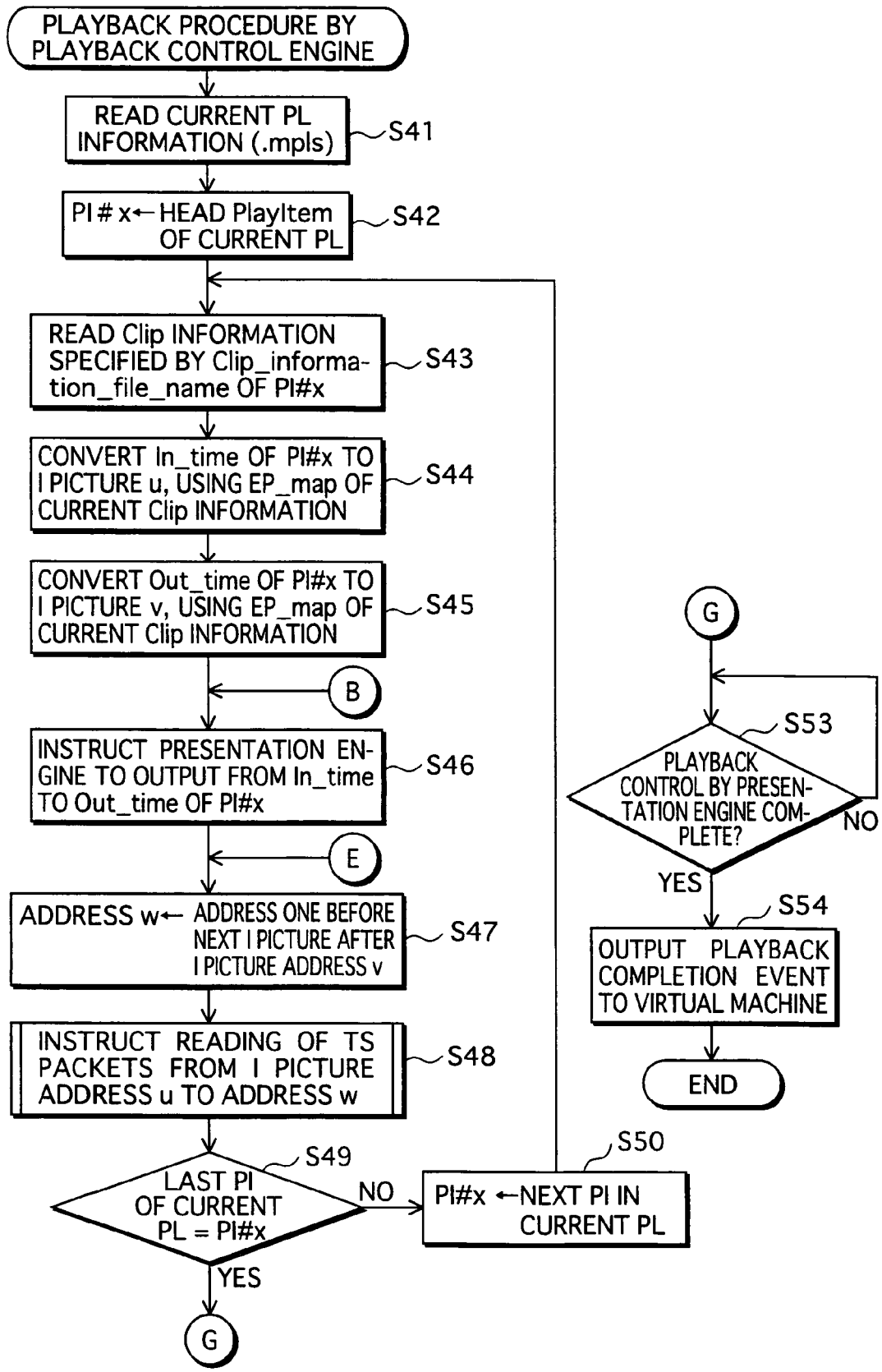
FIG. 33 is a flowchart showing a PL playback procedure by the playback control engine 32.

FIG. 33 is a flowchart showing a PL playback procedure by the playback control engine 32. This playback procedure mainly includes control with respect to the presentation engine 31 (step S46), and control with respect to the BD-ROM drive 1 or the HDD 17 (step S48). The PlayItem that is the processing target in this flowchart is called PlayItem#x. The processing shown in this flowchart is reading of the current PL information (.mpls) (step S41), and then executing processing of step S42 to step S50. Step S42 to step S50 constitute loop processing in which the processing of step S43 to step S50 is repeatedly performed for each piece of PI information the constitutes the current PL information, until the result of step S49 is "YES". The PlayItem that is the target processing in the loop processing is called PlayItem#x (PI#x). PlayItem#x is initialized by being set as the head PlayItem in the current PL (step S42). The requirement for ending the aforementioned loop processing is that PlayItem#x is the last PlayItem of the current PL (step S49). If PlayItem#x is not the last PlayItem, the next PlayItem in the current PL is set as PlayItem#x (step S50).

In step S43 to step S50 that are repeatedly executed in the loop processing, the playback control engine 32 reads the Clip information specified by the Clip_information_file_name of PlayItem#x to the scenario memory 21 (step S43), converts the In_time of PlayItem#x to an I picture address u using the EP_map of the current Clip information (step S44), converts the Out_time PlayItem#x to an I picture address v using the EP_map of the current Clip information (step S45), finds the next I picture after the address v obtained according to these conversions, and sets the address one before the found I picture as an address w (step S47). Then, using the calculated address w, the playback control engine 32 instructs the BD-ROM drive 1 or the HDD 17 to read TS packets from the I picture address u through to the address w (step S48).

Meanwhile, the playback control engine 32 instructs the presentation engine 31 to output the mark_time_stamp of the current PLMark through to the Out_time of PlayItem#x (step S46). The above step S45 to step S48 result in the part of the AVClip instructed according to PlayItem#x being played.

Next, the playback control engine 32 judges whether PlayItem#x is the last PI of the current PL (step S49).

If PlayItem#x is not the last PI of the current PL, the playback control engine 32 sets the next PlayItem in the current PL as PlayItem#x (step S50), and returns to step S43. As a result of repeating step S43 to step S50, the PIs that constitute the PL are successively played.

Figure 34:
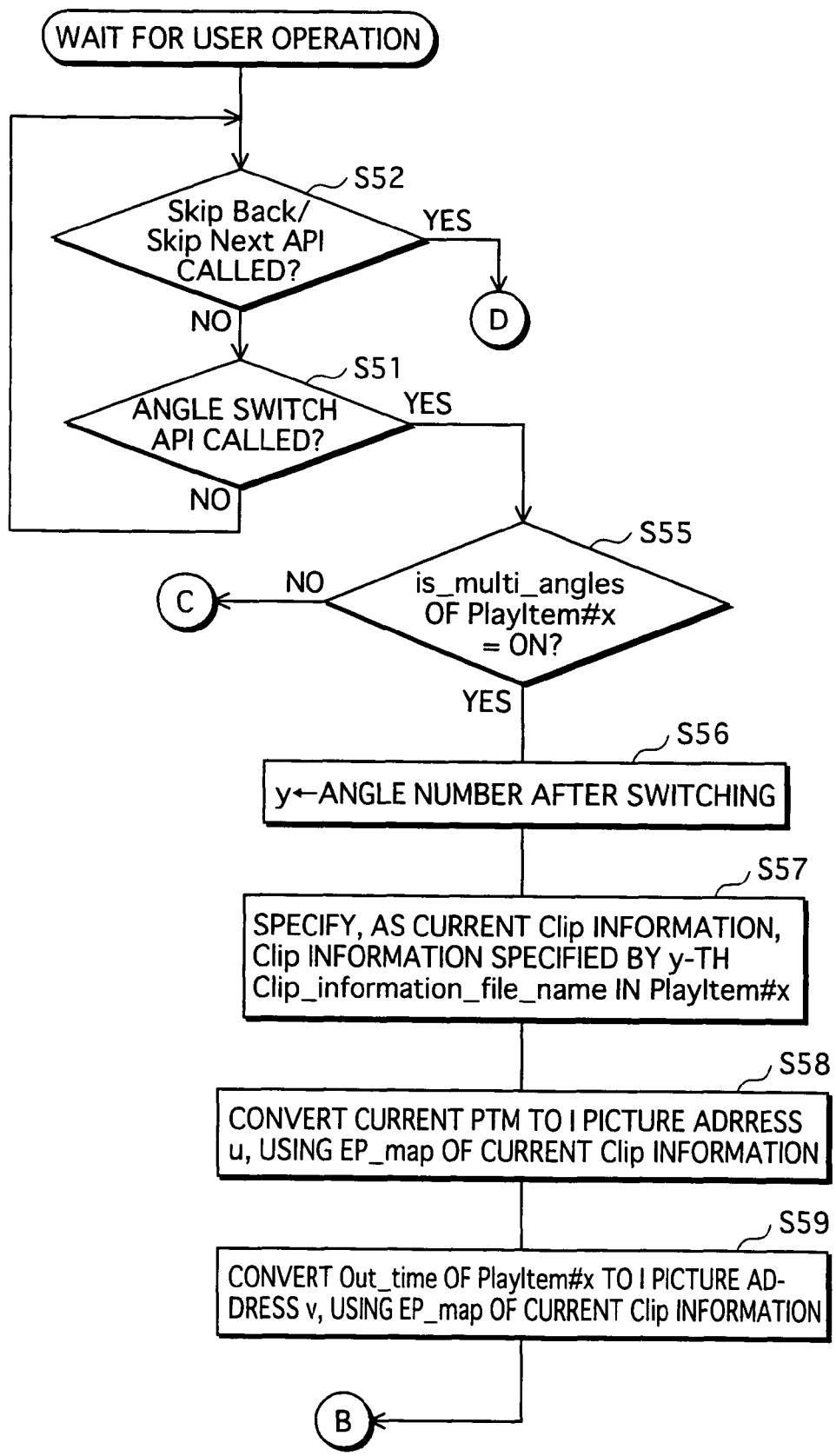
FIG. 34 is a flowchart showing an angle switch procedure and a SkipBack and SkipNext procedure.

FIG. 34 is a flowchart showing an angle switch procedure and a SkipBack and SkipNext procedure. The processing of this flowchart is performed in parallel with the processing of FIG. 33, and includes loop processing composed of step S51 to step S52 that is performed repeatedly. At step S51 in this loop, the playback control engine 32 judges whether or not there has been a call from the Java virtual machine 38 for an API that requests angle switching, and if there has been a call for an angle switching API, the playback control engine 32 executes an operation for switching the current Clip information.

At step S55 of FIG. 34, the playback control engine 32 judges whether or not is_multi_angles of PlayItem#x is ON. Here, is_multi_angles is a flag showing whether or not PlayItem#x is multi-angle-compatible, and if the result of step S55 is NO, moves to step S53. If the result of step S55 is YES, the playback control engine 32 executes step S56 to step S59. At step S56 to step S59, the playback control engine 32 substitutes the angle number after switching into a variable y (step S56), reads Clip information specified by the y-th Clip_information_file_name in PlayItem#x to the scenario memory 21 (step S57), converts the current PTM to an I picture address u using the EP_map of the current Clip information (step S58), and converts the Out_time of PlayItem#x to an I picture address v using the EP_map of the current Clip information (step S59). After changing the I picture addresses u and v in this way, the playback control engine 32 moves to step S46. TS packets of another AVClip are read according to the move to step S46, and hence the contents of the video are switched.

Figure 35:
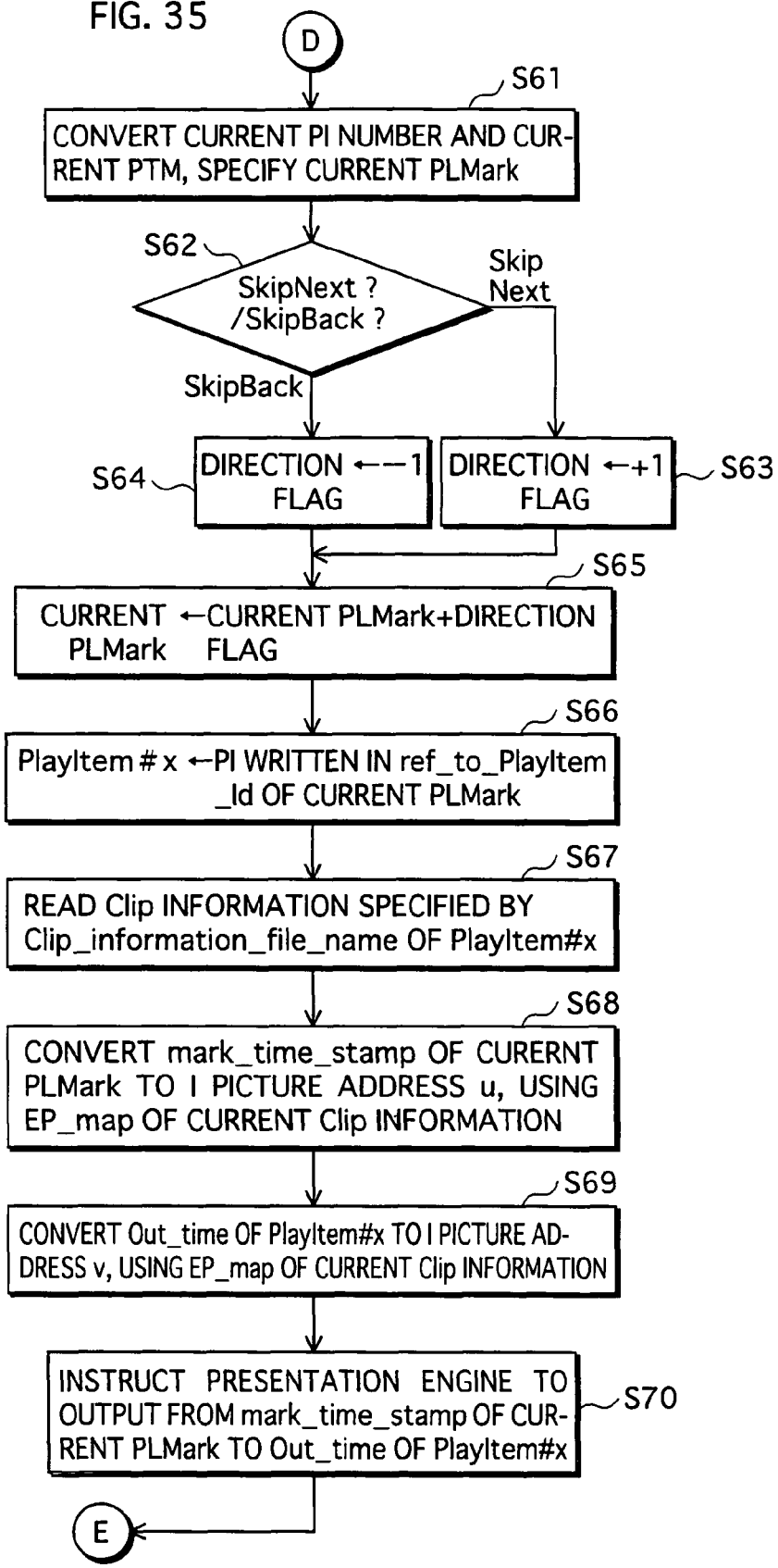
FIG. 35 is a flowchart showing processing when a Skip-Back or SkipNext API is called.

Meanwhile, at step S52 in the loop in FIG. 34, the playback control engine 32 judges whether or not there has been a call for an API signifying SkipBack/SkipNext from the Java virtual machine 38, and if there has been such a call, executes the processing of the flowchart of FIG. 35. FIG. 35 is a flowchart showing processing when a SkipBack or SkipNext API is called. There are a wide variety of ways in which SkipBack and SkipNext can be executed. It should be noted that the description given here is simply one example.

At step S61, the playback control engine 32 obtains the current Mark information by converting the current PI number and the current PTM shown in the PSR. At step S62 the playback control engine 32 judges whether the key that was pressed is the SkipNext key or the SkipBack key. The playback control engine 32 sets a direction flag to +1 if the pressed key is the SkipNext key, and to −1 if the pressed key is the SkipBack key.

At step S65, the playback control engine 32 sets, as the number of the current PLMark, a number that is a total of the number of the current PLMark and the value of the direction flag. If the pressed key is the SkipNext key, the direction flag is set to +1, and therefore the current PLMark is incremented. If the pressed key is the SkipBack key, the direction flag is set to −1, and therefore the current PLMark is decremented.

At step S66, the playback control engine 32 sets the PI written in the ref_to_PlayItem_Id of the current PLMark, as PlayItem#x, and at step S67, reads the Clip information specified by the Clip_information_file_name of PlayItem#x. At step S68, the playback control engine 32 converts the mark_time_stamp of the current PLMark to an I picture address u using the EP_map of the current Clip information. On the other hand, at step S69, the playback control engine 32 converts the Out_time of PlayItem#x to an I picture address v using the EP_map of the current Clip information. At step S70, the playback control engine 32 instructs the presentation engine 31 to output from the mark_time_stamp through to the Out_time of PlayItem#x, and then moves step S47 of FIG. 33. As a result of changing the I picture addresses u and v in this way, and moving to step S47 after instructing playback of another part, TS packets from another AVClip are read, thus realizing the switching of the video contents.

Figure 36:
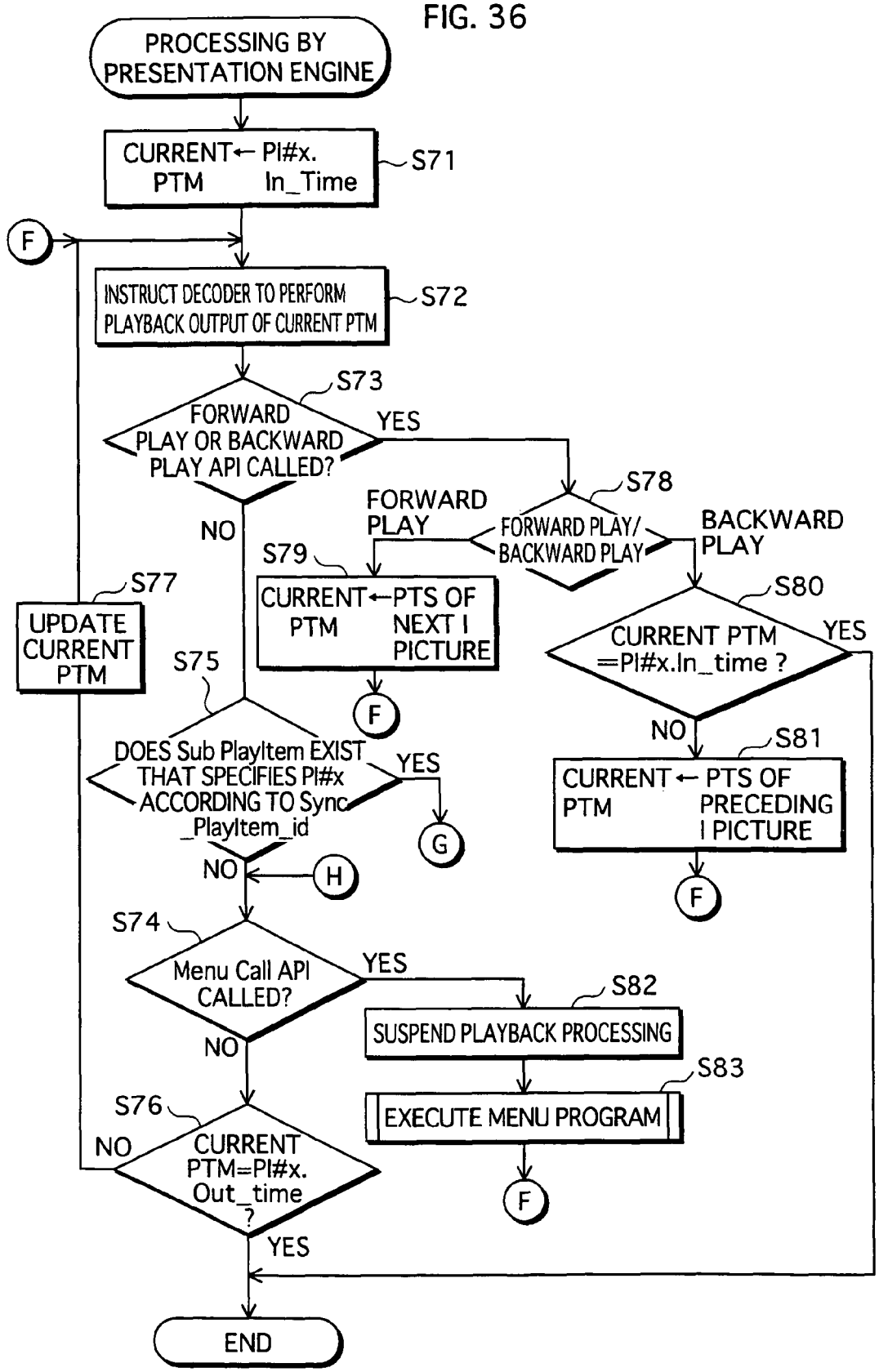
FIG. 36 is a flowchart showing details of processing by the presentation engine 31.

FIG. 36 is a flowchart showing details of processing by the presentation engine 31. This flowchart includes setting of the PTS of the I picture in the current PTM (step S71), and subsequent execution of loop processing composed of step S72 to step S77.

Next the loop processing in step S72 to step S77 is described. This loop processing repeats playback output of picture and audio corresponding to the current PTM and updating of the current PTM. Step S76 in this loop processing specifies the requirement for ending the loop processing. In other words, step S76 specifies that the requirement for ending the loop processing is that the current PTM is the Out_time of PI#x.

At step S73, the presentation engine 31 judges whether there has been a call for a Forward Play API or a Backward Play API from the Java virtual machine 38. If there has been a call, the presentation engine 31 judges at step S78 which of a Forward Play API and a Backward Play API the call is for, and if the call is for a Forward Play API, sets the PTS of the next I picture as the current PTM (step S79). By setting the PTS of the next I picture as the current PTM is this way, the AVClip is played jumping one second at a time. As a result, the AVClip is played fast in the forward direction at double speed or the like. If the call is for a Backward Play API, the presentation engine 31 judges whether or not the current PTM has reached the Out_time of PlayItem#x (step S80). If the Out_time has not been reached, the PTS of the directly preceding I picture is set as the current PTM (step S81). By setting the read-destination address A as the preceding I picture in this way, the AVClip is played in the backward direction jumping one second at a time. As a result, the AVClip is played in the reverse direction at double speed or the like. Note that there are a wide variety of ways in which Forward Play and Backward Play can be executed. It should be noted that the description given here is simply one example.

At step S74, the presentation engine 31 judges whether or not a menu call API has been called, and if a menu call API has been called, suspends the present playback processing (step S82), and executes a menu program that is for menu processing (step S83). According to the above processing, if there is a menu call, the processing for menu display is executed after suspending playback processing.

Figure 37:
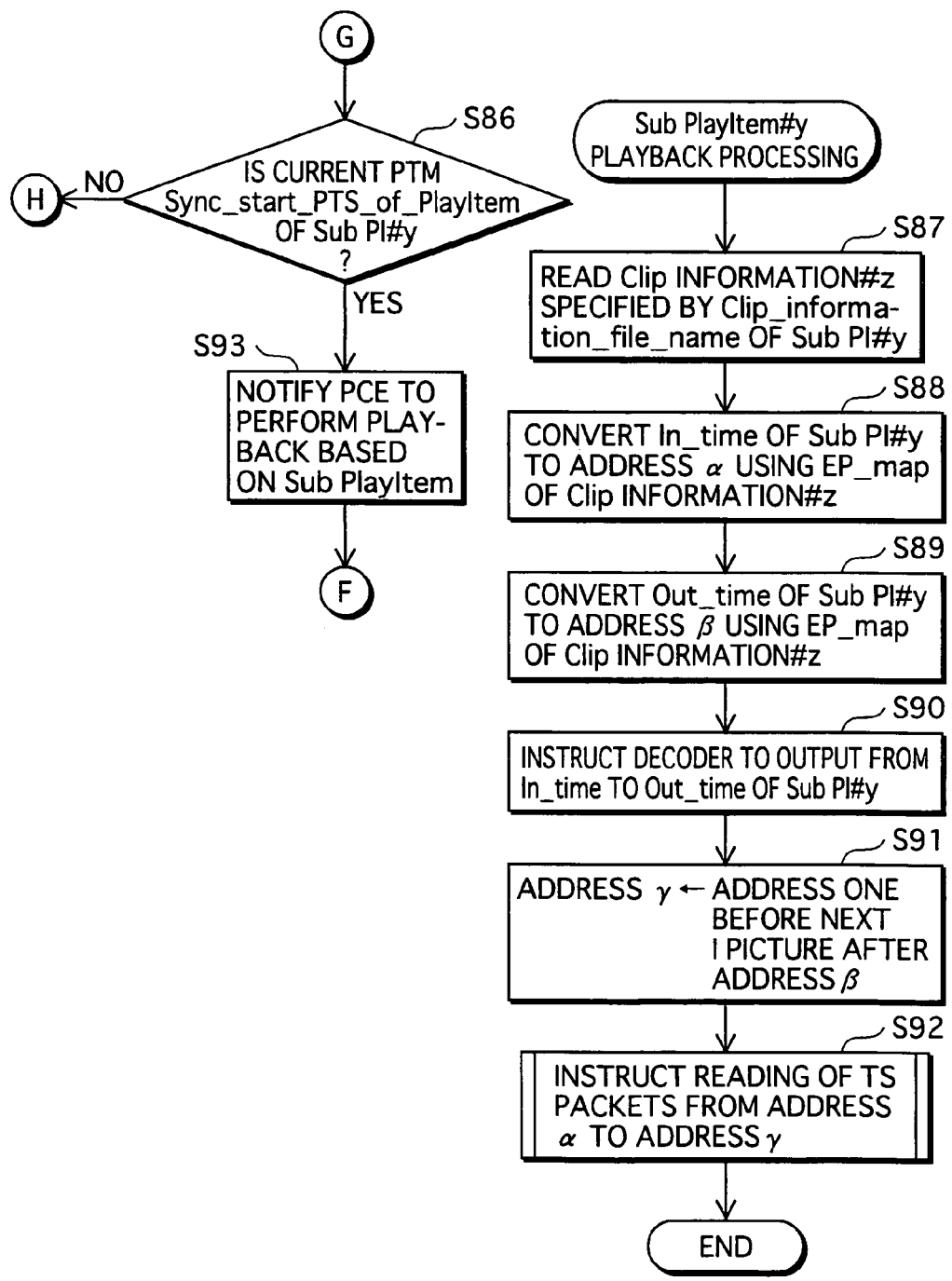
FIG. 37 is a flowchart showing a SubPlayItem playback procedure.

At step S75, the presentation engine 31 judges whether or not a SubPlayItem#y that specifies PlayItem#x according to a sync_PlayItem_id exists, and if so, moves to the flowchart of FIG. 37. FIG. 37 is a flowchart showing a SubPlayItem playback procedure. In this flowchart, the presentation engine 31 first judges at step S86 whether or not the current PTM is the sync_start_PTS_of_playItem of SubPlayItem#y. If so, at step S93, the presentation engine 31 instructs the playback control engine 32 to perform playback processing based on SubPlayItem#y.

Step S87 to step S92 of FIG. 37 are a flowchart showing playback processing based on SubPlayItem#y.

At step S87, the presentation engine 31 reads the Clip information specified by the Clip_information_file_name of the SubPlayItem#y. At step S88, the presentation engine 31 converts the In_time of SubPlayItem#y to an address a using the EP_map of the current Clip information. On the other hand, at step S89, the presentation engine 31 converts the Out_time of SubPlayItem#y to an address β using the EP_map of the current Clip information. At step S90, the presentation engine 31 instructs the decoder to output from the In_time of SubPlayItem#y to the Out_time of SubPlayItem#y. The presentation engine 31 finds the next I picture after the address β obtained by the conversions, and sets the address one before the found I picture as an address γ (step S91). The presentation engine 31 instructs the BD-ROM drive 1 or the HDD 17 to read the TS packets from the address α and the address γ in SubClip#z using the address γ calculated in this way (step S92).

Returning to FIG. 33, the following describes processing by the playback control engine 32. At step S53, the playback control engine 32 judges whether or not playback control by the presentation engine 31 is complete, and the result of step S53 is "NO" as long as the processing of the flowchart of FIG. 36 is being performed with respect to the last PlayItem#x. Once the processing of the flowchart of FIG. 36 has ended, the result of step S53 is "YES", and the playback control engine 32 moves to step S54. At step S54, the playback control engine 32 outputs a playback completion event to the Java virtual machine 38. This output enables the Java virtual machine 38 to know that the playback time of two hours has elapsed.

Figure 38:
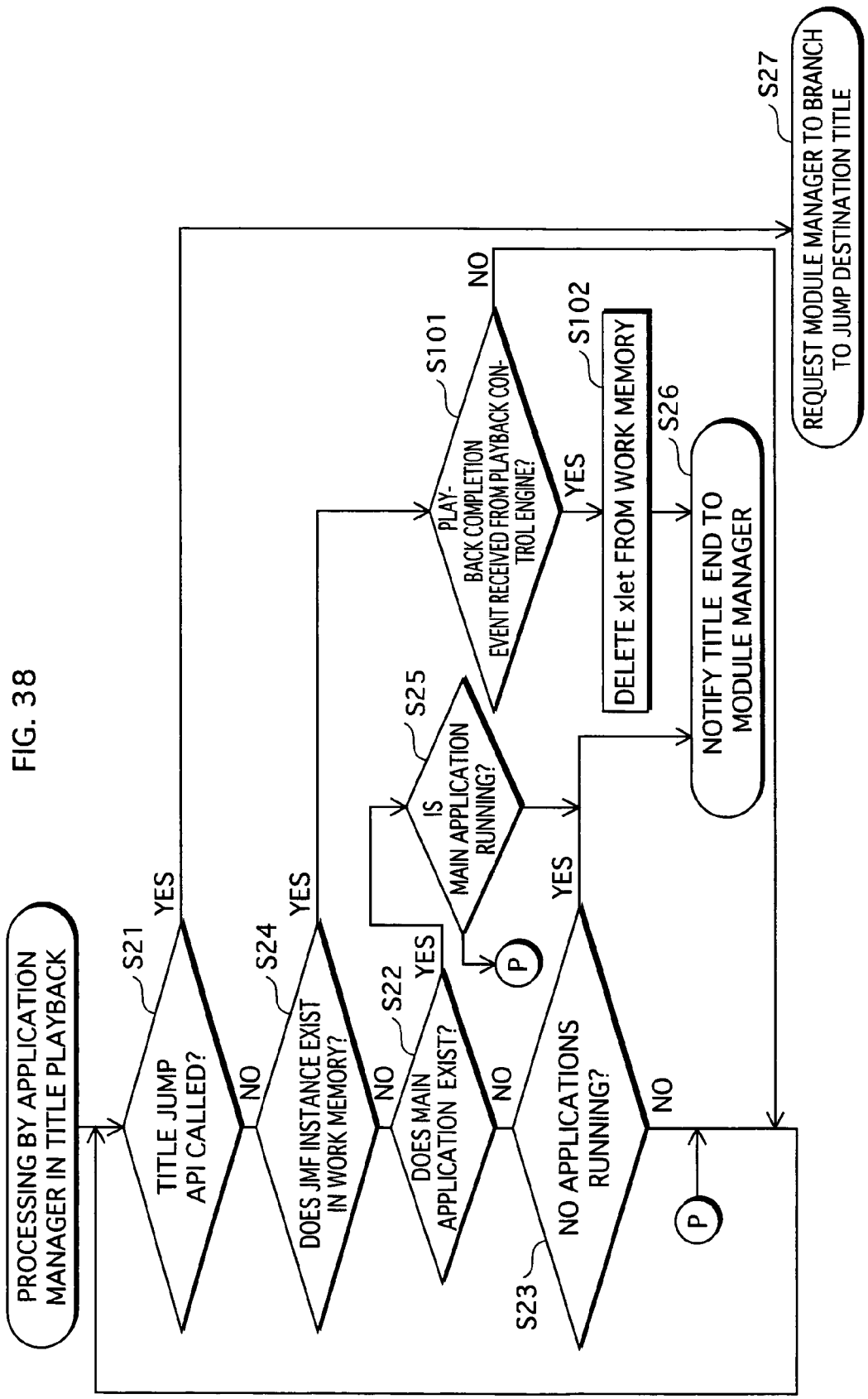
FIG. 38 is a flowchart showing processing by the application manager 36 in the fifth embodiment.

This completes the processing by the playback control engine 32 and the presentation engine 31 of the present embodiment. The following describes processing by the application manager 36 in the present embodiment. FIG. 38 is a flowchart showing processing by the application manager 36 in the fifth embodiment.

The flowchart of FIG. 38 is an improvement of the flowchart of FIG. 27. The improvement is the addition of a step S24 between step S21 and step S22, and existence of a step S101 that is executed when the result of step S24 is "YES".

At step S24, the application manager 36 judges whether or not a JMF player instance exists in the work memory 37, and if a JMF player instance does not exist in the work memory 37, moves to step S22. If a JMF player instance does exist in the work memory 37, the application manager 36 moves to step S101. At step S101, the application manager 36 judges whether or not a playback completion event has been output by the playback control engine 32, and if a playback completion event has been output, deletes the Java player instance in the work memory (step S102), and notifies the module manager 34 that the Title has ended (step S26). If the application manager 36 does not make this notification, the loop processing composed of step S21 to step S24 is repeated.

In the above flowchart, as long as a JMF player instance exists in the work memory 37 (YES at step S24), step S22 and step S23 are skipped. For this reason, the Title is interpreted as continuing even if all applications are terminated.

In this way, according to the present embodiment, the application manager 36 is able to grasp the point at which the playback time of two hours has elapsed. This enables a menu whose condition for being displayed is the end of PL playback to be displayed, and enables control to be performed such that a branch is performed to another Title in response to an operation performed with respect to the menu.

Sixth Embodiment

The sixth embodiment relates to an improvement in providing data management tables in BD-J objects.

Figure 39:
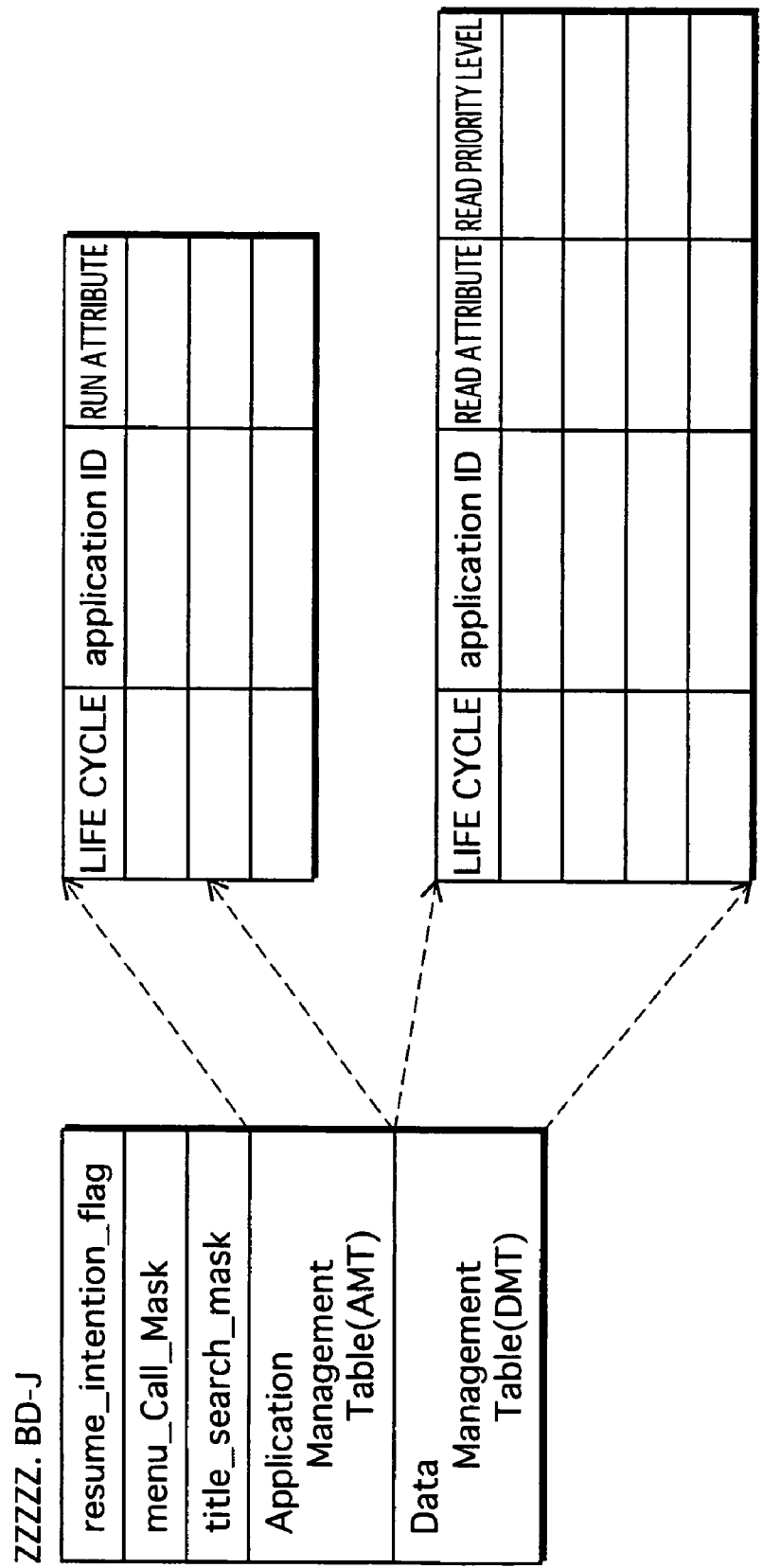
FIG. 39 shows an example of a data management table.

A data management table (DMT) is a table in which each of Java archive files to be loaded into the local memory 29 on the Title time axis thereof is in correspondence with a read attribute and a read priority level. "Living in local memory 29" refers to a state in which a Java archive file that constitutes the application can be read from the local memory 29 and transferred to the work memory 37 in the Java virtual machine 38. FIG. 39 shows an example of a data management table. As shown in FIG. 39, the data management table shows a "life cycle" of each application, an "application ID" that identifies the application that has the life cycle, a "read attribute" of the application and a "read priority" of the application.

The concept of life cycle that exists in the application management table described earlier is the same as concept of the life cycle of the data management table. Although the it may seem pointless to provide the same concept as the application management table in the data management table, there is a purpose to this.

FIG. 40 shows an execution model that assumes a BD-J object. The execution model in FIG. 40 is composed of a BD-ROM, the local memory 29, and the Java virtual machine 38, and shows the relationship between the BD-ROM, the local memory 29, and the work memory 37. An arrow my1 indicates reading between from the BD-ROM to the local memory 29, and an arrow my2 indicates reading from the local memory 29 to the work memory 37. The explanatory notes with each of the arrows show the timing with which that reading is performed. According to the explanatory notes, the reading from the BD-ROM to the local memory 29 is so-called "pre-reading", and must be performed before the application is required.

Further it can be seen from the explanatory notes that the reading from the local memory 29 to the work memory 37 is performed when the application becomes required. "Becoming required" denotes (1) the point in time at which the life cycle of the application arrives, and (2) a call for the application is instructed by another application or the application manager 36.

An arrow my3 indicates freeing of an area occupied by the application in the work memory 37, and an arrow my4 indicates freeing of an area occupied by the application in local memory 29. The explanatory notes indicate the timing with which this reading is performed. As can been seen from the explanatory notes, the work memory 37 is freed simultaneously with termination of the application. On the other hand, the local memory 29 is freed at the point when the application is no longer required by the Java virtual machine 38. The point when the application is no longer required refers not to the "termination point", but to the point, after the termination point, when there is no possibility that the application will be rerun, in other words, the point when the Title ends. Of this reading and freeing, the point at which the work memory 37 is freed is determined based on the life cycle in the application management table. However, it is not possible to specify the point before the application is required, or the point, after termination, when there is no possibility that the application will be rerun. For this reason, the cycles for which the application live are written separately to the application management table in the data management table during the authoring stage, in order to specify the various points on the overall time axis of the disc content. In other words, by defining the point before an application is required as a start point of the life cycle in the data management table, and defining the point when there is no possibility that the application will be rerun as the end point of the life cycle in the data management table, the described changes in what the local memory 29 stores can be specified at the authoring stage. This is the significance of defining the data management table.

Figures 41A, 41B:
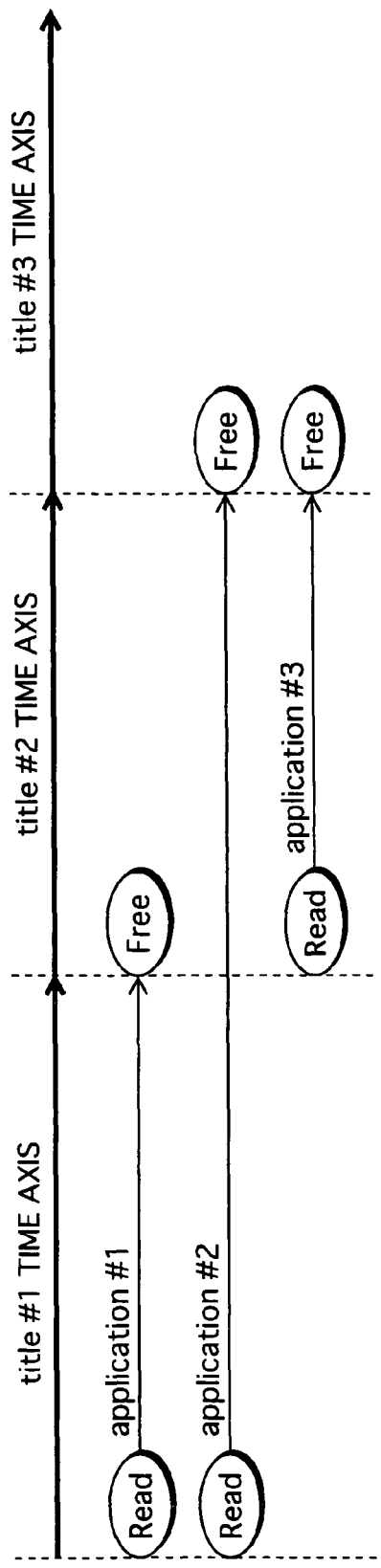
FIG. 41A shows life cycles of showing life of Java archive files in the local memory 29.
FIG. 41B shows data management tables written for specifying the Java archive file life cycles of FIG. 41A.

The following describes how the life cycles in the local memory 29 are defined in the data management table. Here, the disc content to be produced is composed of three Titles (Title#1, Title#2, and Title#3). These Titles are assumed to use the local memory 29 with the timing on the time axes of the Titles as shown in FIG. 41B. In this case, Java archive files that constitute application#1 and application#2 are read to the local memory 29 at the staring point of the Title#1 time axis, and are kept in the local memory 29 while the Title#1 time axis continues. Next, the Java archive file that constitutes application#1 is freed from the local memory 29 at the start point of the Title#2 time axis, and, in place of application#2, the Java archive file that constitutes application#3 is read to the application memory 29 and kept therein (Hereinafter, "application" is used in the same sense as the Java application files that constitute an application). Here, the data management table is written as in FIG. 41A, and writing the application IDs of the applications in correspondence with the life cycles of the applications makes it possible to express which application should be kept in the local memory 29. In FIG. 41A, the applicationID of application#1 is in written correspondence with Title#1, the applicationID of application#2 is in correspondence with Title#1 and Title#2, and the application ID of the application#3 is written in correspondence with Title#3. Defining correspondence in this way means that the temporal change of the occupation of the local memory 29 is specified by the author.

In terms of the combination of the data management table and the application management table, it is preferable that the life cycles specified in the application management table are defined in small units of playback, while the life cycles specified in the data management table are rough units of playback. The rough units of playback are preferably units of non-seamless playback, such as Titles and PLs. On the other hand, the small units of playback are preferably units of seamless playback such as chapters in PLs. If the life cycle of an application is set for each Title and each PL, the application will exist in the local memory 29, and therefore will be in a state of being able to be extracted at any time during playback of a Title. If the application is able to be extracted at any time during playback of the Title, the application will be able to be read to the work memory in the virtual machine immediately, even if the life cycle of the application is set in small units of playback. This means that the application will be able to be executed smoothly even if it is run and terminated frequently.

The following describes read attributes.

Although the Java archive files shown in FIG. 2 were assumed to be recorded in a separate recording area to the AVClips, this is simply one example. There are cases in which the Java archive files are embedded in the recording area occupied by the AVClips on the BD-ROM. There are two embedding formats: carousels and interleave units.

Here, the carousel format denotes converting data to a broadcast method in which the same content is repeatedly broadcast in order to realize interactive broadcasting. Although the BD-ROM does not store broadcast data, the BD-ROM stores Java archive files in the fashion of a carousel broadcast method in the present embodiment. FIG. 42 shows how Java archive files are embedded according to the carousel method. The first row is the Java archive files embedded in an AVClip, and the second row shows the data made into a section. The third row shows the data made into TS packets, and the fourth row shows the TS packet series the constitutes the AV clip. The data that has been made into a section and into TS packets ("D" in FIG. 42), is embedded in the AVClip. The java archive files multiplexed on the AVClip as carousels are read at a low band. This low-frequency reading takes considerable time, typically two to three minutes, and therefore the playback apparatus spends two to three minutes reading the Java archive files.

FIG. 43A shows how Java archive files are embedded according to interleaving. The first row is an AVClip into which the Java archive files are to be embedded, the second row is the Java archive files interleaved in the AVClip, and the third row shows the arrangement of the AVClip in the recording area of the BD-ROM. As shown in FIG. 43A, the Java archive files to be embedded in the stream are interleaved, and recorded between the separate parts (AVClip 2/4 and AVClip 3/4 in FIG. 43A) that constitute XXXXX.m2ts that constitutes the AVCLip. This interleaving enables the Java archive files multiplexed on the AVClip to be read with relatively high frequency compared to the carousel format. The playback apparatus can read the Java archive files in a relatively short amount of time due to this high-frequency reading.

The Java archive files in the carousel format or the interleaved format are not preloaded, but are loaded into the local memory 29 of the playback apparatus when the current playback position reaches the part of the AVClip recording area on the BD-ROM in which the Java archive files in the carousel format or the interleaved format are embedded. Instead of the manner shown in FIG. 2, the Java archive files may be recorded in the manner shown in FIG. 42 or in FIG. 43A. A read attribute may be set as shown in FIG. 43B. The types of read attribute are: "Preload" showing that the Java archive file should be read to the local memory 29 before Title playback; "Load. Carousel" showing that the Java archive file should be read in carousel format during Title playback, and "Load.InterLeave" showing that the Java archive file should be read in interleaved format during Title playback. Although the read attributes are expressed with suffixes showing whether to read in carousel format or interleaved format, these suffixes may be omitted.

A specific example of how life cycles are defined in a data management table is described with reference to FIGS. 44A and 44B. FIG. 44A shows an example of a data management table. FIG. 44B shows changes in the storage content of the local memory 29 according to allocation by the data management table. In FIG. 44B, the vertical axis direction shows the occupied area of the local memory 29, and the horizontal axis shows the PL time axis of one Title. The life cycle of application#1 is defined in the data management table as the entire PL time axis of the one Title, and therefore application#1 occupies area in the local memory 29 during Chapter#1 to Chapter#5. The life cycle of application#2 is defined in the data management table as Chapter#1 and Chapter#2 in PL#1 in the Title, and therefore application#2 occupies area in the local memory 29 during Chapter#1 to Chapter#2. The life cycle of application#3 is defined in the data management table as Chapter#4 and Chapter#5 in PL#1 in the Title, and therefore application#3 occupies area in the local memory 29 during Chapter#4 to Chapter#5. This completes the description of life cycles in the data management table.

Figure 45A:
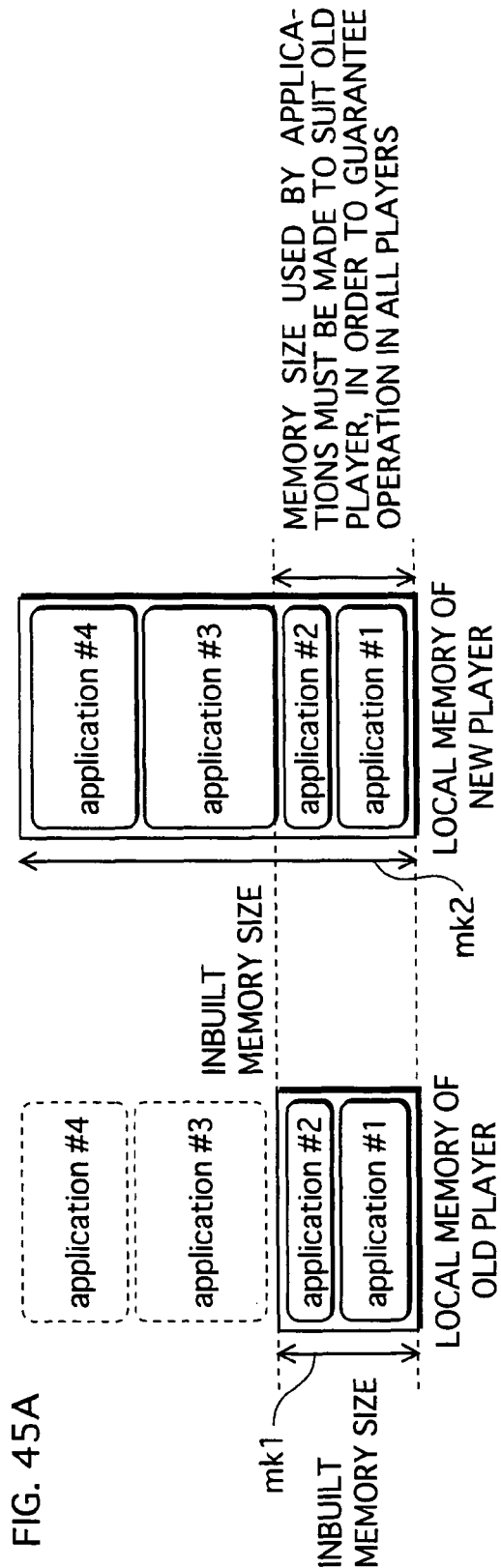
FIG. 45A shows a comparison of memory scales of the local memory 29 in both a new playback apparatus and an old playback apparatus.

Next, the read priority level is described. The read priority level is a priority level that determines priority with respect to reading to the local memory 29. The priority level has one of a plurality of possible values. If two levels of priority are provided, the read priority level is set to a value showing Mandatory or a value showing Optional. In this case, Mandatory shows a high read priority level and Optional shows a low read priority level. If three levels of priority are provided, the read priority level is set to a value showing Mandatory, or a value showing Optional:high or Optional:low. Mandatory shows the highest read priority level, Optional:high shows a medium read priority level, and Optional:low shows a low read priority level. A specific example of how read priority levels are defined in the data management table is described with reference to FIGS. 45A and 45B. The local memory 29 is assumed to have memory scale such as shown in FIG. 45A. FIG. 45A shows a comparison of memory scales of the local memory 29 in both a new playback apparatus and an old playback apparatus. An arrow mk1 shows the memory scale in an old playback apparatus, and an arrow mk2 shows the memory scale in a new playback apparatus. Comparing the arrows, the memory scale of the local memory 29 in the new playback apparatus is estimated to be at least three times that of the old playback apparatus. In view of such variation in memory scale, applications are classified into two groups such as shown in FIG. 45B. The first group is applications that should be read regardless of the memory scale (application#1, application#2). The second group is applications that it is not desirable to read in an old playback apparatus, but it is desirable to read in a new playback apparatus (application#3, application#4). If applications to be read are classified into these two groups, a read priority level of Mandatory is set with respect to applications belonging to the former group, and read priority level of Optional is set with respect to applications belonging to the latter group. FIG. 45B shows an example of the data management table in which read priority levels have been set. If application#1 to application#4 are recorded on the BD-ROM with the data management table having been set in this way, playback can be guaranteed in playback apparatuses of various memory scales, and playback apparatuses with large memory scales can be made to play applications using data that is even larger in size.

This completes the improvement relating to the recording medium of the present embodiment. The following describes an improvement relating to the playback apparatus of the present embodiment. The application manager 36 performs processing according to procedure shown in FIG. 46, to respond to the described improvement in the recording medium.

Figure 46:
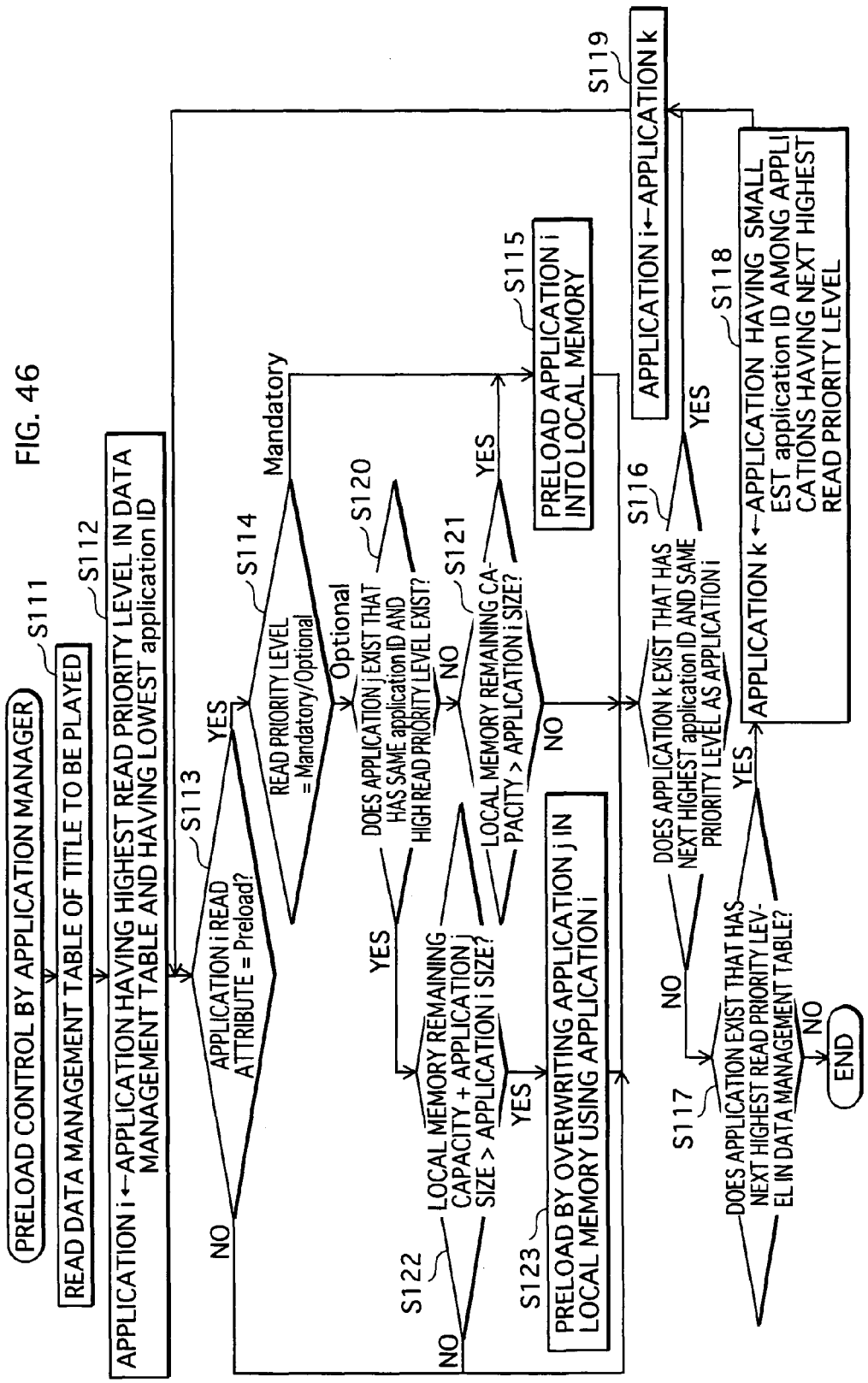
FIG. 46 shows processing for preload control by the application manager 36.

FIG. 46 shows processing for preload control by the application manager 36. The flowchart includes loop processing in which the following is repeated: the application manager 36 reads the data management table of the Title to be played (step S111), sets, as application i, the application that has the highest read priority level in the data application management table and that has the lowest application ID (step S112), and after judgments at step S113 and step S114, preloads application i into the local memory 29 (step S115). The application manager 36 repeats this processing until the result of the judgment at step S116 is "NO" and the result of the judgment at step S117 is "NO".

At step S113, the application manager 36 judges whether or not the read attribute of application i is Preload, and at step S114, judges whether the read priority level is Mandatory or Optional. If the read attribute is judged to be Preload at step S113 and the read priority level is judged to be Mandatory at step S114, the application is preloaded into the local memory 29 (step S115). If the read attribute is judged to be Load at step S113, step S114 and step S115 are skipped.

Of the two steps that specify requirements for ending the loop processing, at step S116 the application manager 36 judges whether or not an application k exists that has the next highest applicationID after application i and has the same read priority level as application i. If such an application k exists, the application manager 36 sets this application k as application i (step S119).

Of the two steps that specify requirements for ending the loop processing, at step S117 the application manager 36 judges whether or not any applications that have the next lowest read priority level in the data management table, and if such applications exit, the application manager 36 selects the one among the applications having the next lowest read priority level that has the lowest applicationID, as application k (step S118), and sets application k as application i (step S119). The processing from step S113 to step S115 is repeated as long as the result of step S116 and step S117 is "YES". The processing of the flowchart ends when there are no longer any relevant applications at step S116 and step S117.

Step S120 to step S123 are processing that is executed when the read priority level is judged to be Optional at step S114.

At step S120, the application manager 36 judges whether or not an application j exists that has the same applicationID and has a high priority level.

At step S121, the application manager 36 judges whether or not the remaining capacity of the local memory 29 exceeds the size of application i. If the result of step S120 is "NO" and the result of step S121 is "YES", application i is preloaded to the local memory 29 at step S115. If the result of step S120 is "NO" and the result of step S121 is "NO", the processing moves to step S116 without application i being preloaded in the local memory.

By processing in this way, data for which the read priority level is Optional is not preloaded into the local memory 29 unless the results of the judgments at step S120 and step S121 are "YES". With an old playback apparatus that has a small memory scale, the result of the judgment at step S121 will be "NO" after approximately two or three applications have been read, but with a new playback apparatus that has a large memory scale, a result "NO" will not be produced in the judgment at step S121. In this way, only applications that are "Mandatory" are read to the local memory 29 in an old playback apparatus, whereas applications that are "Mandatory" and applications that are "Optional" are read to the local memory 29 in a new playback apparatus.

Step S122 is executed if the result of the judgment at step S120 is "YES". If an application j that has the same application ID and a high read priority level exists, the application manager 36 judges whether or not the total of the remaining capacity of the local memory 29 and the size of application j exceeds the size of application i (step S122), and if the total exceeds the size of application i, preloads application i into the local memory 36 by overwriting application j (step S123). If the total does not exceed the size of application i, the processing moves to step S116 without preloading application i into the local memory 29.

An example of read processing at step S115 and step S123 is described with reference to FIG. 47A. FIG. 47A shows an example of a data management table assumed in this specific example is based. Each of three applications in FIG. 47A is stored in three files that have the same application ID (application ID=1), but mutually different read priority levels (Mandatory, Optional:high, Optional:low). If a data management table set in this way is the target of processing, the application that has a read priority level "Mandatory" is read to the local memory 29 according to step S115. However, applications having the read priority level "Optional" will be read after the judgments at step S120 to step S122, at step S123. Unlike step S115, at step S123 an application is preloaded so as to overwrite an application having the same application ID that already exists in the local memory 29, and therefore one of a plurality of applications is read exclusively to the local memory 29.

i) When reading the application having the read priority level "Optional:high" after the application having the read priority level "Mandatory" has been read, the application having the read priority level "Mandatory" remains in the local memory 29 if the result of the judgment at step S122 is "NO". When reading the application having the read priority level "Optional:high" after the application having the read priority level "Mandatory" has been read, if the result of the judgment at step S122 is "YES", the application having the read priority level "mandatory" is overwritten with the application having the read priority level "Optional:high", and the application having the read priority level "Optional:high" remains in the local memory 29.

ii) When reading the application having the read priority level "Optional:low" after the application having the read priority level "Optional:high", the application having the read priority level "mandatory" remains in the local memory 29 if the result of the judgment at step S122 is "NO". When reading the application having the read priority level "Optional:low" after the application having the read priority level "Optional:high", if the result of the judgment at step S122 is "YES", the application having the read priority level "Optional:high" is overwritten with the application having the read priority level "Optional:low" (step S123), and the application having the read priority level "Optional:low" remains in the local memory 29.

Processing to overwrite the applications in the local memory 29 is repeated as long as the capacity of the local memory 29 allows it, and therefore the storage contents of the local memory 29 change in the following manner: Mandatory=Optional:high=>Optional:low, as shown in FIG. 47B. Java archive files of differing sizes are loaded into the local memory 29 in accordance with the memory scale, and consequently, Java archive files can be loaded into the local memory 29 such that those having thumbnail images with minimum necessary resolution are loaded in the case of a playback apparatus having a small memory scale, those having medium-resolution SD images are loaded in the case of a playback apparatus having a medium memory scale, and those having high-resolution HD images are loaded in the case of a playback apparatus having a large memory scale. Loading in this way enables images of differing resolutions to be displayed in accordance with the memory scale, and gives the author a greater range of expression in creating Titles.

Figure 48B:
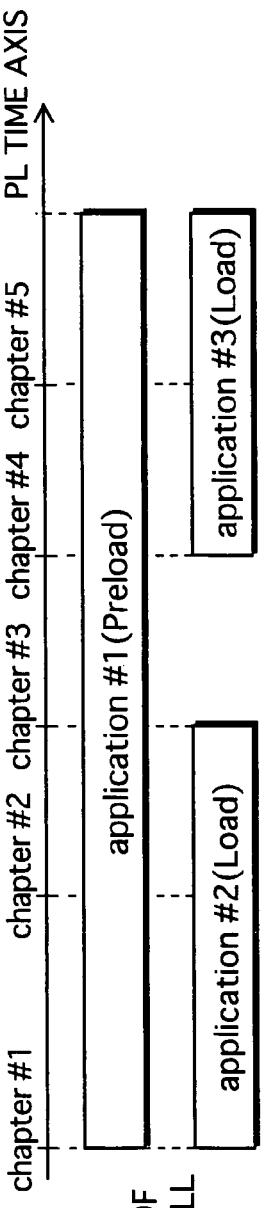
FIG. 48B shows changes in the storage content of the local memory 29 in a playback apparatus having a small memory scale.
Figure 48C:
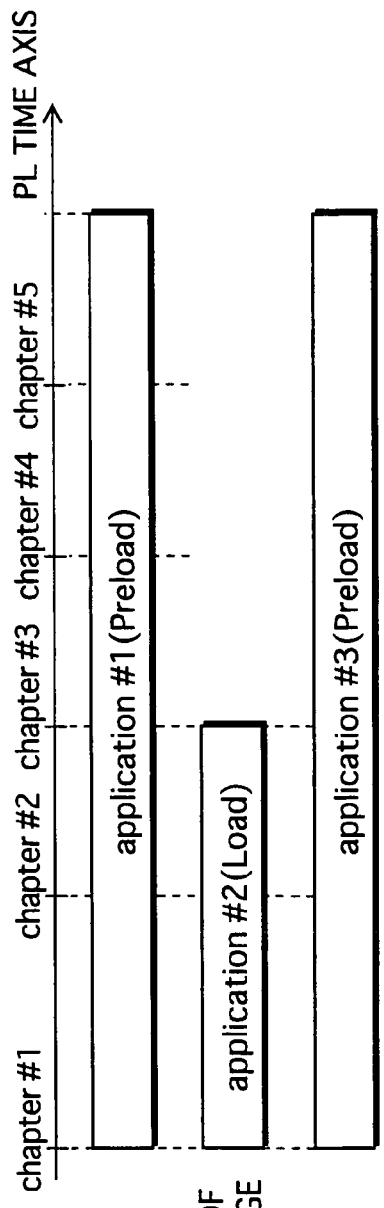
FIG. 48C shows changes in the storage content of the local memory 29 in a playback apparatus having a large memory scale.

FIGS. 48A to 48C show a specific example of reading processing that references a data management table. FIGS. 48A to 48C show two applications that have been assigned the same applicationID (application#3). One of the two applications is embedded in an AVClip and has a read priority level "Mandatory", and the other is recorded as a separate file to the AVClip and has a read priority level of "Optional". Since the former application is embedded in the AVClip, the life cycle of the embedded part is defined as "Title#1:chapter#4-#5". Of the applications, application#2 and application#3 are assigned the read attribute "Load", application#2 has a life cycle "Chapter#1 to Chapter#2", and application#3 has a life cycle "Chapter#4 to Chapter#5". Therefore, at a given point on the Title time axis, one of the two is always exclusively in the local memory 29. FIG. 48B shows application#2 and application#3 stored exclusively at different points on the Title time axis. This is in consideration of playback in a playback apparatus that has only the minimum necessary memory scale. With the data management table having the described contents as the target of processing, the application manager 36 performs processing different to that in the above FIG. 46, in accordance with the memory scale.

The latter application has a read priority level "Load", and therefore is loaded into the local memory 29. With such processing, the application manager can load data into the local memory 29 as long as there is sufficient memory scale for applications having the read attribute "Mandatory". The problem here is the timing with which a playback apparatus having a large memory scale reads. Despite having a large memory scale, such a playback apparatus cannot read application#3 until reaching Chapter#4-Chapter#5, and therefore the memory scale is wasted. In view of this problem, in the data management table of FIG. 48A, the same application#3 is recorded on the BD-ROM, having being given a read attribute showing "Preload", and the applications are given the same applicationID.

The former application has a read priority level "Optional", and therefore is preloaded only if the result of step S121 is "YES" (step S115). This enables a playback apparatus having a large memory scale to load an application the same as an application embedded in an AVClip to the local memory 29 without waiting to reach Chapter#4-Chapter#5 of Title#1 (FIG. 48C).

This completes the processing when preloading. The following describes the procedure for processing when loading.

FIG. 49 shows the procedure for load processing based on a data management table. This flowchart includes loop processing composed of step S131 to step S133 that is repeated while playback of a Title continues.

At step S131, the application manager 36 judges whether or not the start of the life cycle of an application having an run attribute showing AutoRun has been reached. If the start of the life cycle has been reached, the application manager 36 sets the application having the run attribute showing AutoRun as an application q (step S134), issues a run instruction instructing running of application q to the Java virtual machine 38, and causes the application q to be read from the local memory 29 to the work memory 37 (step S135).

At step S133, the application manager 36 judges whether playback of all PLs in the Title has ended. This judgment is made based on whether or not a playback completion event is received from the playback control engine 32, as shown in the fifth embodiment. If playback has ended, the processing in the present flowchart ends.

At step S132, the application manager 36 judges whether or not there has been a call from an application currently running. If there has been a call, the application manager 36 sets the call destination application as application q (step S136), and judges whether or not the current playback position corresponds to the life cycle of application q in the application management table (step S137). If the current playback point does not correspond to the life cycle of application q, display is performed to indicate a run failure (step S148), and the application manager 36 returns to the loop processing composed of step S131 to step S133. If the current playback point corresponds to the life cycle of application q, the application manager 36 performs load processing in accordance with the flowchart in FIG. 50.

Figure 50:
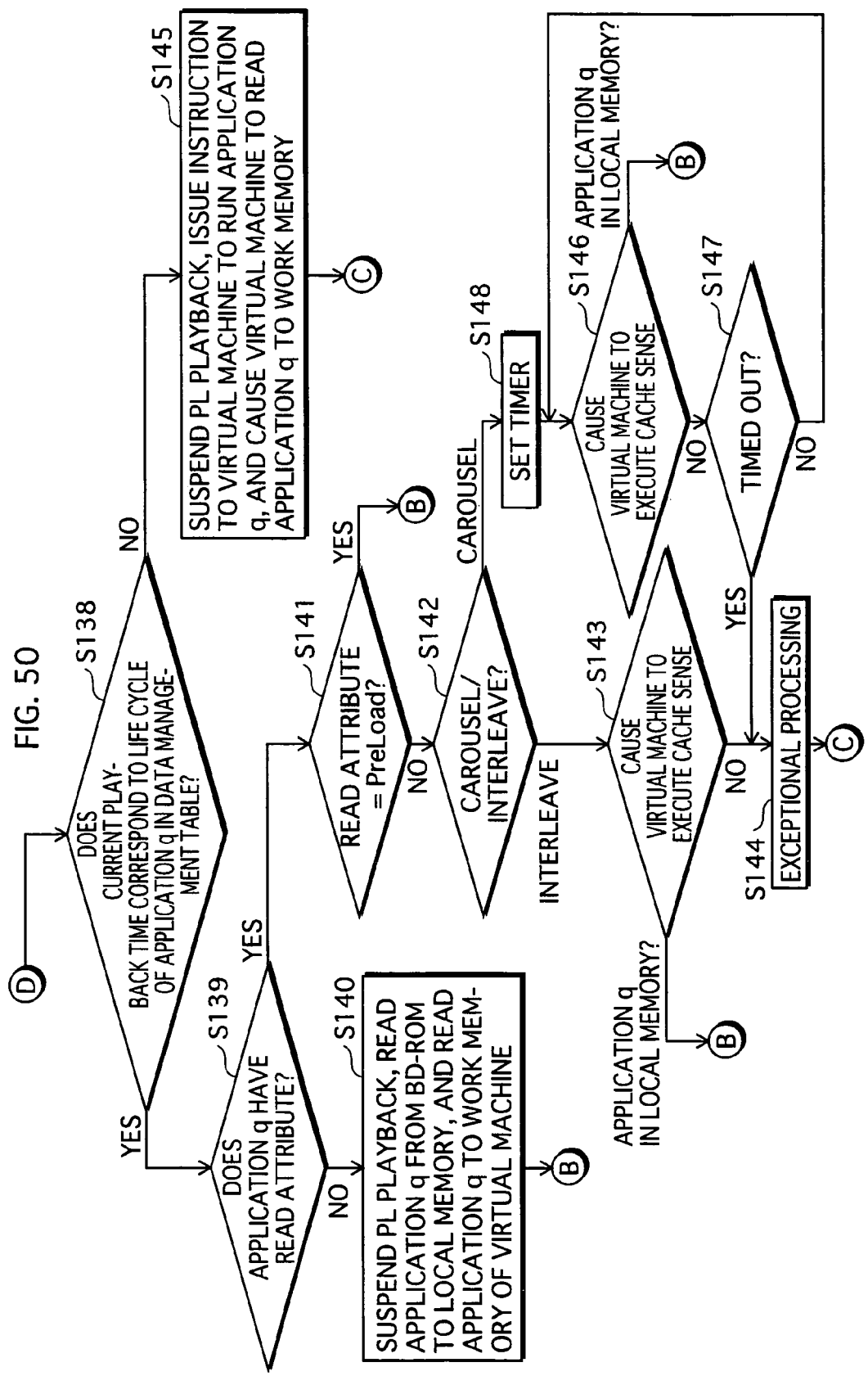
FIG. 50 shows the processing procedure of the application manager 36 when a current playback position reaches the life cycle of an application q.

At step S138 in FIG. 50, the application manager 36 judges whether or not the current playback position corresponds to the life cycle of application q in the data management table. If the current playback position does not correspond to the life cycle, application q cannot be loaded into the local memory 29. In this case, the application manager 36 issues a run instruction instructing running of application q, to the Java virtual machine 38, and the java virtual machine 38 reads application q from the BD-ROM to the work memory 37 directly, not via the local memory 29. In this case, a head scene to read this application occurs, and therefore PLplayback is suspended (step S145).

If the current playback position corresponds to the life cycle, at step S139 the application manager 36 judges whether or not a read attribute is attached to the application. If there is no read attribute, this means that application q is either in carousel format or interleaved format. However, application q is permitted to be put into the local memory 29 even if it does not have an attached read attribute. In view of this, reading of the application is performed with the knowledge that playback will be suspended. In other words, after the application is read from the BD-ROM to the local memory 29, it is then read to the work memory 37 (step S140).

Step S141 to step S146 is processing that is performed if the result of the judgment at step S139 is "YES". At step S141 the application manager 36 refers to the read attribute to judge whether or not the application is preloaded. If the application is preloaded, the application manager 36 moves to step S135.

Step S142 is a judgment step that is executed if the read attribute is "load". At step S142 the application manager 36 judges whether application q is in carousel format or interleaved format. If application q is in interleaved format, the application manager 36 makes the Java virtual machine execute cache sense (step S143). If application q exists in the local memory 29, the application manager 36 moves to step S135, and has application q loaded in the Java virtual machine 38.

If the application is not in the local memory 29, exception processing such as branching to the top menu Title is performed (step S144). If the application is in carousel format, the application manager 36 sets a timer (step S148), and has the Java virtual machine 38 execute cache sense (step S146) until the timer times out (step S147). If application q appears in the local memory 29, the application manager moves to step S135, and has the Java virtual machine 38 load application q. When the timer times out, exception processing such as branching to the top menu Title is performed (step S144).

FIG. 51 illustrates how the Java virtual machine 38 reads applications.

Arrows ⊚1 and ⊚2 indicate reading of a Java archive file that lives in the application management table, lives in the data management table, and has a read attribute showing carousel format or interleaved format. The arrow ⊚1 indicates sensing of the local memory 29 at steps S65 and S67. The local memory 29 performs sensing because data embedded according to carousels or interleaving may exist in the local memory 29. The arrow ⊚2 is a read that corresponds to step S135, and indicates loading from the local memory 29 to the work memory 37 in the case of the application existing in the local memory 29. The arrow with a cross (X) indicates a case of data not existing in the local memory 29.

Arrows ∇1 and ∇2 indicate a read of Java application files that live in the application management table, but do not live in the data management table and do not have a read attribute.

The arrow ∇1 is a read that corresponds to step S145, and indicates a request for a directory read from the BD-ROM by the Java virtual machine 38. The arrow ∇2 indicates the reading of the Java archive file from the BD-ROM to the work memory 37 in response to the request.

Arrows ☆1, ☆2, and ☆3 indicate a read of a Java archive file that lives in the application management table and lives in the data management table, but does not have a read attribute.

The arrow ☆1 is a read that corresponds to step S140, and indicates a request for a directory read from the BD-ROM by the Java virtual machine 38. The arrow ☆2 indicates the reading of the Java archive file from the BD-ROM to the local memory 29 in response to the request. The arrow ☆3 indicates a read of the Java archive file from the local memory 29 to the work memory 37.

As has been described, according to the present embodiment, the number of applications that are kept in the local memory 29 at any one time is specified so as to be no more than a predetermined number, thus effectively avoiding cache mistakes when reading from the local memory. Since applications are guaranteed to be read without cache mistakes, playback of AVCLips does not have to be stopped in order to read an application from the BD-ROM. Eliminating interruptions in playback of AVClip guarantees seamless playback of AVCLips.

Seventh Embodiment

Figures 52A, 52B, 52C:
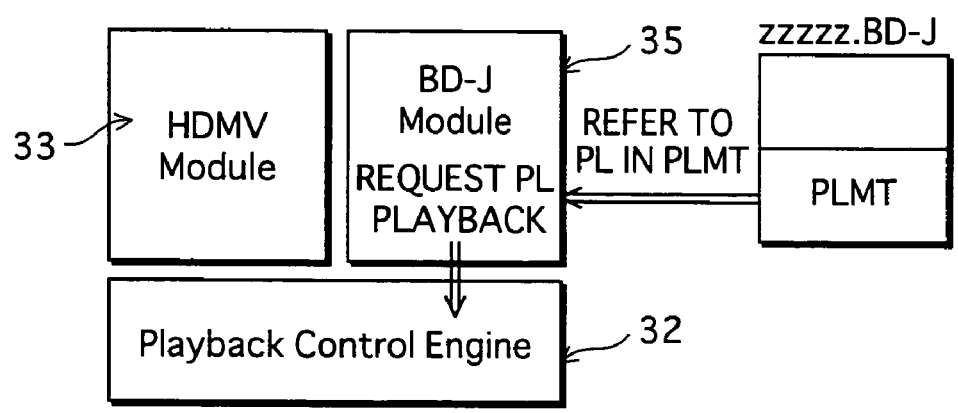
FIG. 52A shows the internal structure of a BD-J object relating to a seventh embodiment.
FIG. 52B shows an example of a PlayList management table.
FIG. 52C shows how the playback apparatus processes in a case of a PL existing whose playback attribute is set to "AutoPlay" in the PlayList management table of a branch destination Title.

In the third embodiment, the time axis of non-AV Titles were set based on the life cycle of applications. However, applications run unstably, and may fail to run or terminate abnormally. The present embodiment proposes a fail safe structure for when an application fails to run or terminates abnormally. FIG. 52A shows the internal structure of a BD-J object relating to the present embodiment. Comparing FIG. 52A with FIG. 7B, the addition of a PlayList management table is new in FIG. 52A.

FIG. 52B shows an example of a PlayList management table. The PlayList management table shown in FIG. 52B is composed of PlayList specifications and playback attributes of the specified PlayLists. Each specification of a PL shows a PL that is playable on the Title time axis of a corresponding Title. Each playback attribute shows whether or not the corresponding specified PL should be automatically played simultaneously with the start of playback of the corresponding Title (A PL automatically played in this way is referred to as a default PL).

Figure 53A:
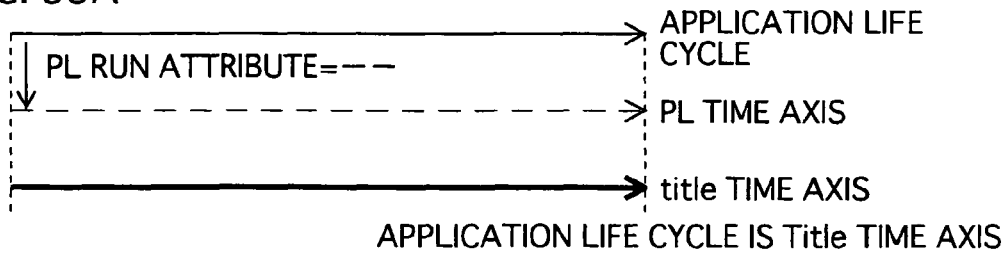
FIG. 53A shows the Title time axis of a non-AV Title in a case of the playback attribute being set to show non-automatic playback.

The following describes how a Title time axis is specified according to the PlayList management table, with reference to FIGS. 53A to 53D. FIG. 53A shows the Title time axis of a non-AV Title in a case of the playback attribute being set to show non-automatic playback. In this case, because the default PL is not played, the Title time axis is set based on the life cycle of the application in the same way as with a non-AV Title.

Figure 53B:
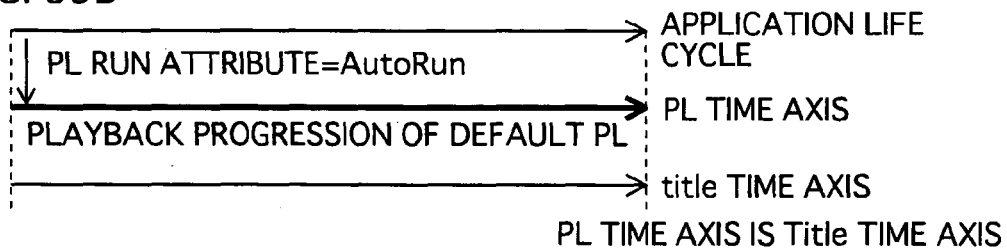
FIG. 53B shows a Title time axis of a non-AV Title for which the playback attribute is set to AutoPlay.

FIG. 53B shows a Title time axis of a non-AV Title for which the playback attribute is set to AutoPlay. If the playback attribute is set to show AutoPlay, the playback control engine 32 starts playback of the default PL simultaneously with the start of playback of the non-AV Title. However, this Title time axis is set based on the PL time axis regardless of whether the application runs normally or terminates abnormally.

Figure 53C:
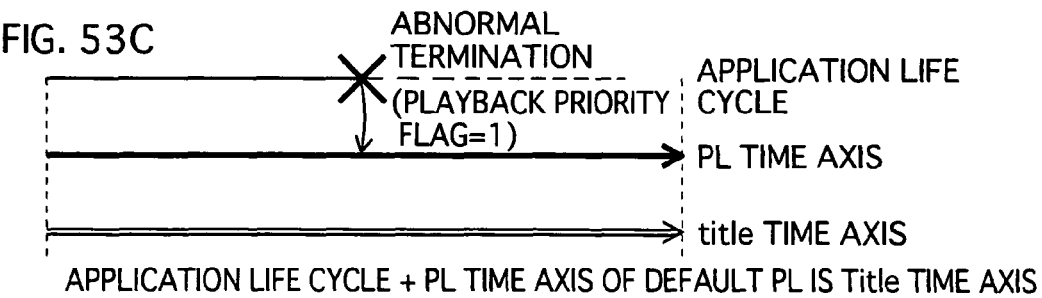
FIG. 53C shows a case of the playback attribute being set to show "AutoPlay" in the PlayList management table, and the application terminating abnormally.

FIG. 53C shows a case of the playback attribute being set to show "AutoPlay" in the PlayList management table, and the application terminating abnormally. Although the abnormal termination of the application means that no applications are running, playback of the default PL continues. The PL time axis of the default PL becomes the Title time axis in this case also.

Figure 53D:
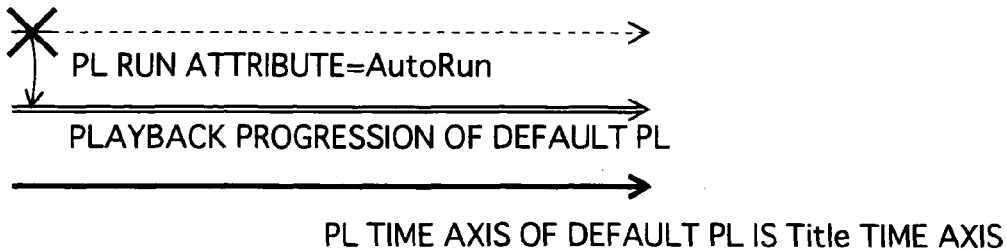
FIG. 53D shows a case of the playback attribute being set to show "AutoPlay" in the PlayList management table, and the main application failing to run.

FIG. 53D shows a case of the playback attribute being set to show "AutoPlay" in the PlayList management table, and the main application failing to run. In this case also, the playback control engine 32 plays the default PL regardless of whether the application fails to run or not, and therefore the time axis of the default PL becomes the Title time axis.

In this way, if the playback attribute is set to "AutoPlay" in the PlayList management table, something will be shown on the screen while a Java application is being run, even if it takes somewhere in the vicinity of 5 to 10 seconds to run the Java application. This state of something being shown on the screen compensates for the startup delay when executing a Title.

The above is an improvement relating to a recording medium of the present embodiment. The following describes an improvement relating to a playback apparatus of the present embodiment.

FIG. 52C shows how the playback apparatus processes in a case of a PL existing whose playback attribute is set to "AutoPlay" in the PlayList management table of a branch destination Title. As shown in FIG. 52C, if a PL whose playback attribute is set to "AutoPlay" exists in the PlayList management table of a branch destination Title, the application manager 36 of the BD-J module 35 instructs the playback control engine 32 to start playback of the AutoPlayPL directly after branching to the Title. In this way, a PL whose playback attribute is "AutoPlay" is instructed to be played directly after branching to a Title.

Figure 54:
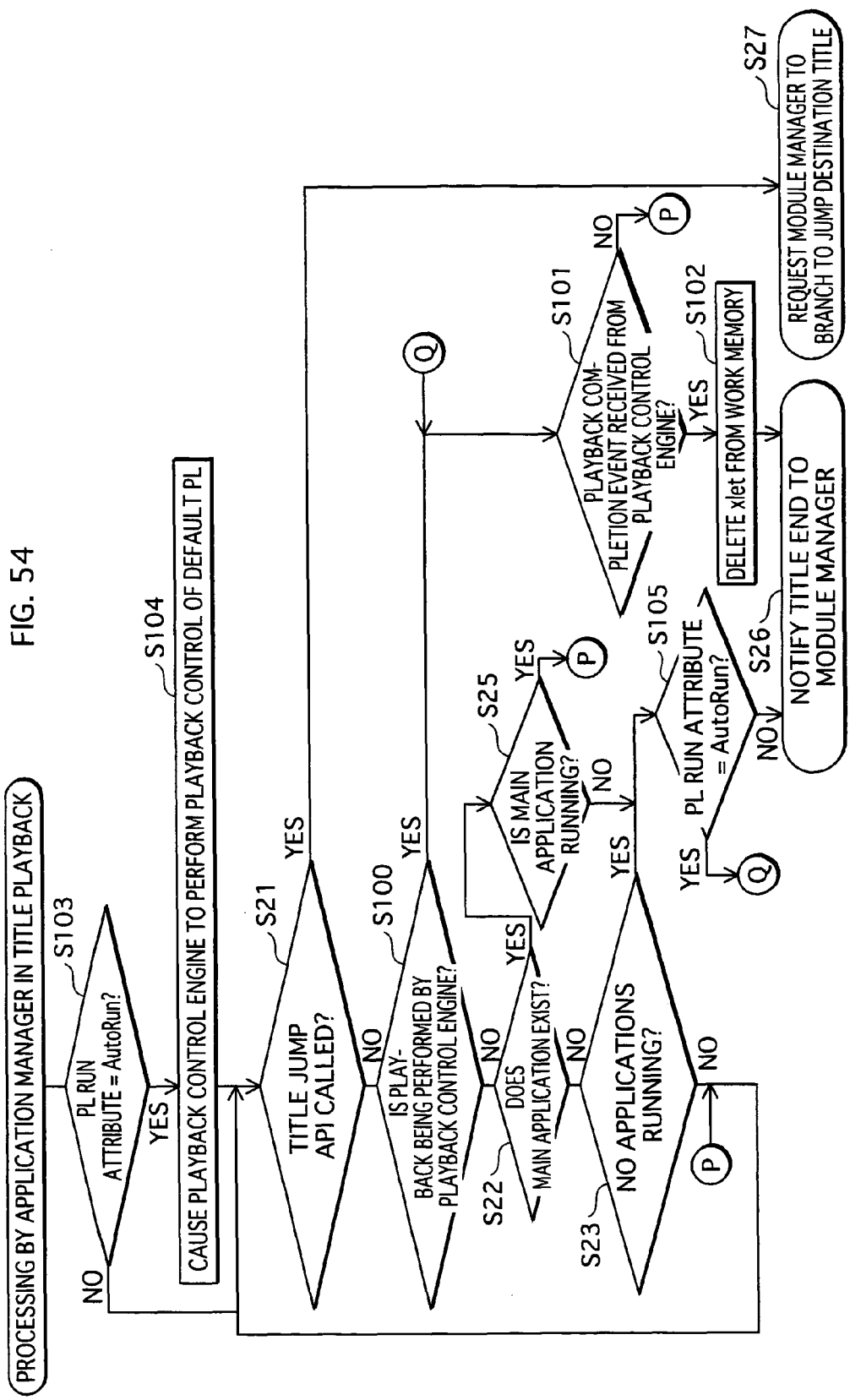
FIG. 54 is a flowchart showing processing by the application manager 36 relating to the seventh embodiment.

The application manager 36 performs processing according to procedure shown in FIG. 54, to respond to the described improvement in the recording medium.

FIG. 54 is a flowchart showing processing by the application manager 36 relating to the present embodiment. This flowchart is the flowchart of FIG. 38 with the addition of step S103 and step S104 before step S21, the addition of step S100 between step S21 and step S22, and the addition of step S105 between step S23 and step S26.

At step S103, the application manager 36 judges whether or not the playback attribute in the PlayList management table of the corresponding Title is "AutoPlay". If the playback attribute is "AutoPlay", the application manager 36 has the playback control engine 32 start playback control with respect to the default PL (step S104).

At step S100, the application manager 36 judges whether or not playback is being performed by presentation engine 31, and if playback is being performed by the presentation engine 31, moves to step S101.

Step S105 is a judgment step that is performed in the case of "YES" at step S23 or "NO" at step S25, and is for showing whether or not the playback attribute is "AutoPlay". If the playback attribute is not "AutoPlay", the application manager 36 notifies the module manager 34 of the end of the Title. If the playback attribute is "AutoPlay", the application manager 36 moves to step S101 and continues the processing.

FIG. 55 illustrates how playback is performed with the playback attribute being set to "AutoPlay" in the PlayList management table. Here, the Title that should be played is a non-AV Title that includes a game application in which falling tiles are stacked upon each other. If the playback attribute is set to "AutoPlay" in the PlayList management table of this non-AV Title, the playback control engine 32 will start playback of the default PL. Since execution of the game application and playback of the default PL are performed in parallel, a composite image in which the game application screen is in the foreground and the playback image of the default image is in the background is displayed as shown in the upper row of the left side of FIG. 55. The game application is forcedly terminated by the application manager 36 but playback of the default PL continues, and therefore something of the Title is shown on the screen. By specifying the playback attribute in the PlayList management table in this way, operation can be maintained without hang-ups or blackouts even if a game application in a non-AV Title terminates abnormally.

Eighth Embodiment

In the first embodiment, BD-J objects have two tables: a data management table and an application management table. However, the present embodiment discloses an embodiment in which these two tables are integrated into one table. In view of this integration, the read attributes in the data management table are omitted, and instead a "Ready" attribute is provided as one of the run attributes, as shown in FIG. 56A. The "Ready" attribute is a type of run attribute that indicates that an application it to be preloaded into the local memory 29 in preparation for a call from another application or a call from the application manager 36.

FIG. 56B shows the relationship between run attributes and the treatment of applications. Applications were treated in the first embodiment according to (1) whether or not the application is preloaded, (2) whether the application is run automatically when the current playback position reaches the effective cycle of the application or whether the application is run in response to a call from another application, (3) whether the application is loaded in accordance with the progression of the Title, and whether the application is living. The five states shown in FIG. 56B appear as a result of these differences. The run attribute is set to "AutoRun" when the application is to be preloaded and automatically run, and when the application is to be loaded and automatically run.

On the other hand, the run attribute is set to "Ready" when the application is to be preloaded or loaded, and the run field in the table shows "call run".

Note that there is no type showing that an application lives in the work memory 37 but is not loaded to the local memory 29. This is because the life cycle in the work memory 37 and the life cycle in the local memory 29 are incorporated with each other in the application and data management table.

Since a "Ready" attribute has been added to the types of run attributes, the application manager 36 performs processing to preload applications for which the run attribute is set to "AutoRun" and applications for which the run attribute is set to "Ready" before playback of the Title. This makes it possible to perform processing to load applications to the local memory without providing read attributes.

Figure 57:
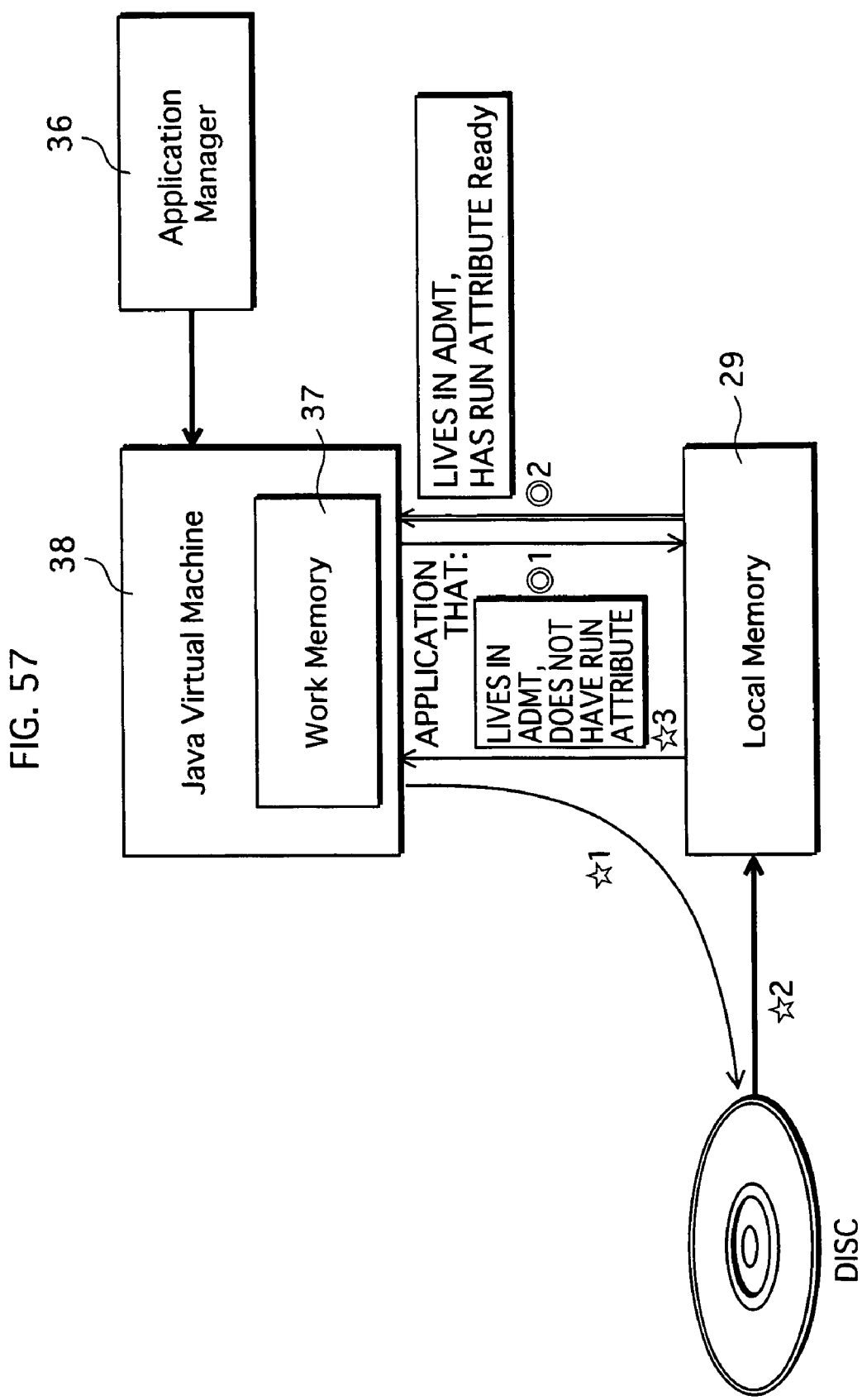
FIG. 57 illustrates how the Java virtual machine 38 of the eighth embodiment reads applications.

FIG. 57 illustrates how the Java virtual machine 38 of the eighth embodiment reads applications. FIG. 57 is based on the reading shown in FIG. 51.

Arrows ⊙1 and ⊙2 indicate a read of a Java archive file that lives in the application and data management table, and whose run attribute is set to "Ready".

The arrows ☆1, ☆2, and ☆3 indicate a read of an application that lives in the application and data management table, and whose run attribute is "Persistent".

The arrows ⊙1 and ⊙2 and the arrows ☆1, ☆2, and ☆3 are defined in FIG. 51, but reads corresponding to the arrows ∇1 and ∇2 in FIG. 51 do not exist in FIG. 57. This is because the application management table and the data management table have been integrated to form the application and data management table, and therefore the combination of an application living in the application management table and not living in the data management table cannot be expressed.

As had been described, according to the present embodiment, the data management table and the application management table are able to be integrated into one table (the application and data management table), thus simplifying processing by the application manager 36. Note that the application and data management table may be further simplified by omitting the read priority levels therefrom.

Ninth Embodiment

In the first embodiment, applications were read into the local memory 29 by referring to read priority levels and reading in accordance with these read priority levels, thus giving an order of priority to the reads. In contrast, the ninth embodiment expresses read priority levels according to a combination of information that signifies "Optional" and values from 0 to 255.

Figure 58B:
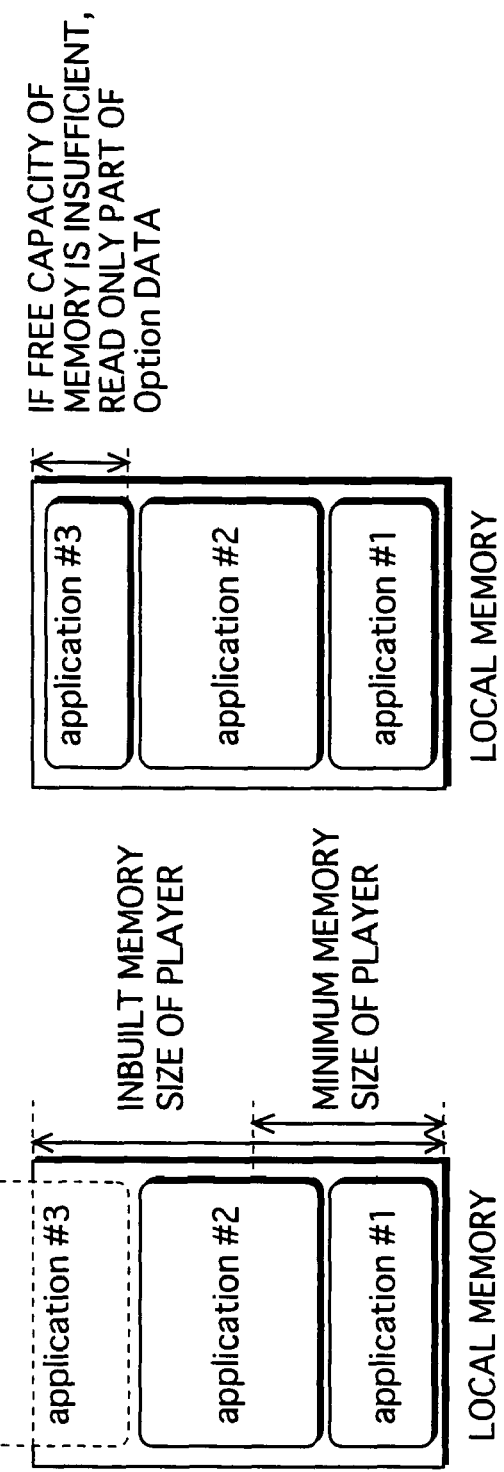

FIGS. 58A and 58B show an example of the read priority levels of the ninth embodiment. The values 255 and 128 are examples of the read priority levels from 0 to 255, and show that application #2 has a higher read priority level that application #3 in the present example.

The application manger 36 in the present embodiment reads applications having a read priority level showing "Mandatory", to the local memory 29 first, as in the first embodiment.

The application manager 36 subsequently judges whether or not the capacity of the local memory 29 exceeds the size of applications having a read priority level showing "Optional". If the capacity exceeds the size of the applications, the application manager 36 read applications having the read priority level showing "Optional" to the local memory 29. If the capacity does not exceed the size, the application manager 36 reads, from among the data constituting the applications, the application having a high value expressing the read priority level, to the local memory 29. The application manager 36 subsequently reads an application having a low value expressing the read priority level, to the remaining area in the local memory 29.

This enables some applications treated as "Optional" to be stored in the local memory 29 of the playback apparatus if the local memory 29 lacks sufficient capacity to store all applications.

Tenth Embodiment

Figure 59B:
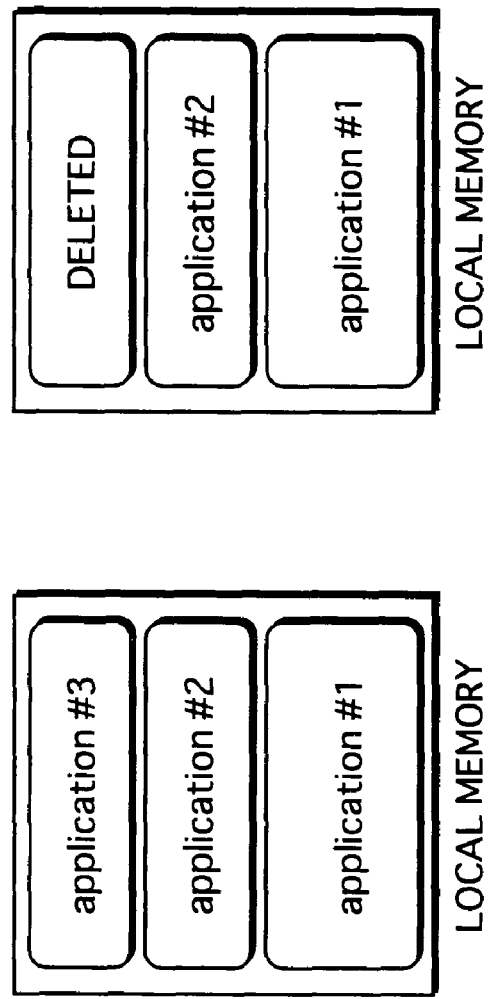
FIG. 59B shows access to the local memory 29 based on an application management table.

In the first embodiment, the application manager 36 loads one of applications having the same application ID exclusively to the local memory 29 in accordance with the priority levels. However, the tenth embodiment realizes exclusive loading by assigning group attributes to applications. FIGS. 59A and 59B show a data management table in which group attributes are assigned. There are two possible settings of the group attribute: "exclusivity group existent" and "exclusivity group non-existent". In the case of "exclusivity group existent", the group number of the group is defined in the data management table. In FIG. 59A, "-" for Title#1 shows that an exclusivity group does not exist. On the other hand, "group#1" for Title#2 and Title#3 shows that an exclusivity group exists and that Title#2 and Title#3 belong to an exclusivity group called "group#1". The above is an improvement relating to a recording medium of the present embodiment.

The playback apparatus of the present embodiment first reads applications to the local memory 29 based on the data management table, and then verifies the group attributes of the applications in the local memory 29. If at least two applications belonging to the same exclusivity group exist in the local memory 29, one of the applications is deleted from the local memory 29.

This improves the usage efficiency of the local memory 29. A specific example of an exclusivity group is a group composed of a launcher application and an application that is run by the launcher application. Since the number of applications run by the launcher application is, in principle, limited to one, only the launcher application and one other application should exist in the local memory. If three or more applications exist in the local memory 29, it is necessary for the application manager 36 to perform processing to delete the extra application or applications from the local memory 29. To this end, each application is provided with a group attribute, and the application manager 36 checks whether the applications that exist in the local memory 29 are a launcher application and one other application.

FIG. 59A shows access to the local memory 29 based on the application management table. In FIG. 59A, the group attribute of application#2 and application#3, which have read priority levels set to "Optional", is "group#1". This means that these applications belong to the same exclusivity group. Of the three applications, application#1 is the aforementioned launcher application, and application#2 and application#3 are applications that are run by the launcher application. Therefore, group attributes are assigned such that only one of application#2 and application#3 exist in the local memory 29. The application manager 36 refers to the group attributes of application#2 and application#3 to perform processing to delete one of these two applications from the local memory 29. Deleing one of the applications generates space in the local memory 29.

Eleventh Embodiment

In the first embodiment an individual application management table is provided for each Title. However, the present embodiment proposes changing the unit of allocation of application management tables. FIG. 60 shows variations of the unit of allocation of application management tables. In FIG. 60, the first row shows three application management tables recorded on a BD-ROM, the second row shows Title units, the third row shows disc units, and the fourth row shows a disc set composed of a plurality of BD-ROMs. Arrows in FIG. 60 illustrate allocation of the application management tables. Referring to these arrows, it can be seen that application management tables#1, #2 and #3 in the first row are respectively assigned to Title#1, Title#2 and Title#3 in the second row. Furthermore, application management table#4 is assigned to a unit of a disc, and application management table#5 is assigned to the entire disc set. Using units that are larger than Titles are the units of allocation of the application management tables enables applications that live while one BD-ROM is loaded in the playback apparatus to be defined, and applications that live while one of a plurality of BD-ROMs is loaded in the playback apparatus to be defined.

Remarks

The above description by no means shows the implementation of all configurations of the present invention. Implementation of the present invention is still possible according to implementation of configurations that carry out the following modifications (A), (B), (C), (D), . . . . The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of the application.

(A) In all of the embodiments, an optical disk pertaining to the present invention is implemented as a BD-ROM. However, the optical disk of the present invention is characterized by the recorded dynamic scenarios and the Index Table, and these characteristics are not dependent on the physical properties of a BD-ROM. For example, optical disks such as DVD-ROM, DVD-RAM, DVD-RW, DVD-R, DVD+RW, DVD+R, CD-R, CD-RW, and the like, and optical-magnetic disks such as PD, MO and the like are applicable. Semiconductor cards such as compact flash cards, PCM-CIA cards and the like are also applicable, as are (i) magnetic recording disks such as flexible disks, SuperDisk, Zip, Clik! and the like, and (ii) removable hard disk drives such as ORB, Jaz, SparQ, SyJet, EXFley, microdrive and the like. Furthermore, the recording medium may also be a built-in hard disk.

(B) Although the playback apparatuses in all of the embodiments output AVClips recorded on a BD-ROM to a TV after decoding, the playback apparatus may be structured from only a BD-ROM drive, and the TV may be equipped with all of the other elements. In this case, the playback apparatus and the TV can be incorporated into a home network connected using IEEE1394. Also, although the playback apparatuses in the embodiments are of a type used after connecting to a television, integral display-playback apparatuses are also applicable. Furthermore, the playback apparatus may be only those part of the playback apparatuses of the embodiment that perform essential parts of the processing. Because these playback apparatuses are all inventions disclosed in the specification of the present application, acts involving the manufacture of playback apparatuses based on an internal structure of the playback apparatuses shown in the first to third embodiments are implementations of the inventions disclosed in the specification of the present application. Acts that involve transferring (retail when cost is involved; a gift when no cost is involved), lending, or importing of playback apparatuses shown in the first to third embodiments are also implementations of the present invention. Acts that involve approaching the general user about transfer, rental or the like by means of show-window displays, catalogue solicitation, pamphlet distribution and the like are also implementations of these playback apparatuses.

(C) Because of the information processing by a computer program shown in each of the flowcharts being realized specifically using hardware resources, a computer program showing the processing procedures in the flowchart forms an invention in its own right. Although all of the embodiments show embodiments that relate to the implementation of computer programs pertaining to the present invention in an in incorporated form in the playback apparatuses, the computer programs shown in the first to third embodiments may be implemented in their own right, separate from the playback apparatuses. The implementation of the computer programs in their own right includes acts that involve: (1) production of the programs, (2) transference of the programs, either gratuitous or otherwise, (3) lending of the programs, (4) importing of the programs, (5) providing the programs publicly via bi-directional electronic communications circuits, and (6) approaching the general user about transfer, rental and the like by means of show-window displays, catalogue solicitation, pamphlet distribution, and so forth.

(D) Consider that the element of "time" relating to the steps executed in time-series in each of the flowcharts is a required item for specifying the invention. If this is the case, then the processing procedures shown by the flowchart can be understood as disclosing the usage configurations of the playback method. Execution of the processing in the flowcharts so as to achieve the original objects of the present invention and to enact the actions and effects by performing the processing of the steps in time-series is, needless to say, an implementation of the recording method pertaining to the present invention.

(E) A Menu(ChapterMenu) for displaying a list of Chapters, and a MOVIE object for controlling the behavior of this may be recorded on the BD-ROM, such that this Menu(ChapterMenu) can be branched to from the top menu. Furthermore, this Menu(ChapterMenu) may be called according to a press of a Chapter key among the keys of the remote controller.

(F) When recording on a BD-ROM, extension headers preferably are appended to TS packets structuring AVClips. These extension headers, which are called TP_extra_header, include an "Arrival_Time_Stamp" and a "copy_permission_indicator" and have a 4-bit type data length. TP_extra_header-attached TS packets (hereinafter, abbreviated to "EX-attached TS packet") are arranged into groups of 32 packets, and written into three sector. Each group comprising 32 EX-attached TS packets is 6,144 bytes in length (=32*192), and matches the 6,144-byte size of three sectors (=2048*3). The grouping of 32 EX-attached TS packets contained in three sectors is referred to as an "Aligned Unit".

A playback apparatus 200 transmits Aligned Units in transmission processing as described below, when used in a home network connect via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted between all adjacent TS packets. The positioning of isochronous packets is based on times shown in the Arrival_Time_Stamp in each TP_extra_header. The playback apparatus 200 outputs a DTCP_Descriptor following the outputting of the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(G) Although digital streams recorded on a recording medium in the embodiments are AVClips, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, or MPEG-AAC format.

(H) The video works in each embodiment may be obtained by encoding an analog video signal broadcast according to analog broadcasting, or may be stream data constituted from a transport stream broadcast according to digital broadcasting.

Furthermore, content may be obtained by encoding an analog/digital video signal recorded on a video tape. Moreover, content may be obtained by encoding an analog/digital video signal imported directly from a video camera. Alternatively, the content may be a digital work distributed by a distribution server.

(I) The BD-J module 35 may be a Java platform installed in a device in order to receive satellite broadcasts. If the BD-J module 35 is this Java platform, a playback apparatus according to the present invention shares processing as MHP-use STBs.

Furthermore, the BD-J module 35 may be a Java platform installed in a device in order to perform mobile telephone processing controls. If the BD-J module 35 is this Java platform, a playback apparatus according to the present invention shares processing as a mobile telephone.

(K) In the layer model, the HDMV mode may be positioned on the BD-J mode. This is because especially the analysis of the dynamic scenario in the HDMV mode and the execution of the control procedure based on the dynamic scenario put light load on the playback apparatus, and there is no problem in executing the HDMV mode on the BD-J mode. Also, in the development process of the playback apparatus or a movie work, the operations can be guaranteed by only one mode.

Further, the playback process may be executed only in the BD-J mode. This is because as shown in Embodiment 5, a playback control can be performed in synchronization with a playback of a PL in the BD-J mode, and therefore the HDMV mode may not necessarily be provided.

(L) A navigation command may be provided for a interactive graphics stream that is to be multiplexed on an AVCLip, in order to realize branching from one PL to another PL.

INDUSTRIAL APPLICABILITY

The playback apparatus of the present invention may be used personally as in a home theater system. However, the playback apparatus of the present invention may also be used industrially since the internal structure thereof is disclosed in the embodiments described above, and it is apparent that the playback apparatus of the present invention will be mass-produced. For this reason, the playback apparatus of the present invention has industrial applicability.

The invention claimed is:
1. A non-transitory computer-readable recording medium storing thereon an index table and a plurality of operation mode objects, wherein the index table is a file that shows a plurality of titles in correspondence with the plurality of operation mode objects, at least one of the operation modes being a first operation mode object that is for use in a movie mode, and at least another one of the operation mode objects being a second operation mode object that is for use in a virtual machine, the first operation mode object is stored in a file, includes a navigation command that shows a control procedure, and is loaded by a playback apparatus when the playback apparatus is in a first operation mode, the second operation mode object is stored in a file, includes cache management information, is loaded by the playback apparatus when the playback apparatus is in a second operation mode, and defines run control of an application in accordance with a selection of a current title corresponding to the second operation mode object, the run control being a control of reading a class file included in a Java archive file composing an application having a life cycle corresponding to the current title onto a heap memory of the virtual machine from a cache when the Java archive file composing the application has been preloaded to the cache, and the cache management information shows, of Java archive files that compose applications, which Java archive file is to be read to the cache, before audio-visual playback of the current title following the selection of the current title.

2. A playback apparatus that performs playback of a title recorded on a recording medium, and execution of an application, the playback apparatus comprising:

a module manager operable to select, based on an index table, a title to become a current title from among a plurality of titles;

a module operable to execute the application; and a playback unit operable to execute audio-visual playback in accordance with the current title, wherein the recording medium stores thereon an index table, and a plurality of operation mode objects, the index table shows a plurality of titles in correspondence with the plurality of operation mode objects, at least one of the operation modes being a first operation mode object that is for use in a movie mode, and at least another one of the operation mode objects being a second operation mode object that is for use in a virtual machine, the first operation mode object is stored in a file and includes a navigation command that shows a control procedure, the second operation mode object is stored in a file, includes cache management information, is loaded by the playback apparatus when the playback apparatus is in a second operation mode, and defines run control of an application in accordance with a selection of a current title corresponding to the second operation mode object, the run control being a control of reading a class file included in a Java archive file composing an application having a life cycle corresponding to the current title onto a heap memory of the virtual machine from a cache when the Java archive file composing the application has been preloaded to the cache, the cache management information shows, of Java archive files that compose applications, which Java archive file is to be read to the cache, before audio-visual playback of the current title following the selection of the current title, the module, when a selection of the current title is made, reads to the cache the Java archive file shown in the cache management information corresponding to the current title, before audio-visual playback of the current title commences, and the module and the module manager are each configured from hardware including a processor and a memory, and a program stored in the memory.

3. A playback method that performs playback of a title recorded on a recording medium, and execution of an application, the playback method comprising:

a manager step of selecting, based on an index table, a title to become a current title from among a plurality of titles;

a module step of executing the application; and a playback step of executing audio-visual playback in accordance with the current title, wherein the recording medium stores thereon an index table and a plurality of operation mode objects, the index table shows a plurality of titles in correspondence with the plurality of operation mode objects, at least one of the operation modes being a first operation mode object that is for use in a movie mode, and at least another one of the operation mode objects being a second operation mode object that is for use in a virtual machine, the first operation mode object is stored in a file and includes a navigation command that shows a control procedure, the second operation mode object is stored in a file, includes cache management information, is loaded by the playback apparatus when the playback apparatus is in a second operation mode, and defines run control of an application in accordance with a selection of a current title corresponding to the second operation mode object, the run control being a control of reading a class file included in a Java archive file composing an application having a life cycle corresponding to the current title onto a heap memory of the virtual machine from a cache when the Java archive file composing the application has been preloaded to the cache, the cache management information shows, of Java archive files that compose applications, which Java archive file is to be read to the cache, before audio-visual playback of the current title following the selection of the current title, the module step, when a selection of the current title is made, reads to the cache the Java archive file shown in the cache management information corresponding to the current title, before audio-visual playback of the current title commences.

* * * * *